US010492524B2

(12) United States Patent
Ruzycky

(10) Patent No.: US 10,492,524 B2
(45) Date of Patent: Dec. 3, 2019

(54) ORGANIC MATERIAL GRINDER AND CIGARETTE FILLER

(71) Applicant: Ewhan Ruzycky, Toronto (CA)

(72) Inventor: Ewhan Ruzycky, Toronto (CA)

(73) Assignee: KOOPEH DESIGNS INC., Etobicoke (CA)

( * ) Notice: Subject to any disclaimer, the term of this patent is extended or adjusted under 35 U.S.C. 154(b) by 977 days.

(21) Appl. No.: 14/776,792

(22) PCT Filed: Mar. 14, 2014

(86) PCT No.: PCT/CA2014/000244
§ 371 (c)(1),
(2) Date: Sep. 15, 2015

(87) PCT Pub. No.: WO2014/138913
PCT Pub. Date: Sep. 18, 2014

(65) Prior Publication Data
US 2016/0029691 A1     Feb. 4, 2016

Related U.S. Application Data

(63) Continuation-in-part of application No. 13/838,063, filed on Mar. 15, 2013, now Pat. No. 9,427,020.

(51) Int. Cl.
| A24C 5/42 | (2006.01) |
| A24C 5/02 | (2006.01) |
| A47J 42/14 | (2006.01) |
| A47J 42/12 | (2006.01) |
| A47J 42/16 | (2006.01) |
| A24B 7/04 | (2006.01) |
| B02C 18/14 | (2006.01) |
| A47J 42/40 | (2006.01) |

(52) U.S. Cl.
CPC .................. *A24C 5/42* (2013.01); *A24B 7/04* (2013.01); *A24C 5/02* (2013.01); *A47J 42/12* (2013.01); *A47J 42/14* (2013.01); *A47J 42/16* (2013.01); *A47J 42/40* (2013.01); *B02C 18/144* (2013.01)

(58) Field of Classification Search
CPC .. A47J 42/40; A47J 42/14; A47J 42/12; A47J 42/16; A24C 5/42; A24B 7/04
USPC ............ 241/168, 169.1, 273.3; 131/108–110
See application file for complete search history.

(56) References Cited

U.S. PATENT DOCUMENTS

| 2,633,133 | A | * | 3/1953 | Higgins | A24C 5/42 |
| | | | | | 131/74 |
| 4,572,216 | A | | 2/1986 | Josuttis et al. | |
| 7,422,170 | B2 | | 9/2008 | Bao | |
| 9,814,259 | B1 | * | 11/2017 | Richmond | A24C 5/42 |
| 9,895,698 | B2 | * | 2/2018 | Spielman | B02C 18/144 |
| 10,039,418 | B2 | * | 8/2018 | Staiano | A47J 42/34 |
| 2011/0068026 | A1 | * | 3/2011 | Fakhouri | A24F 9/04 |
| | | | | | 206/244 |

(Continued)

*Primary Examiner* — Faye Francis
(74) *Attorney, Agent, or Firm* — Eckert Seamans Cherin & Mellott, LLC

(57) ABSTRACT

The present invention is directed to an apparatus for grinding and depositing material, the apparatus having a grinder configured to grind material; and a chamber communicatively connected to the grinder, the chamber configured to receive at least one tube for smoking wherein, in use, the ground material is deposited in the at least one tube for smoking in the chamber.

25 Claims, 65 Drawing Sheets

(56) References Cited

U.S. PATENT DOCUMENTS

| | | | | |
|---|---|---|---|---|
| 2012/0138075 A1* | 6/2012 | Jespersen | ............... | A24C 5/40 |
| | | | | 131/280 |
| 2013/0025608 A1* | 1/2013 | Fakhouri | ............... | A24F 9/00 |
| | | | | 131/311 |
| 2013/0214068 A1* | 8/2013 | Camitta | ............... | B02C 18/16 |
| | | | | 241/25 |
| 2014/0182604 A1* | 7/2014 | Hutton | ............... | A24C 5/42 |
| | | | | 131/70 |

* cited by examiner

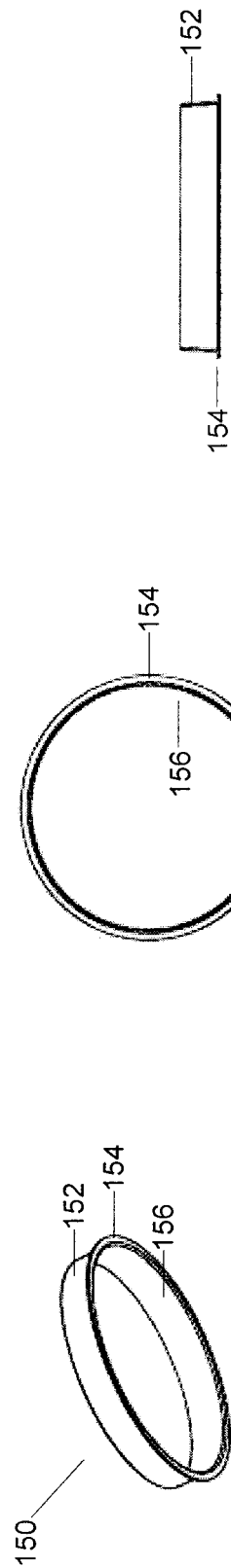

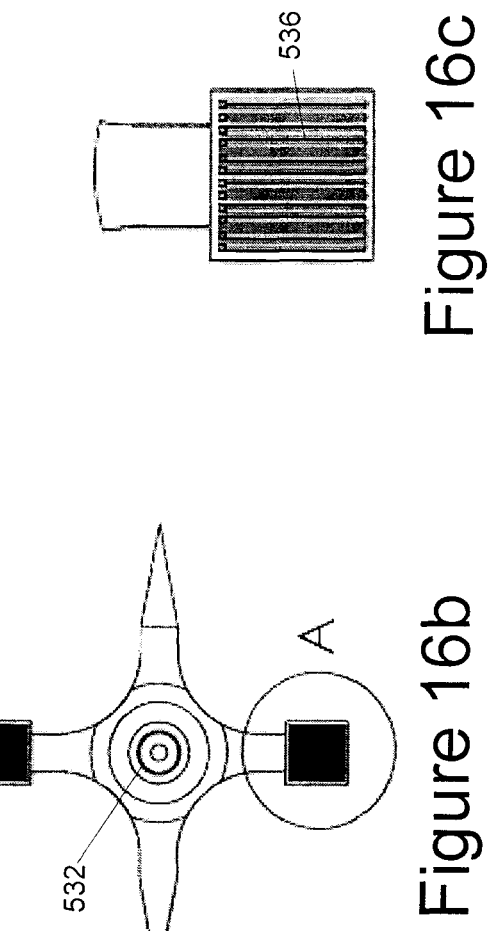
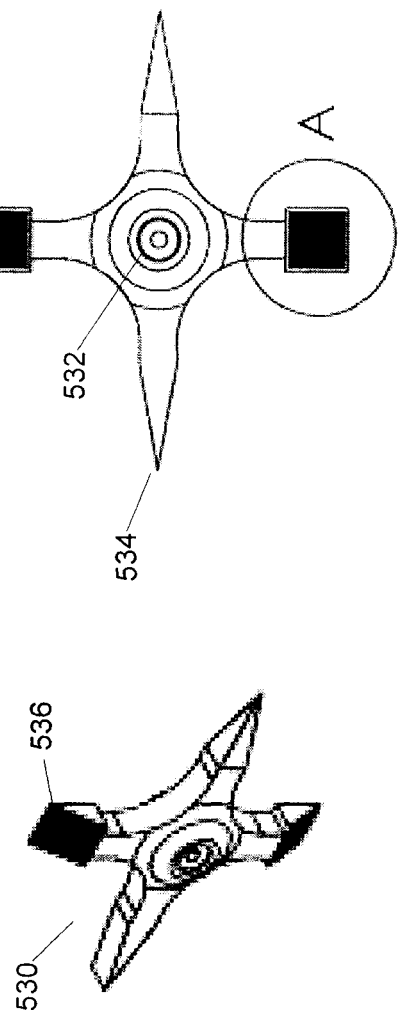
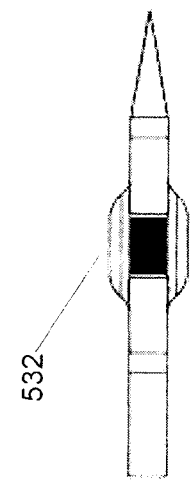
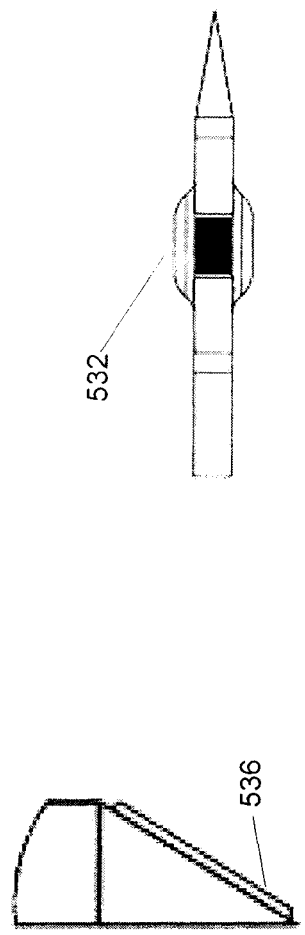
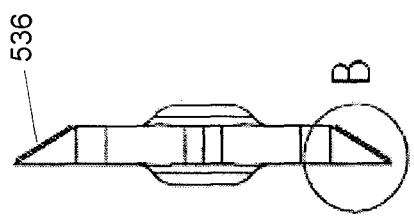
Figure 16a
Figure 16b
Figure 16c
Figure 16d
Figure 16e
Figure 16f

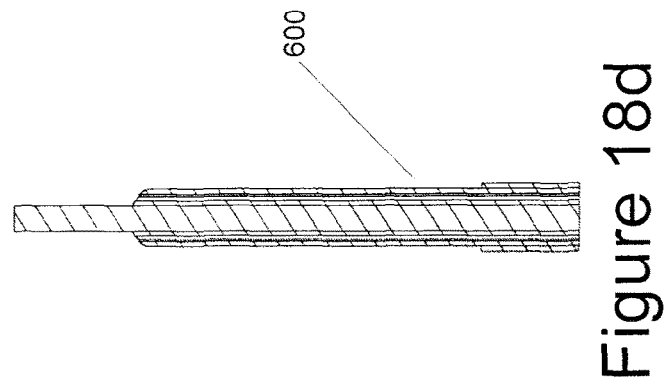
Figure 18b
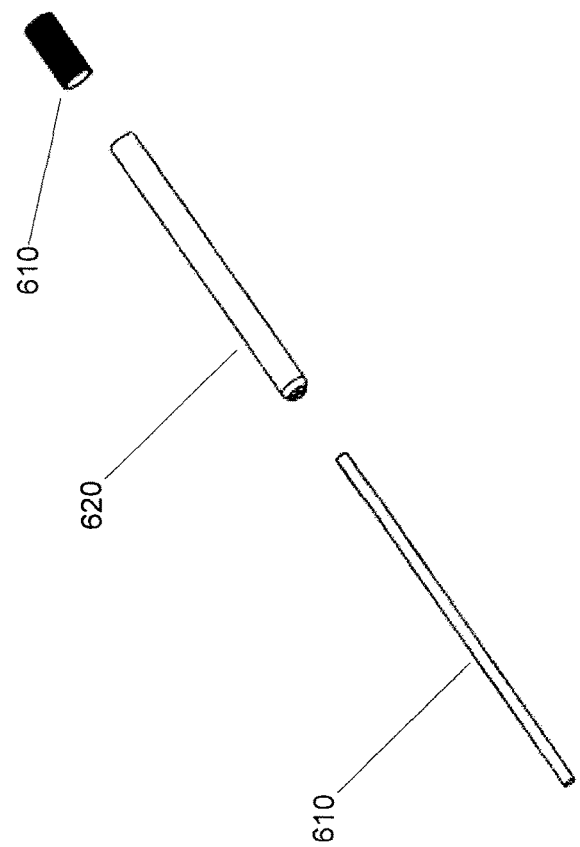
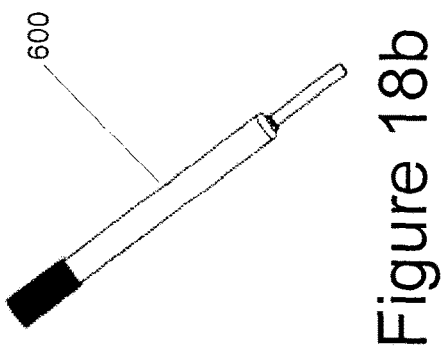
Figure 18d
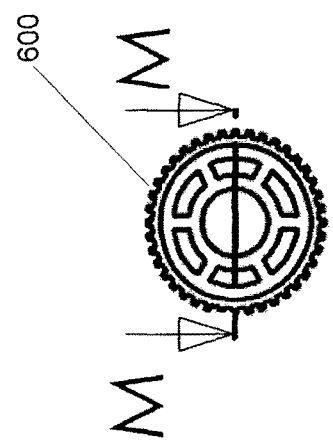
Figure 18a
Figure 18c

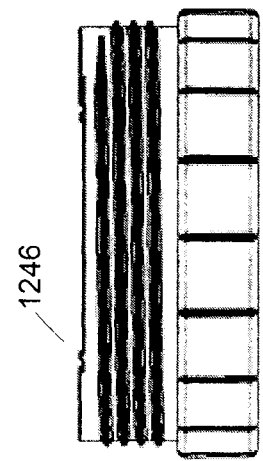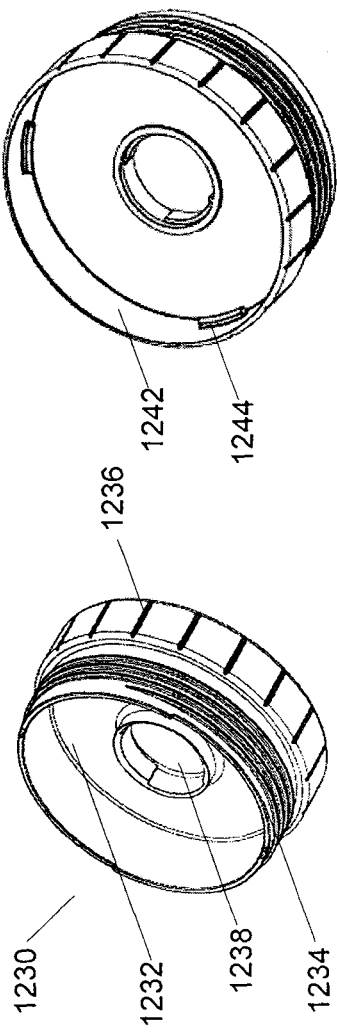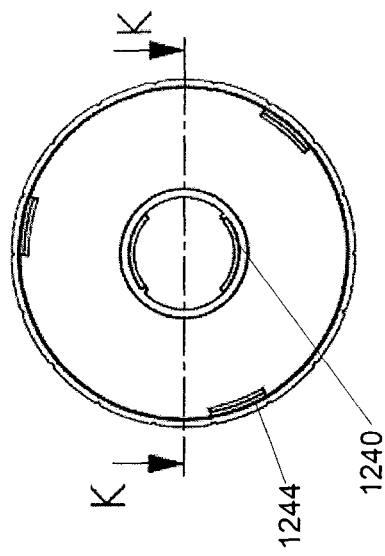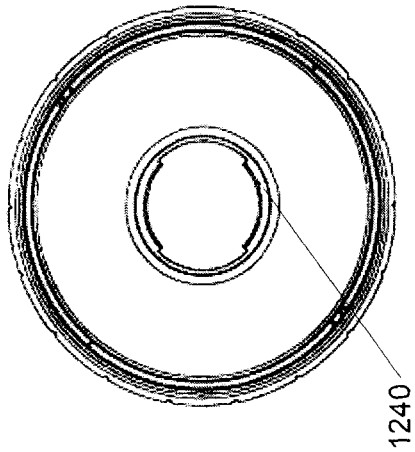

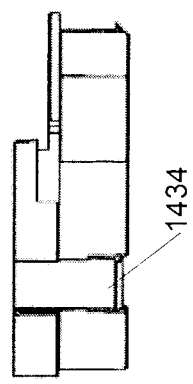
Figure 24c
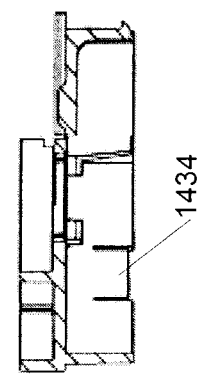
Figure 24f
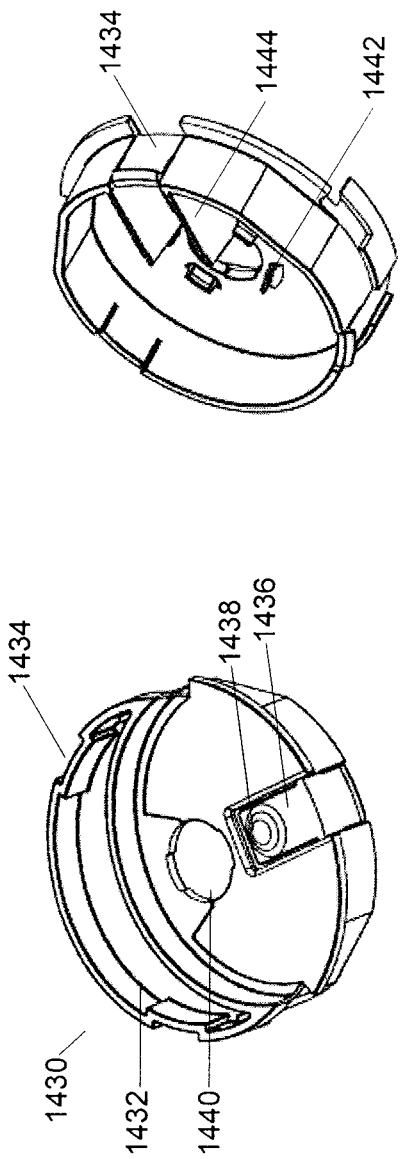
Figure 24b
Figure 24a
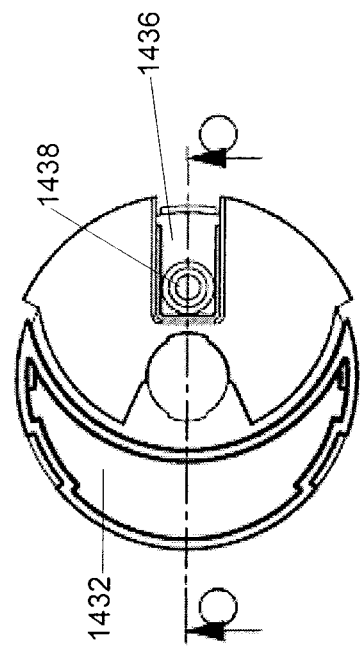
Figure 24e
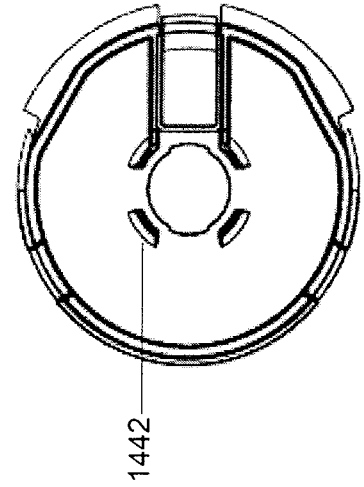
Figure 24d

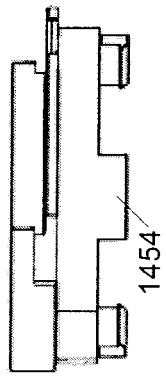
Figure 25c
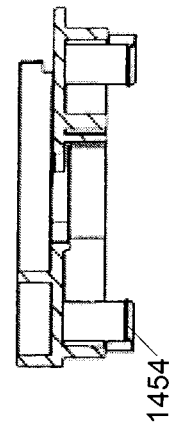
Figure 25e
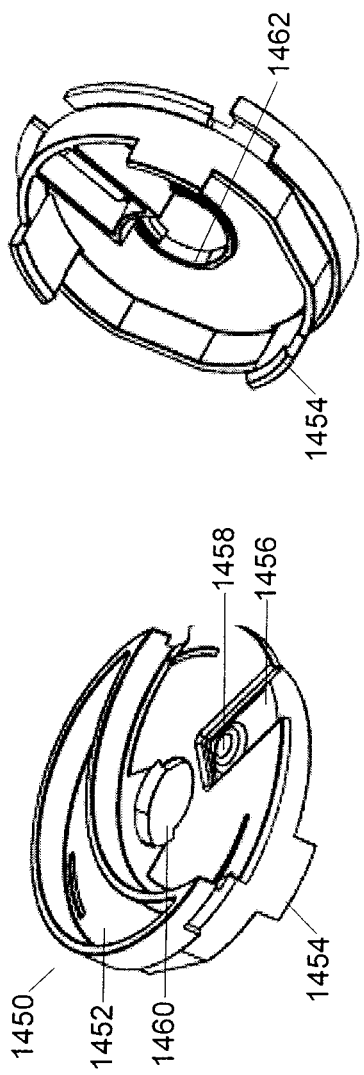
Figure 25b
Figure 25a
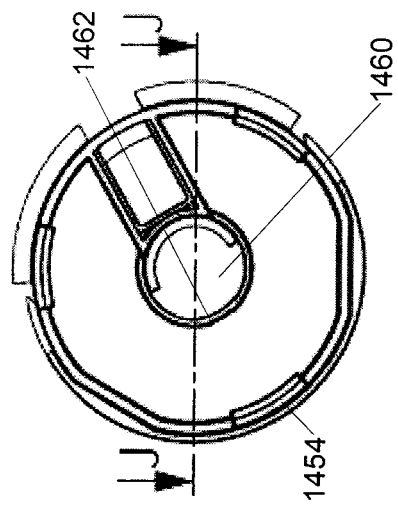
Figure 25d

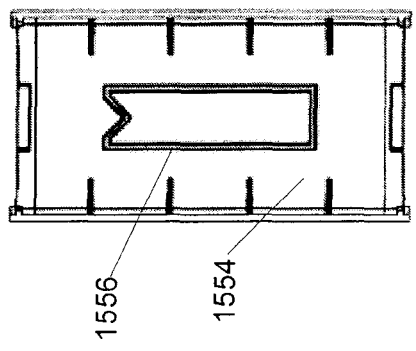
Figure 29c
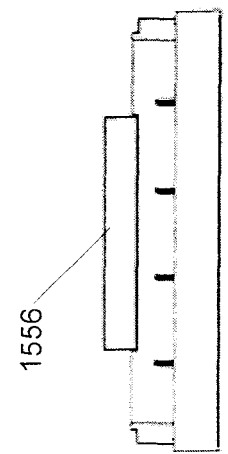
Figure 29f
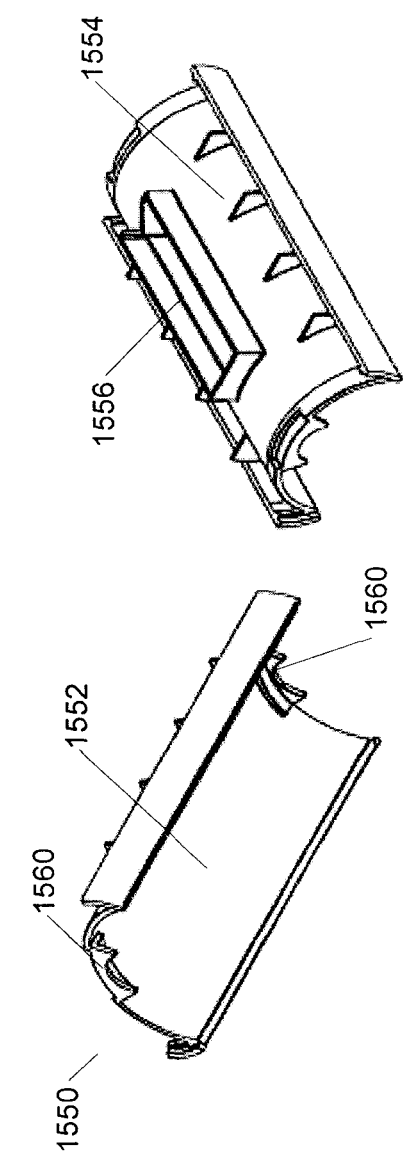
Figure 29b
Figure 29a
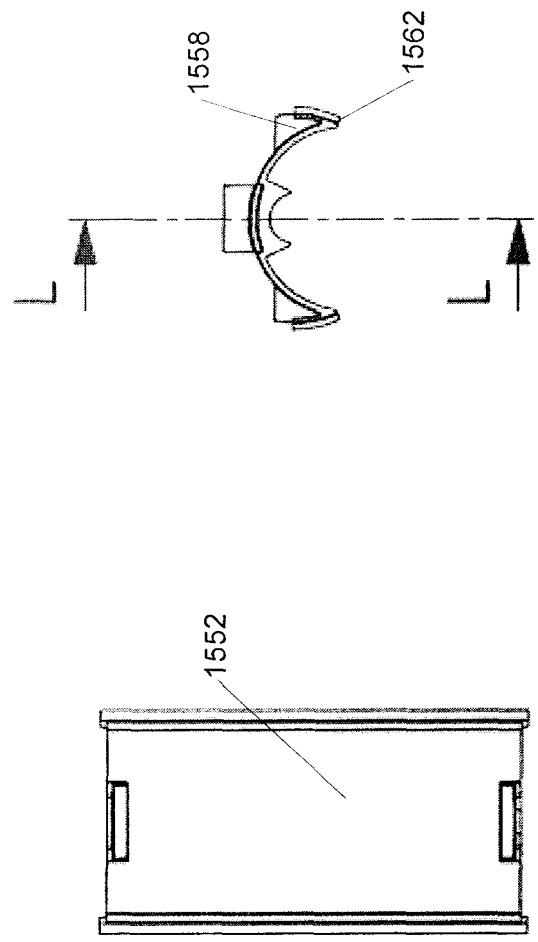
Figure 29e
Figure 29d

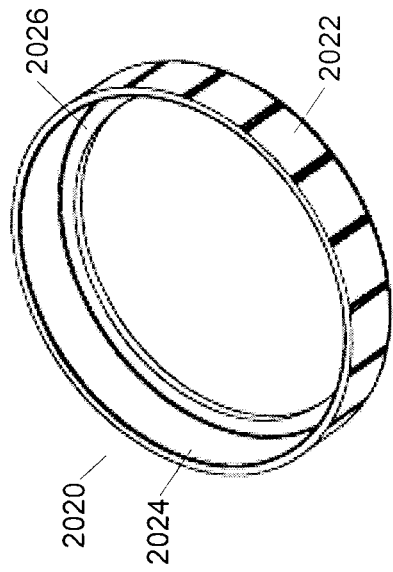
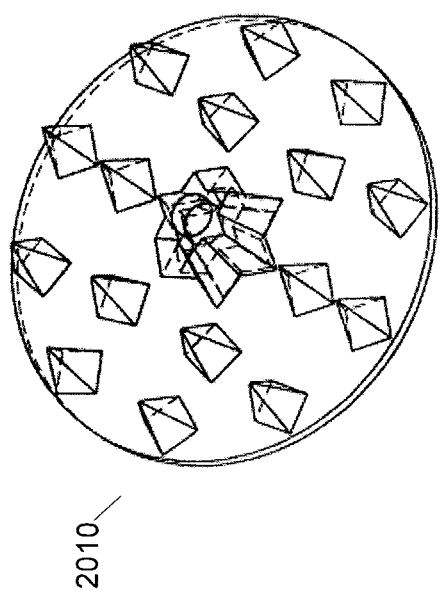
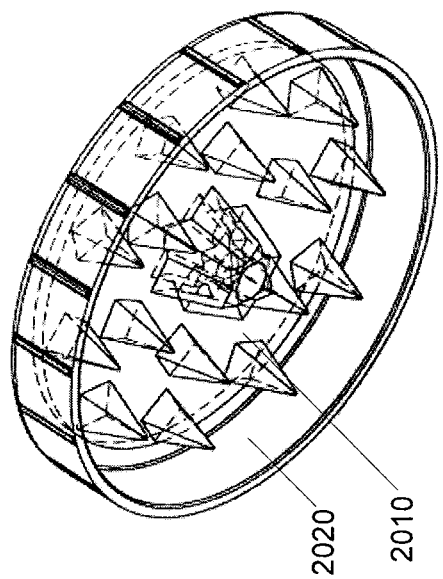
Figure 33a
Figure 33b
Figure 33c

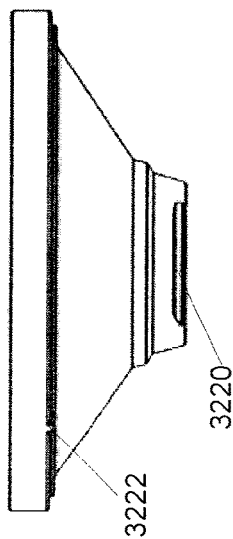
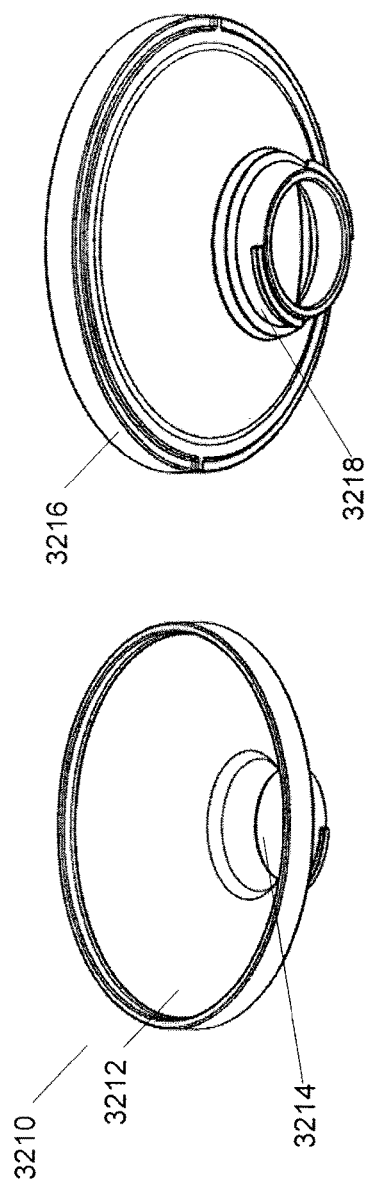
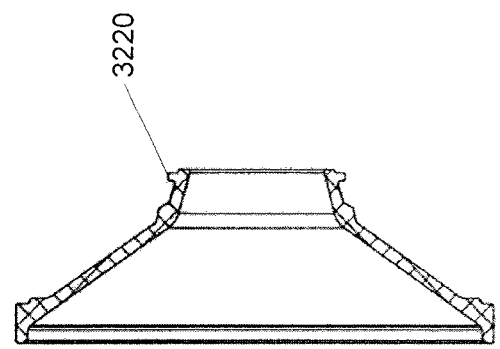
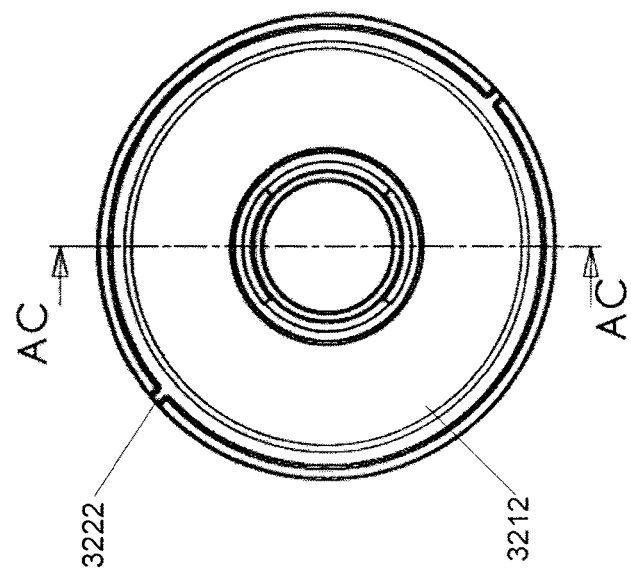
Figure 38a
Figure 38b
Figure 38c
Figure 38d
Figure 38e

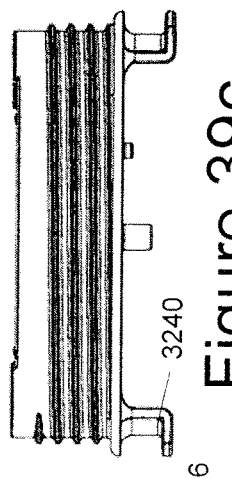
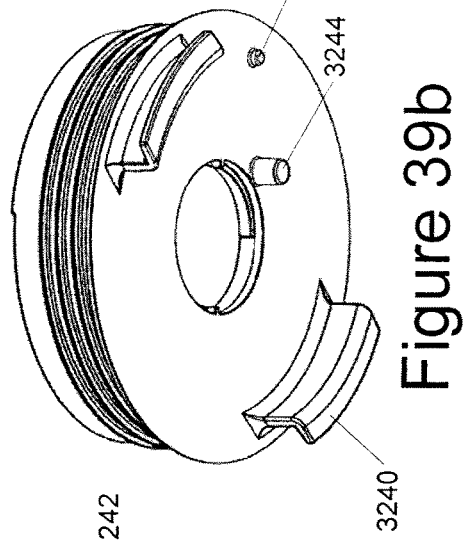
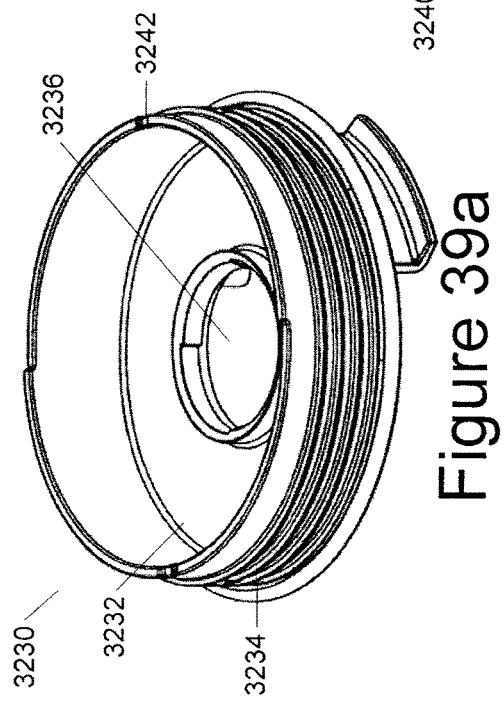
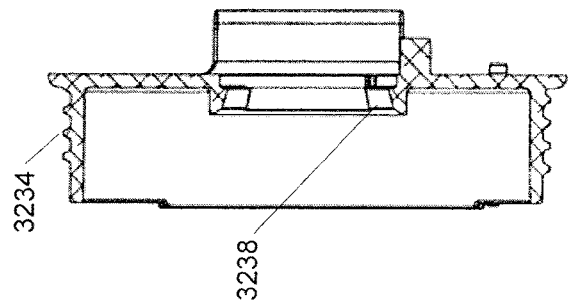
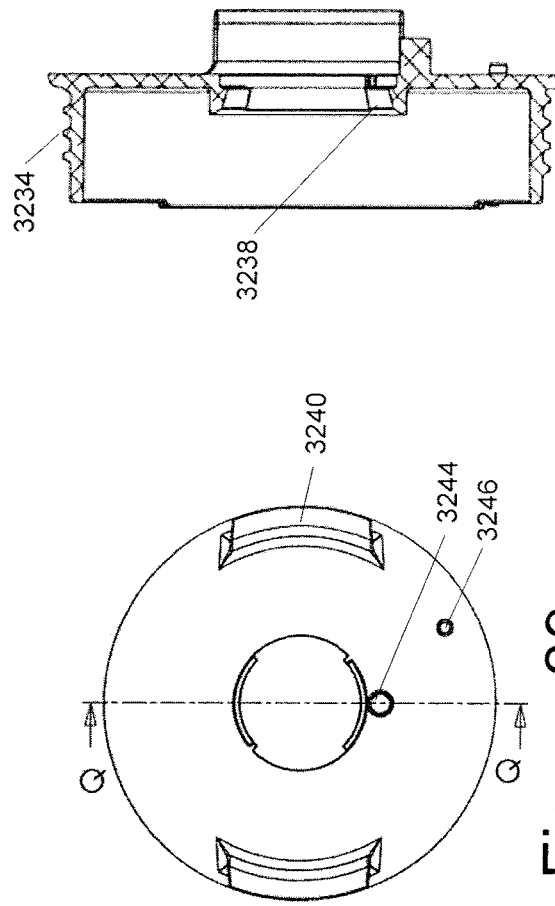
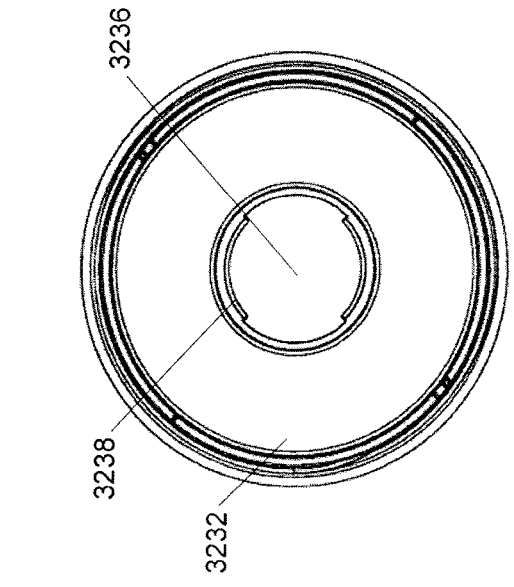

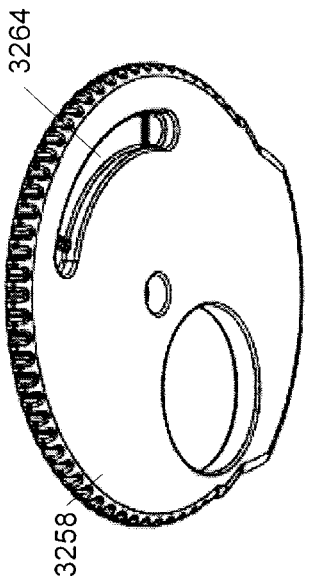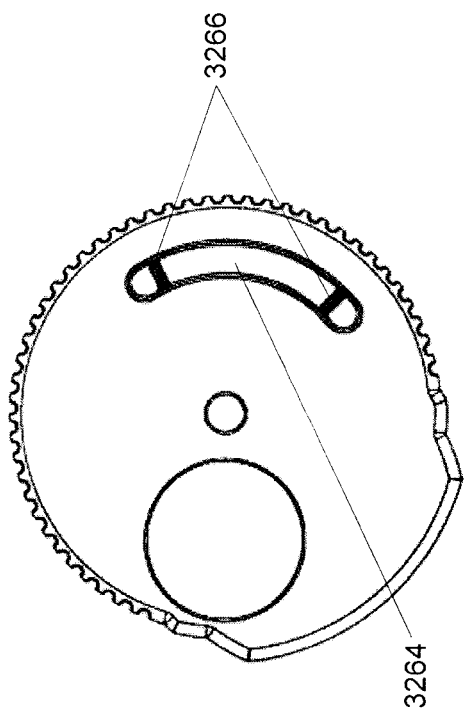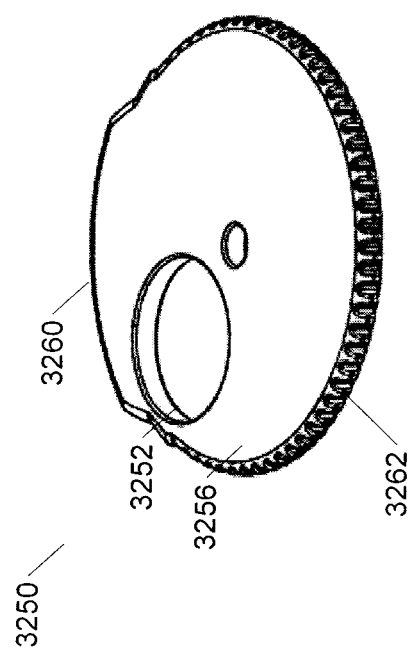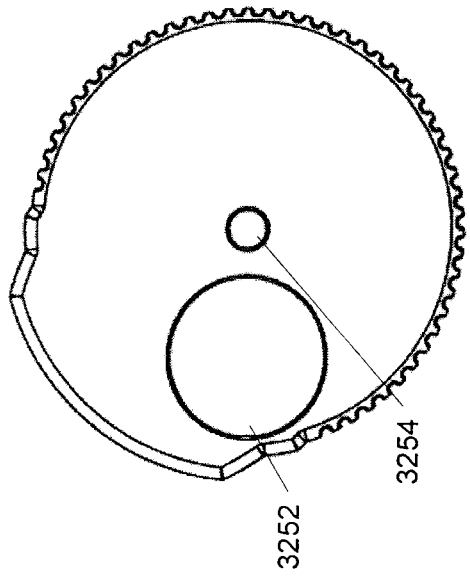

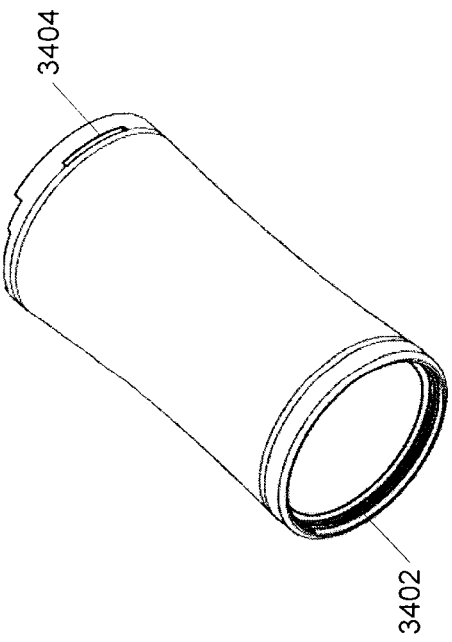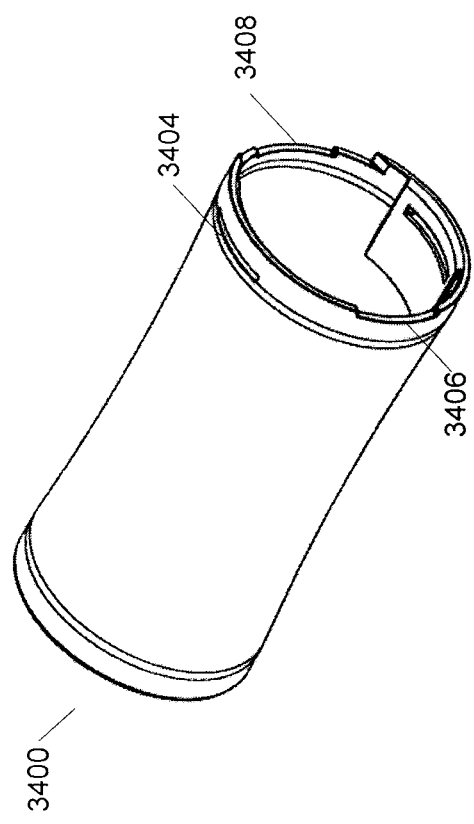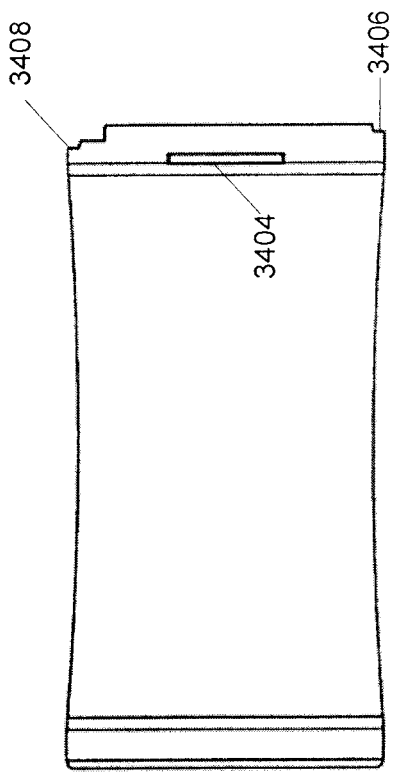
Figure 42a
Figure 42b
Figure 42c

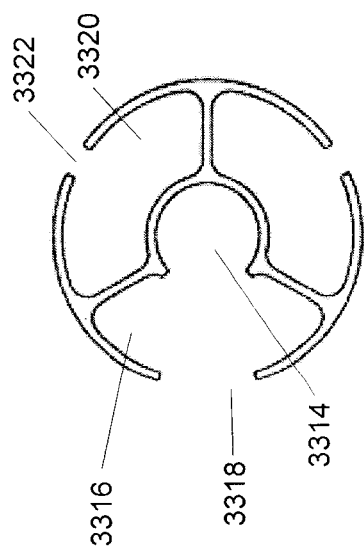
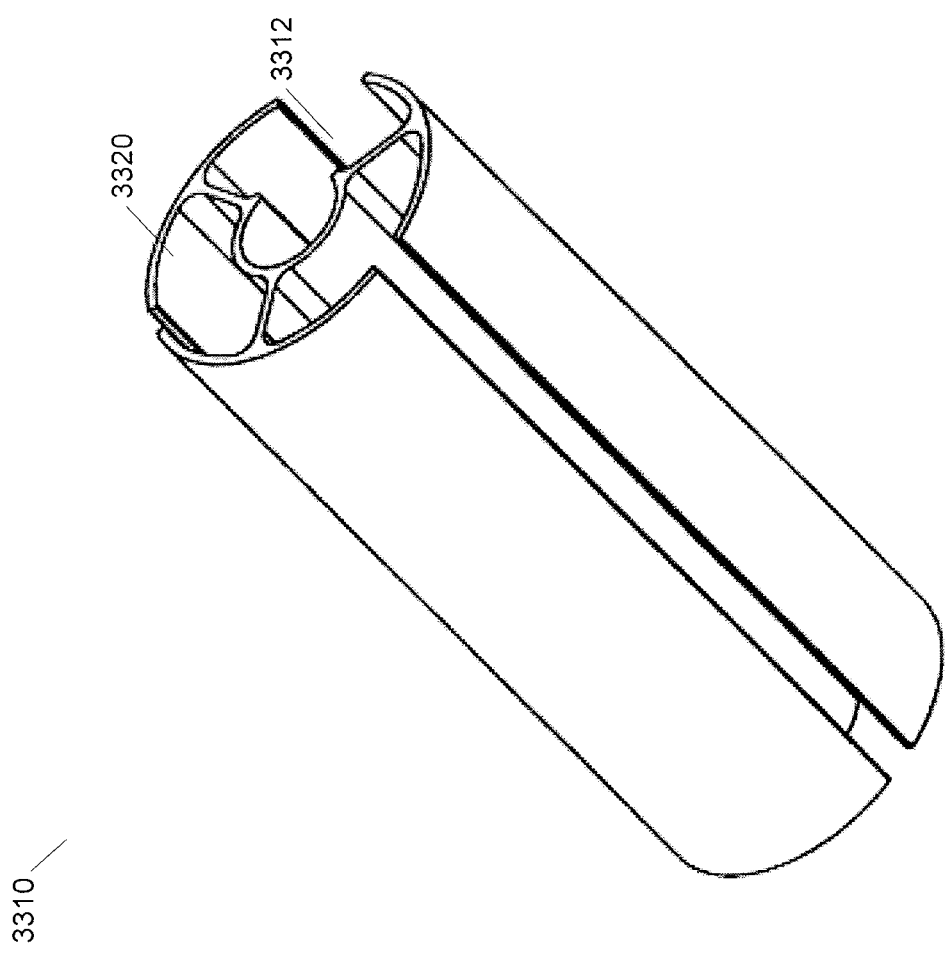

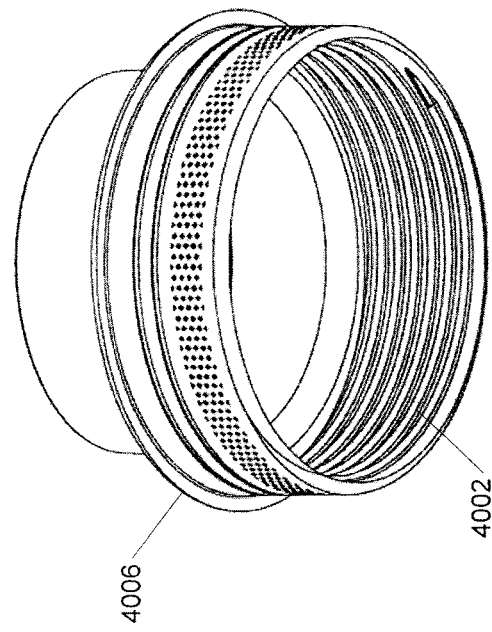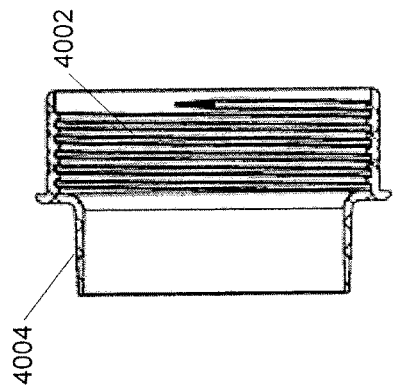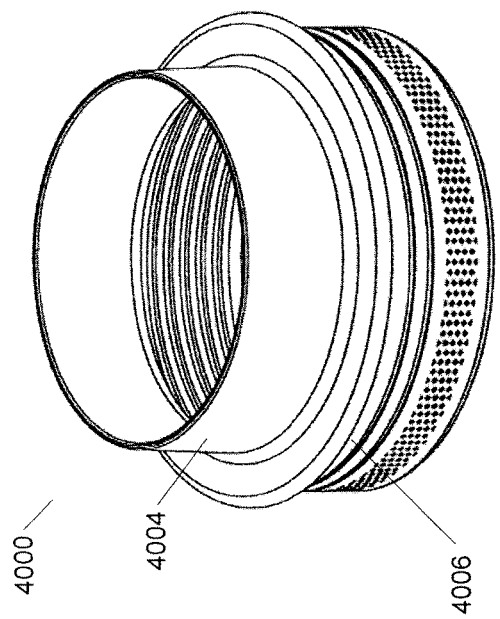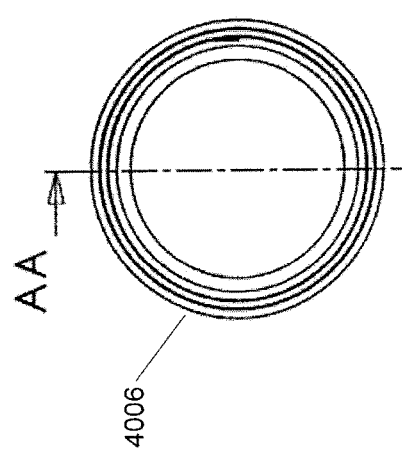

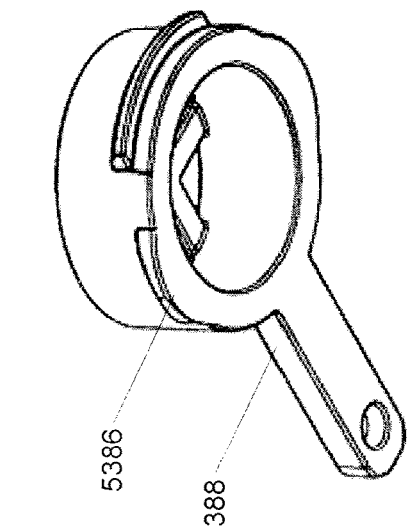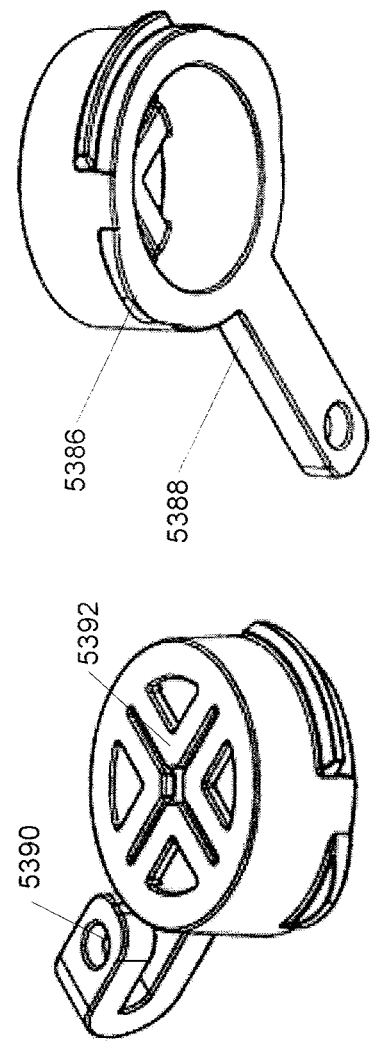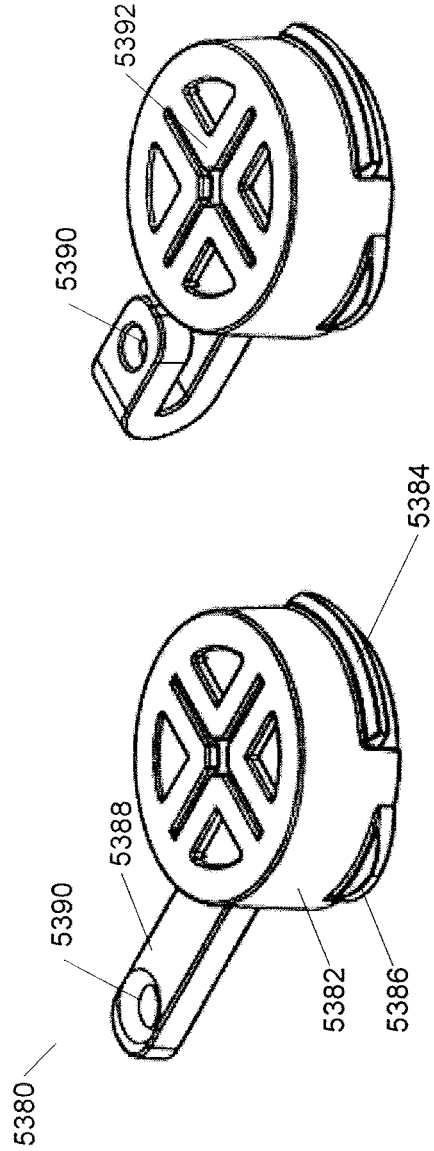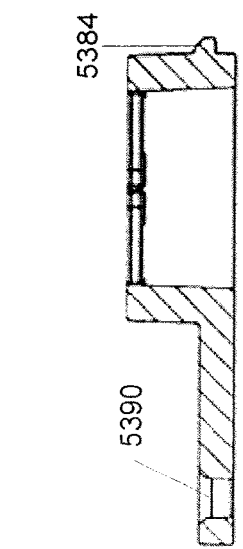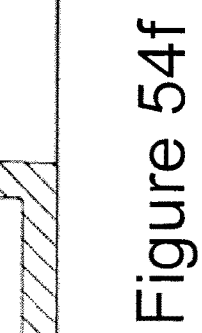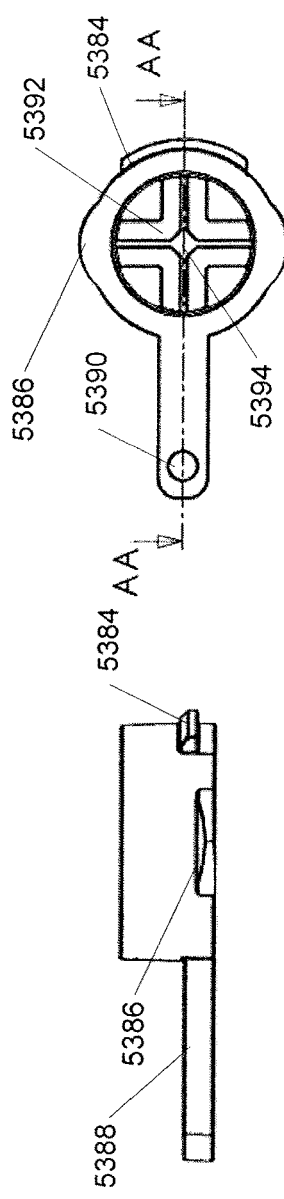

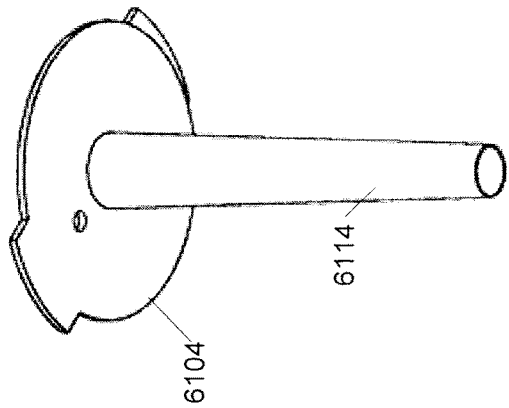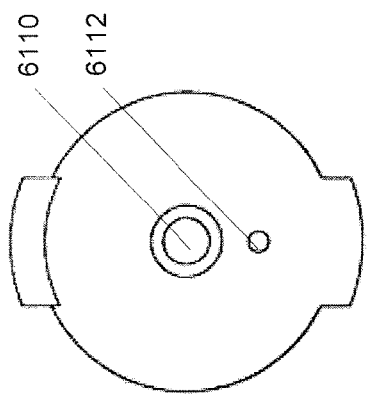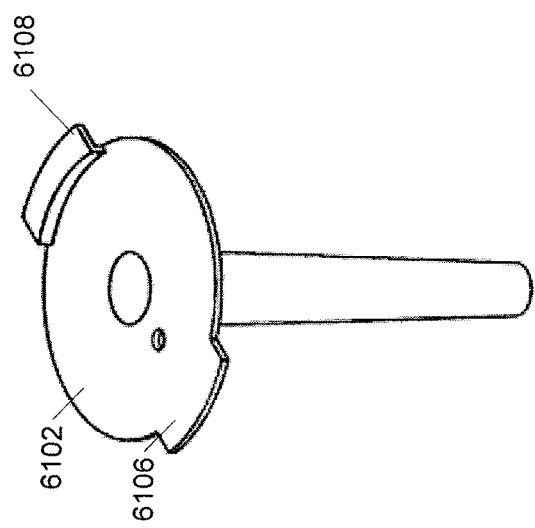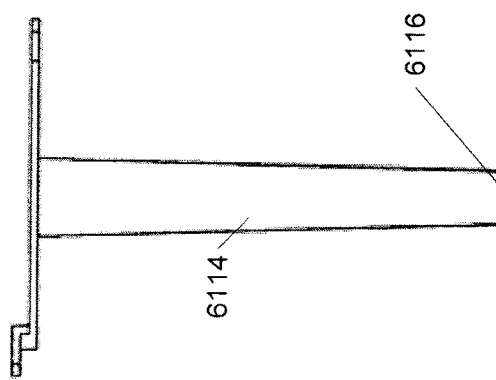

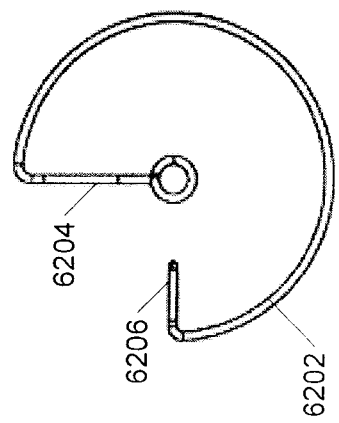
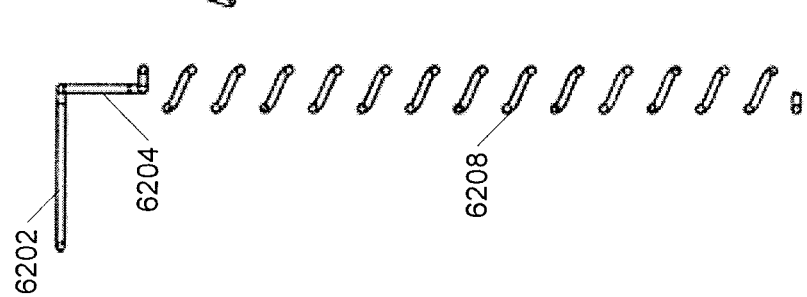
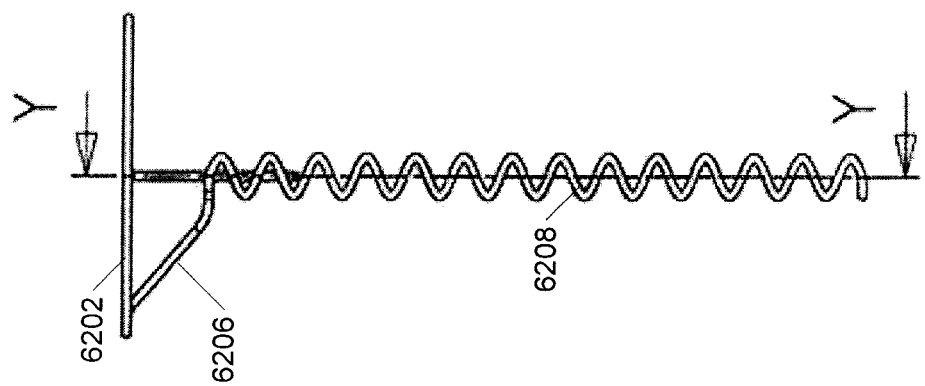
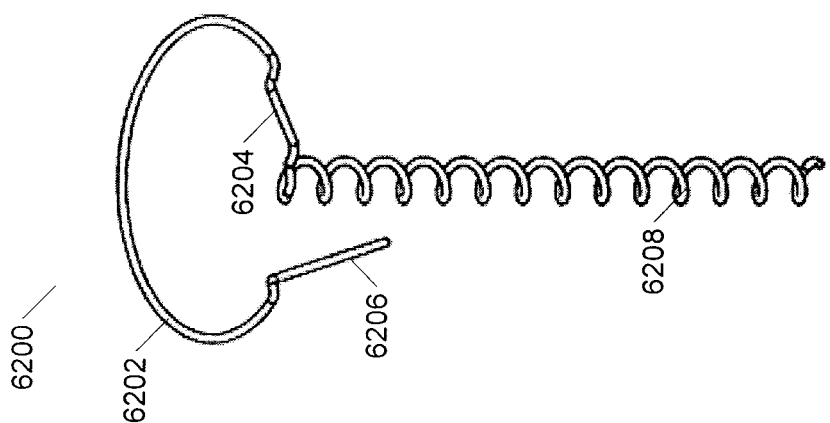
Figure 58a
Figure 58b
Figure 58c
Figure 58d

ORGANIC MATERIAL GRINDER AND CIGARETTE FILLER

FIELD OF THE INVENTION

The present invention relates generally to an apparatus and method for grinding material and depositing the ground material, in one embodiment, in at least one pre-formed tube.

BACKGROUND OF THE INVENTION

Cigarettes are formed from paper tubes that are stuffed with finely cut tobacco leaves. Cigarettes are generally manufactured by factories. Some people prefer to hand make their own cigarettes rather than purchase them. Handmade cigarettes are made by grinding tobacco then stuffing pre-rolled paper tubes with the ground tobacco or placing the ground tobacco on a paper which is then rolled into a tube. A filter may be included in the pre-rolled paper tube or added after to the pre-rolled paper tube or the paper that is rolled into a tube.

U.S. Pat. No. 7,422,170 discloses a grinder including a grinder housing having a grinder actuator, a first grinding plate, a second grinding plate and a detachable coupling arrangement. The first grinding plate is detachably coupled to the grinder actuator and the first grinding plate has a plurality of first grinding knifes downwardly and spacedly extended from a bottom side of the first grinding plate. The second grinding plate has a plurality of second grinding knifes upwardly and spacedly extended from the top side of the second grinding plate at a position that the first and second grinding knifes are spacedly disposed within a grinding compartment, such that when the grinder actuator is turned with respect to the grinder base to drive the first grinding plate to rotate, the first and second grinding knifes are correspondingly moved within the grinding compartment to provide a grinding action. Grinded material is manually collected by a user to be stuffed in a pre-rolled tube or placed on paper which is then rolled into a tube.

U.S. Pat. No. 8,171,939 discloses a cigarette injector for loading tobacco leaves into a hollow cigarette paper tube. The injector includes a housing having a tobacco cavity for disposing the tobacco leaves, an electric motor having an output shaft and a cigarette filling arrangement. The cigarette filling arrangement includes an elongated injection tube having a supplying end communicating with the tobacco cavity and a dispensing end for the cigarette paper tube encircling therewith, and an elongated tobacco feeder, which has a helicoid shape, having a driving end being driven to rotate via the output shaft of the electric motor and a feeding end extended within the injection tube through the tobacco cavity, wherein the tobacco feeder is driven to rotate for loading the tobacco leaves within the tobacco cavity into the cigarette paper tube through the injection tube. A user sleeves the injection tube with a hollow pre-rolled tube and loads tobacco leaves into the tobacco cavity. When the electric motor is turned on, the motor drives an elongated wire to rotate which pushes the tobacco leaves into the injection tube and further into the pre-rolled tube.

While devices for grinding organic material and making handmade cigarettes are known, improvements are desired. For example, there is a need to provide a single device that both grinds material and deposits the ground material, in one embodiment, in a pre-formed tube.

It is therefore an object of the present invention to provide a novel apparatus that avoids the disadvantages of the prior art devices. Further and other objects of the present invention will become apparent to those skilled in the art from reading the following summary of the invention and the detailed description of the embodiments described and illustrated herein.

SUMMARY OF THE INVENTION

In accordance with an aspect of the present invention, there is provided an apparatus for grinding and depositing material, the apparatus comprising: a grinder configured to grind material; and a chamber communicatively connected to the grinder, the chamber configured to receive ground material, wherein, in use, the material is ground in the grinder then deposited in the chamber.

In another embodiment of the present invention, the chamber is configured to receive at least one pre-formed tube wherein, in use, the ground material is deposited in the at least one pre-formed tube in the chamber.

In an embodiment of the present invention, the apparatus further comprises at least one guiding means communicatively connected to said grinder and configured to receive said ground material and to guide said ground material into said chamber, wherein, in use, said ground material is deposited in said at least one pre-formed tube in said chamber.

In an embodiment of the present invention, said at least one guiding means is at least one separator for separating large ground material from small ground material, wherein, in use, said large ground material is deposited in said at least one pre-formed tube in said chamber.

In an embodiment of the present invention, said at least one separator comprises at least one filter comprising a selectively porous material for allowing passage of said small ground material therethrough and at least one aperture for allowing passage of said large ground material therethrough, said at least one aperture positioned such that said large ground material passes through said at least one aperture and is deposited in said at least one pre-formed tube in said chamber.

In an embodiment of the present invention, the apparatus further comprises a blending unit communicatively connected at one end thereof to said grinder and at another end thereof to said at least one guiding means and configured to receive said ground material from said grinder and to blend said ground material, wherein, in use, said ground material is blended and deposited in said at least one pre-formed tube in said chamber.

In an embodiment of the present invention, the grinder comprises: a first grinding unit comprising at least one first protrusion; and a second grinding unit comprising at least one second protrusion and at least one aperture, wherein when the first grinding unit is moved relative to the second grinding unit, the at least one first protrusion interacts with the at least one second protrusion to grind the material, and wherein the ground material passes through the at least one aperture.

In an embodiment of the present invention, the at least one first protrusion is a plurality of first protrusions, the at least one second protrusion is a plurality of second protrusions and the at least one aperture is a plurality of apertures.

In an embodiment of the present invention, the first and second grinding units are magnetically detachably coupled.

In an embodiment of the present invention, the first grinding unit further comprises a first magnetic element and the second grinding unit comprises a second magnetic element, the first and second magnetic elements being magnetically couplable.

In an embodiment of the present invention, the second magnetic element can swing towards the chamber and is estopped from swinging towards the first grinding unit.

In an embodiment of the present invention, the first grinding unit is detachably connected to the second grinding unit.

In an embodiment of the present invention, the second grinding unit further comprises a window for viewing the interior of the second grinding unit.

In an embodiment of the present invention, the chamber comprises at least one receptacle configured to receive ground material and wherein, in use, the ground material is deposited in the at least one receptacle.

In an embodiment of the present invention, the at least one receptacle is configured to receive at least one pre-formed tube and wherein, in use, the large ground material is deposited in the at least one pre-formed tube in the at least one receptacle.

In an embodiment of the present invention, the apparatus further comprises at least one guiding means communicatively connected to said grinder and configured to receive said ground material and to guide said ground material into said chamber, wherein, in use, said ground material is deposited in said at least one pre-formed tube in said at least one receptacle.

In an embodiment of the present invention, said at least one guiding means is at least one separator for separating large ground material from small ground material, wherein, in use, said large ground material is deposited in said at least one pre-formed tube in said at least one receptacle.

In an embodiment of the present invention, said at least one separator comprises at least one filter comprising a selectively porous material for allowing passage of said small ground material therethrough and at least one aperture for allowing passage of said large ground material therethrough, said at least one aperture positioned such that said large ground material passes through said at least one aperture and is deposited in said at least one pre-formed tube in said at least one receptacle.

In an embodiment of the present invention, the apparatus further comprises a blending unit communicatively connected at one end thereof to said grinder and at another end thereof to said at least one guiding means and configured to receive said ground material from said grinder and to blend said ground material, wherein, in use, said ground material is blended and deposited in said at least one pre-formed tube in said at least one receptacle.

In an embodiment of the present invention, the apparatus further comprises at least one separator communicatively connected to the grinder and configured to receive the ground material and separate large ground material from small ground material, wherein, in use, the large ground material is deposited in the chamber, in the at least one receptacle or in the at least one pre-formed tube in the chamber or the at least one receptacle.

In an embodiment of the present invention, the at least one separator comprises at least one filter comprising a selectively porous material for allowing passage of the small ground material therethrough and at least one aperture for allowing passage of the large ground material therethrough, the at least one aperture positioned such that the large ground material passes through the at least one aperture and is deposited in the chamber or in the at least one pre-formed tube in the chamber.

In an embodiment of the present invention, the at least one filter is a conical filter.

In an embodiment of the present invention, the selectively porous material is a screen.

In an embodiment of the present invention, the at least one filter is mounted on a seat configured for collection of the small ground material.

In an embodiment of the present invention, the at least one receptacle is a plurality of receptacles.

In an embodiment of the present invention, the plurality of receptacles comprises a central receptacle and at least one peripheral receptacle.

In an embodiment of the present invention, the at least one peripheral receptacle is six peripheral receptacles.

In an embodiment of the present invention, the at least one receptacle is cylindrically shaped.

In an embodiment of the present invention, the central receptacle and the at least one peripheral receptacle are similarly sized and shaped.

In an embodiment of the present invention, the chamber further comprises a base enclosing the at least one receptacle at an end opposite the grinder.

In an embodiment of the present invention, the base further comprises at least one aperture from which the at least one receptacle is accessible.

In an embodiment of the present invention, the apparatus further comprises at least one valve configured to permit the passage of the large ground material therethrough in a direction such that it can be deposited in the chamber, in the at least one receptacle or in the at least one pre-formed tube in the chamber or the at least one receptacle and to prevent the passage of the large ground material in the opposite direction.

In an embodiment of the present invention, the at least one valve comprises at least one arm.

In an embodiment of the present invention, the at least one arm is two arms.

In an embodiment of the present invention, the apparatus further comprises at least one removable plug configured to seal the at least one aperture.

In an embodiment of the present invention, the apparatus further comprises a storage unit connected to the chamber and configured to store the material.

In an embodiment of the present invention, the apparatus further comprises a cap for enclosing the storage unit.

In an embodiment of the present invention, the cap is detachably screwed to the storage unit.

In an embodiment of the present invention, the apparatus further comprises a stuffier sized and shaped to fit into the chamber, the at least one receptacle or the at least one pre-formed tube in the chamber or the at least one receptacle to stuff the ground material into the chamber, the at least one receptacle or the at least one pre-formed tube in the chamber or the at least one receptacle.

In an embodiment of the present invention, the apparatus further comprises at least one support sized and shaped to fit in the chamber or the at least one receptacle for supporting the at least one pre-formed tube in the chamber or in the at least one receptacle.

In an embodiment of the present invention, the chamber comprises a rotatable cylinder comprising at least two receptacles, each receptacle of the at least two receptacles configured to receive ground material, wherein, in use, the ground material is deposited into a first receptacle of the at least two receptacles and into at least a second receptacle of the at least two receptacles upon rotation of the cylinder.

In an embodiment of the present invention, each of the at least two receptacles is configured to receive a pre-formed tube wherein, in use, the ground material is deposited into the first pre-formed tube in the first receptacle and into at least a second pre-formed tube in the at least second receptacle upon rotation of the cylinder.

In an embodiment of the present invention, the apparatus further comprises at least one guiding means communicatively connected to said grinder and configured to receive said ground material and to guide said ground material into said rotatable cylinder, wherein, in use, said ground material is deposited into said first pre-formed tube in said first receptacle of said at least two receptacles and into at least said second pre-formed tube in at least said second receptacle of said at least two receptacles upon rotation of said cylinder.

In an embodiment of the present invention, said at least one guiding means is at least one a separator configured to receive said ground material and separate large ground material from small ground material, wherein, in use, said large ground material is deposited into said first pre-formed tube in said first receptacle of said at least two receptacles and into said at least said second pre-formed tube in at least said second receptacle of said at least two receptacles upon rotation of said cylinder.

In an embodiment of the present invention, said at least one separator comprises at least one filter comprising a selectively porous material for allowing passage of said small ground material therethrough and at least one aperture for allowing passage of said large ground material therethrough, said at least one aperture positioned such that said large ground material passes through said at least one aperture into said first receptacle.

In an embodiment of the present invention, the apparatus further comprises a blending unit communicatively connected at one end thereof to said grinder and at another end thereof to said at least one guiding means and configured to receive said ground material from said grinder and to blend said ground material, wherein, in use, said ground material is blended and deposited into said first pre-formed tube in said first receptacle of said at least two receptacles and into at least said second pre-formed tube in at least said second receptacle of said at least two receptacles upon rotation of said cylinder.

In an embodiment of the present invention, the apparatus further comprises at least one separator communicatively connected to the grinder and configured to receive the ground material and separate large ground material from small ground material, wherein, in use, the large ground material is deposited into the first receptacle or the first pre-formed tube in the first receptacle and into at least the second receptacle or at least the second pre-formed tube of at least the second receptacle upon rotation of the cylinder.

In an embodiment of the present invention, the at least one separator comprises at least one filter comprising a selectively porous material for allowing passage of the small ground material therethrough and an aperture for allowing passage of the large ground material therethrough, the aperture positioned such that the large ground material passes through the aperture into the first receptacle.

In an embodiment of the present invention, the at least one filter is a conical filter.

In an embodiment of the present invention, the selectively porous material is a screen.

In an embodiment of the present invention, the at least one filter is mounted on a seat configured for collection of the small ground material.

In an embodiment of the present invention, the at least two receptacles is seven receptacles.

In an embodiment of the present invention, the at least two receptacles are cylindrically shaped.

In an embodiment of the present invention, the at least two receptacles are similarly sized and shaped.

In an embodiment of the present invention, the apparatus further comprises at least one valve configured to permit the passage of the large ground material therethrough in a direction such that it can be deposited into the first receptacle or the first pre-formed tube in the first receptacle and to prevent the passage of the large ground material in the opposite direction.

In an embodiment of the present invention, the at least one valve comprises at least one arm.

In an embodiment of the present invention, the at least one arm is two arms.

In an embodiment of the present invention, the chamber further comprises a base enclosing the at least two receptacles at an end opposite the grinder.

In an embodiment of the present invention, the base further comprises at least one aperture from which one of the at least two receptacles is accessible.

In an embodiment of the present invention, the apparatus further comprises at least one removable plug configured to seal the aperture.

In an embodiment of the present invention, the apparatus further comprises a stuffer sized and shaped to fit the at least two receptacles or the at least one pre-formed tube in the at least two receptacles to stuff the ground material into the at least two receptacles or the pre-formed tube in each of the at least two receptacles.

In an embodiment of the present invention, the apparatus further comprises at least one support sized and shaped to fit in at least one receptacle of the at least two receptacles for supporting the pre-formed tube in the at least one receptacle of the at least two receptacles.

In an embodiment of the present invention, the apparatus further comprises a case enclosing the chamber.

In an embodiment of the present invention, the case further comprises a window for viewing the interior of the case.

In an embodiment of the present invention, the case is connected to the grinder.

In an embodiment of the present invention, the case is connected to the seat.

In an embodiment of the present invention, the apparatus further comprises a storage unit connected to the chamber and configured to store material.

In an embodiment of the present invention, the apparatus further comprises a cap for enclosing the storage unit.

In an embodiment of the present invention, the at least one pre-formed tube is made of paper.

In an embodiment of the present invention, the material is organic material.

In an embodiment of the present invention, the material is a plant material.

In an embodiment of the present invention, the material is tobacco.

In an embodiment of the present invention, the material is an herb.

In an embodiment of the present invention, the material is marijuana.

In accordance with another aspect of the present invention, there is provided, a method comprising: grinding a material with a grinder; and depositing said ground material directly into at least one pre-formed tube.

In an embodiment of the present invention, the method further comprises blending said ground material before depositing said ground material directly into at least one pre-formed tube.

In an embodiment of the present invention, the method further comprises guiding said ground material before depositing said ground material directly into at least one pre-formed tube.

In an embodiment of the present invention, the step of guiding said ground material comprises separating said ground material into large and small ground material; capturing said small ground material; and guiding said large ground material to be deposited directly into at least one pre-formed tube.

In an embodiment of the present invention, the method further comprises guiding said ground material before depositing said ground material directly into at least one pre-formed tube.

In an embodiment of the present invention, the method further comprises blending said ground material before guiding and depositing said ground material directly into at least one pre-formed tube.

In an embodiment of the present invention, the step of guiding said ground material comprises separating said ground material into large and small ground material; capturing said small ground material; and guiding said large ground material to be deposited directly into at least one pre-formed tube.

In accordance with another aspect of the present invention, there is provided an apparatus comprising: a grinder configured to grind material; and a chamber communicatively connected to the grinder and configured to receive at least one pre-formed tube, wherein, in use, the material is ground in the grinder then deposited in the at least one pre-formed tube.

The apparatus provides a single structure for grinding material and filling, in one embodiment, at least one pre-formed tube with the ground material.

Further advantages of the present invention will become apparent to those skilled in the art from reading the following detailed description of the embodiments described and illustrated herein.

BRIEF DESCRIPTION OF THE DRAWINGS

The present invention will be further understood from the following detailed description of the embodiments with reference to the following drawings in which:

FIG. 1b is a partially exploded perspective view of the apparatus of FIG. 1a;

FIG. 1c is a front elevation view of the apparatus of FIG. 1a;

FIG. 1d is a side elevation view of the apparatus of FIG. 1a;

FIG. 1e is a plan view of the apparatus of FIG. 1a;

FIG. 2b is a bottom perspective view of the first grinding unit of FIG. 2a;

FIG. 2c is a top plan view of the first grinding unit of FIG. 2a;

FIG. 2d is a front elevation view of the first grinding unit of FIG. 2a;

FIG. 2e is a bottom plan view of the first grinding unit of FIG. 2a;

FIG. 3b is a bottom perspective view of the second grinding unit of FIG. 3a;

FIG. 3c is a top plan view of the seconding grinding unit of FIG. 3a;

FIG. 3d is a bottom plan view of the seconding grinding unit of FIG. 3a;

FIG. 3e is a front elevation view of the seconding grinding unit of FIG. 3a;

FIG. 4a is perspective view of a sleeve of the apparatus of FIG. 1;

FIG. 4b is a top plan view of the sleeve of FIG. 4a;

FIG. 4c is a front elevation view of the sleeve of FIG. 4a;

FIG. 5b is a bottom perspective view of the magnet assembly of FIG. 5a;

FIG. 5c is a top plan view of the magnet assembly of FIG. 5a;

FIG. 5d is a bottom plan view of the magnet assembly of FIG. 5a;

FIG. 5e is a front elevation view of the magnet assembly of FIG. 5a;

FIG. 6a a top perspective view of a filter of the apparatus of FIG. 1a;

FIG. 6b is a bottom perspective view of the filter of FIG. 6a;

FIG. 6c is a bottom plan view of the filter of FIG. 6a;

FIG. 6d is a front elevation view of the filter of FIG. 6a;

FIG. 7a is a top perspective view of a seat of the apparatus of FIG. 1a;

FIG. 7b is a bottom perspective view of the seat of FIG. 7a;

FIG. 7c is a top plan view of the seat of FIG. 7a;

FIG. 7d is a bottom plan view of the seat of FIG. 7a;

FIG. 7e is a front elevation view of the seat of FIG. 7a;

FIG. 8a is a top perspective view of a valve layer of the apparatus of FIG. 1a;

FIG. 8c is a top perspective view of a one-way valve of the valve layer of FIG. 8a;

FIG. 9a is a perspective view of a cylinder of the apparatus of FIG. 1a;

FIG. 9b is a plan view of the cylinder of FIG. 9a;

FIG. 9c is a front elevation view of the cylinder of FIG. 9a;

FIG. 9d is a cross-sectional side elevation view of the cylinder of FIG. 9a taken along the section line J-J of FIG. 9c;

FIG. 9e is a perspective view of a pre-formed tube for use in the apparatus in accordance with an aspect of the invention;

FIG. 10a is a top perspective view of a connector of the apparatus of FIG. 1a;

FIG. 10b is a bottom perspective view of the connector of FIG. 10a;

FIG. 10c is a top plan view of the connector of FIG. 10a;

FIG. 10d is a bottom plan view of the connector of FIG. 10a;

FIG. 10e is a front elevation view of the connector of FIG. 10a;

FIG. 11a is a top perspective view of a base of the apparatus of FIG. 1a;

FIG. 11b is a bottom perspective view of the base of the FIG. 11a;

FIG. 11c is a top plan view of the base of the FIG. 11a;

FIG. 11d is a bottom plan view of the base of the FIG. 11a;

FIG. 11e is a front elevation view of the base of the FIG. 11a;

FIG. 12a is a top perspective view of a plug base of the apparatus of FIG. 1a;

FIG. 12b is a bottom perspective view of the plug base of FIG. 12a;

FIG. 12c is a top plan view of the plug base of FIG. 12a;

FIG. 12e is a bottom plan view of the plug base of FIG. 12a;

FIG. 13a is a top perspective view of a plug of the apparatus of FIG. 1a;

FIG. 13b is a bottom perspective view of the plug of FIG. 13a;

FIG. 13c is a top plan view of the plug of FIG. 13a;

FIG. 13d is a bottom plan view of the plug of FIG. 13a;

FIG. 13e is a front elevation view of the plug of FIG. 13a;

FIG. 14a a perspective view a case of the apparatus of FIG. 1a;

FIG. 14b is a side elevation view of the case of FIG. 14a;

FIG. 14c is a front elevation view of the case of FIG. 14a;

FIG. 14e is a perspective view of a window of the apparatus of FIG. 1a;

FIG. 15a is a top perspective view of a storage connector of the apparatus of FIG. 1a;

FIG. 15b is a bottom perspective view of the storage connector of FIG. 15a;

FIG. 15c is a top plan view of the storage connector of FIG. 15a;

FIG. 15d is a bottom plan view of the storage connector of FIG. 15a;

FIG. 15e is a front elevation view of the storage connector of FIG. 15a;

FIG. 16a is a perspective view of a cleaning tool of the apparatus of FIG. 1a;

FIG. 16b is a plan view of the cleaning tool of FIG. 16a;

FIG. 16c is a partial exploded view of the area A of FIG. 16b;

FIG. 16d is a front elevation view of the cleaning tool of FIG. 16a;

FIG. 16e is a partial exploded view of the area B of FIG. 16d;

FIG. 16f is a side elevation view of the cleaning tool of FIG. 16a;

FIG. 17a is a top perspective view of a cap of the apparatus of FIG. 1a;

FIG. 17b is a bottom perspective view of the cap of FIG. 17a;

FIG. 17c is a plan view of the cap of FIG. 17a;

FIG. 17d is a front elevation view of the cap of FIG. 17a;

FIG. 18a is an exploded perspective view of a stuffer in accordance with an aspect of the invention;

FIG. 18b is a perspective view of the stuffer of FIG. 18a;

FIG. 18c is a plan view of the stuffer of FIG. 18a;

FIG. 18d is a cross-sectional front elevation view of the stuffer of FIG. 18a taken along section line M-M of FIG. 18c;

FIG. 19b is a plan view of the support of FIG. 19a;

FIG. 21a is a top perspective view of a seat of the apparatus of FIG. 20;

FIG. 21b is a bottom perspective view of the seat of FIG. 21a;

FIG. 21c is a front elevation view of the seat of FIG. 21a;

FIG. 21d is a top plan view of the seat of FIG. 21a;

FIG. 21e is a bottom plan view of the seat of FIG. 21a;

FIG. 21f is a cross-sectional front elevation view of the seat of FIG. 21a taken along section line K-K of FIG. 21e;

FIG. 22b is a front elevation view of the sleeve of FIG. 22a;

FIG. 22c is a top plan view of the sleeve of FIG. 22a;

FIG. 22d is a bottom plan view of the sleeve of FIG. 22a;

FIG. 23b is bottom perspective view of the one-way valve of FIG. 23a;

FIG. 23c is front elevation view of the one-way valve of FIG. 23a;

FIG. 23d is a plan view of the one-way valve of FIG. 23a;

FIG. 23e is a cross-sectional front elevation view of the one-way valve of FIG. 23a taken along section line K-K of FIG. 23d;

FIG. 24a is a top perspective view of an upper chamber connector of the apparatus of FIG. 20;

FIG. 24b is a bottom perspective view of the upper chamber connector of FIG. 24a;

FIG. 24c is a front elevation view of the upper chamber connector of FIG. 24a;

FIG. 24d is a bottom plan view of the upper chamber connector of FIG. 24a;

FIG. 24e is a top plan view of the upper chamber connector of FIG. 24a;

FIG. 24f is a cross-sectional front elevation view view of the upper chamber connector of FIG. 24a taken along section line O-O of FIG. 24e;

FIG. 25a is a top perspective view of an lower chamber connector of the apparatus of FIG. 20;

FIG. 25b is a bottom perspective view of the lower chamber connector of FIG. 25a;

FIG. 25c is a front elevation view of the lower chamber connector of FIG. 25a;

FIG. 25d is a bottom plan view of the lower chamber connector of FIG. 25a;

Figure 1:
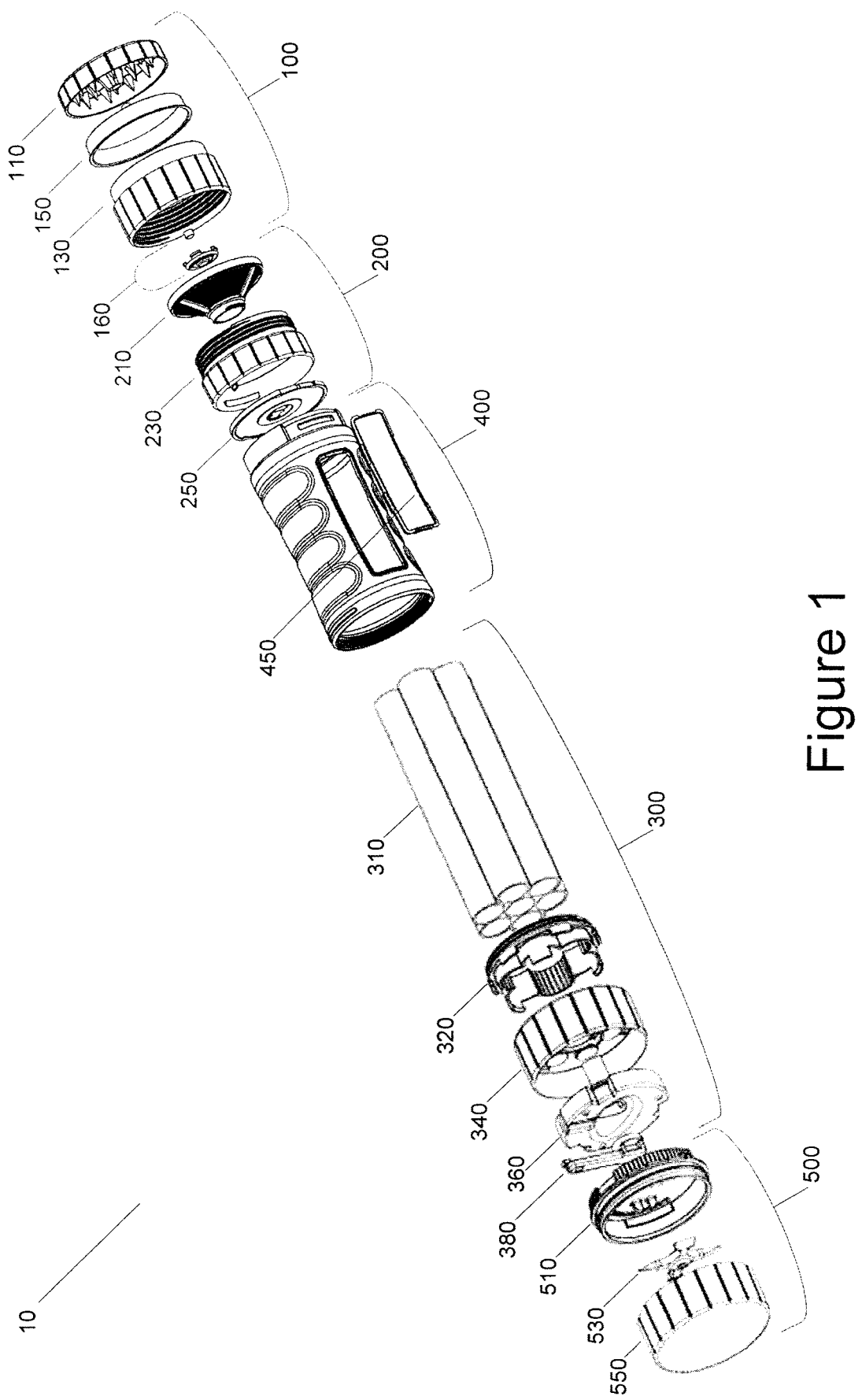
FIG. 1 is an exploded perspective view of an apparatus in accordance with an aspect of the invention.
Figure 1B:
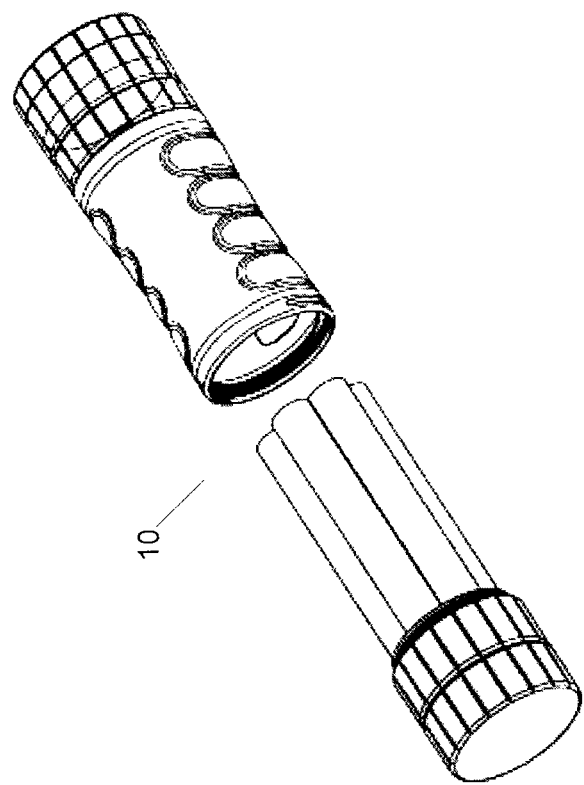
Figure 1A:
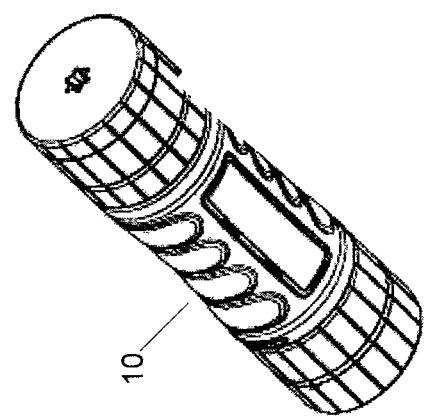
FIG. 1a is a perspective view of the apparatus of FIG. 1 as assembled.
Figure 1F:
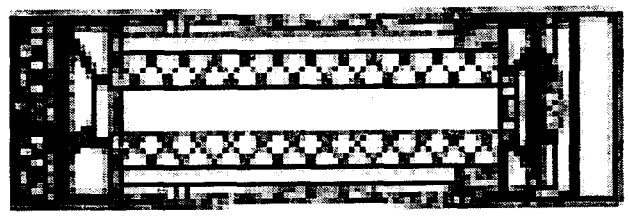
FIG. 1f is a cross-sectional front elevation view of the apparatus of FIG. 1a taken along the section line A-A of FIG. 1e.
Figure 1D:
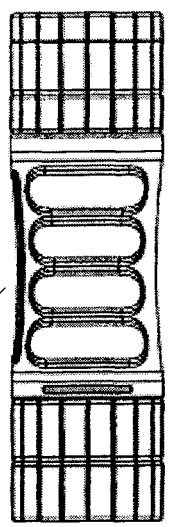
Figure 1E:
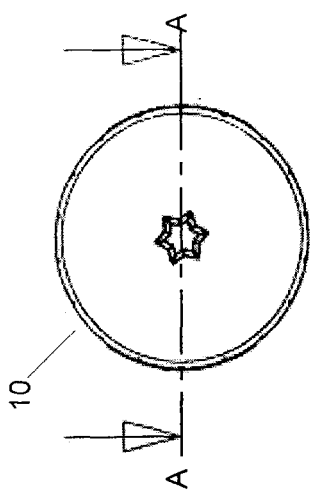
Figure 1C:
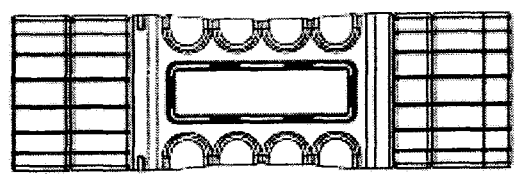
Figure 2C:
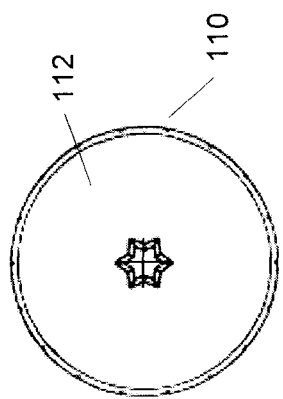
Figure 2F:
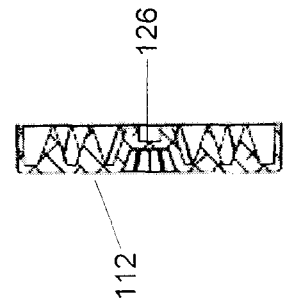
FIG. 2f is a cross-sectional side elevation view of the first grinding unit of FIG. 2a taken along the section line J-J of FIG. 2e.
Figure 2B:
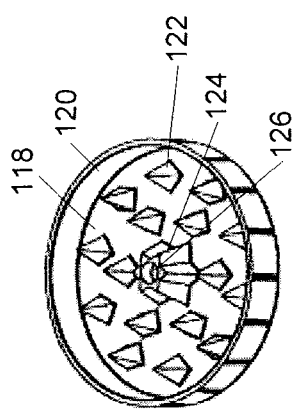
Figure 2E:
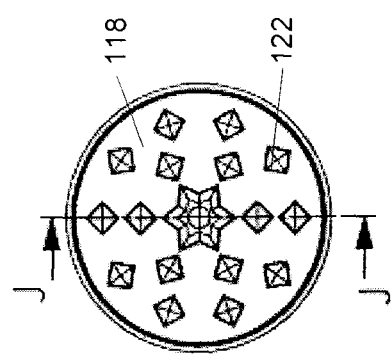
Figure 2A:
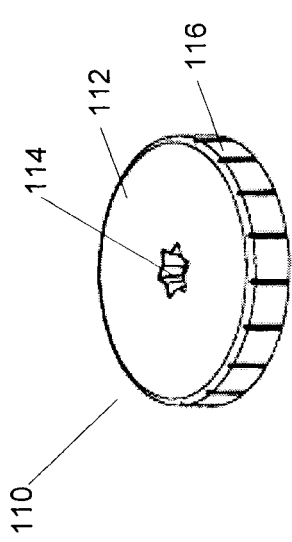
FIG. 2a is a top perspective view of a first grinding unit of the apparatus of FIG. 1.
Figure 2D:
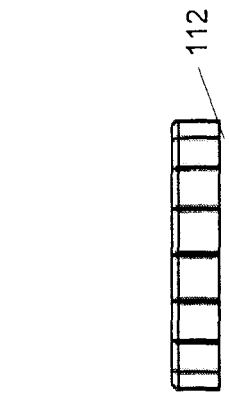
Figure 3C:
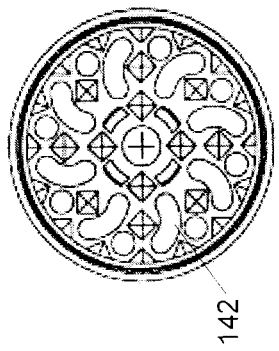
Figure 3F:
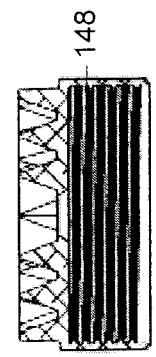
FIG. 3f is a cross-sectional side elevation view of the seconding grinding unit of FIG. 3a taken along the section line K-K of FIG. 3e.
Figure 3B:
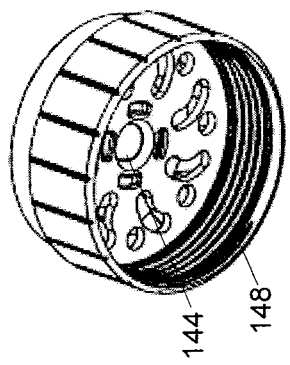
Figure 3E:
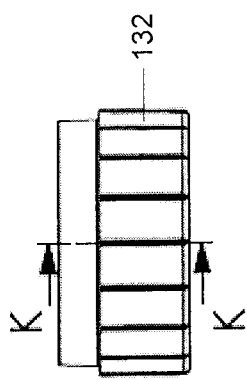
Figure 3A:
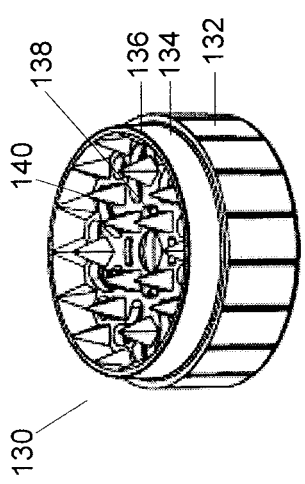
FIG. 3a is a perspective view of a second grinding unit of the apparatus of FIG. 1.
Figure 3D:
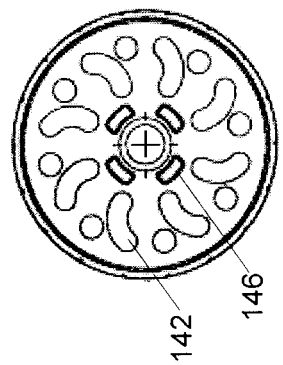
Figure 5C:
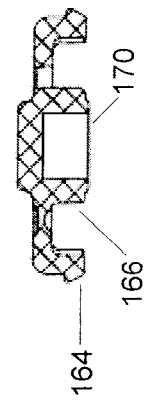
Figure 5F:
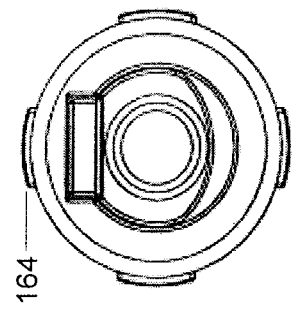
FIG. 5f is a cross-sectional side elevation view of the magnet assembly of FIG. 5a taken along the section line J-J of FIG. 5e.
Figure 5B:
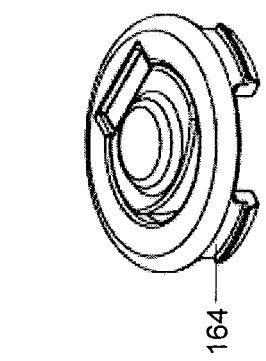
Figure 5E:
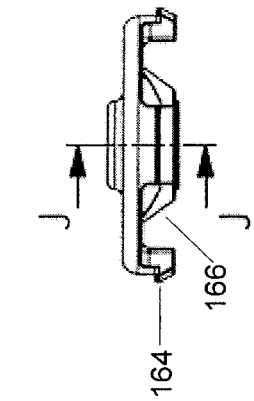
Figure 5A:
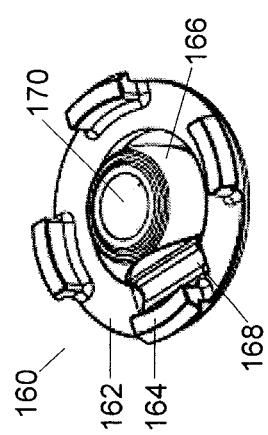
FIG. 5a is a top perspective view of a magnet assembly of the apparatus of FIG. 1.
Figure 5D:
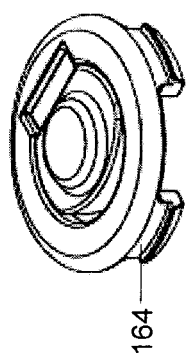
Figure 6C:
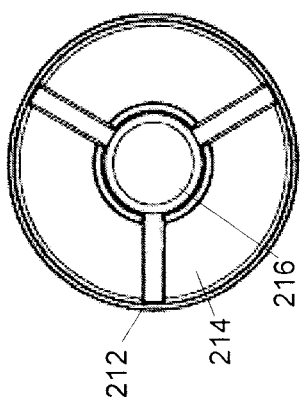
Figure 6B:
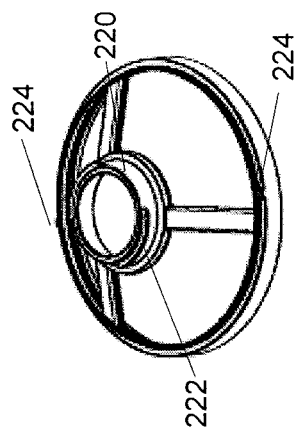
Figure 6A:
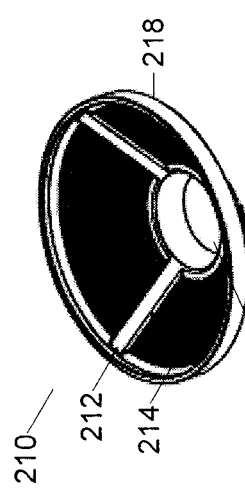
Figure 6E:
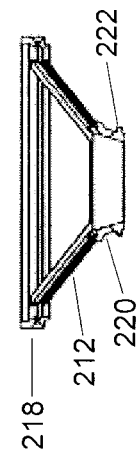
FIG. 6e is a side elevation view of the filter of FIG. 6a taken along the section line J-J of FIG. 6d.
Figure 6D:
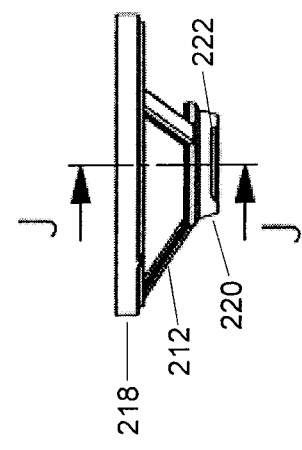
Figure 7C:
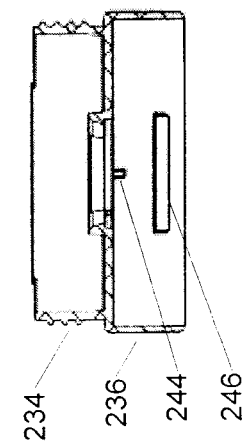
Figure 7B:
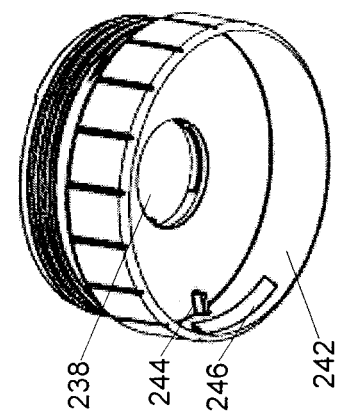
Figure 7A:
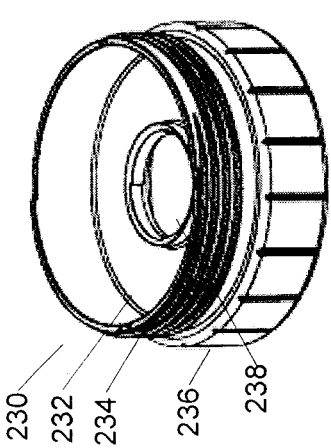
Figure 7F:
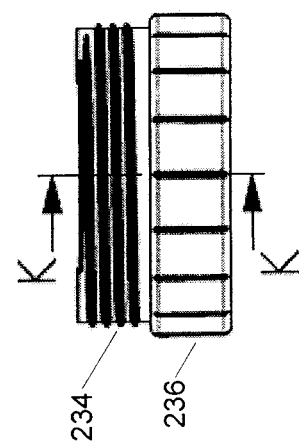
FIG. 7f is a cross-sectional side elevation view of the seat of FIG. 7a taken along the section line K-K of FIG. 7e.
Figure 7E:
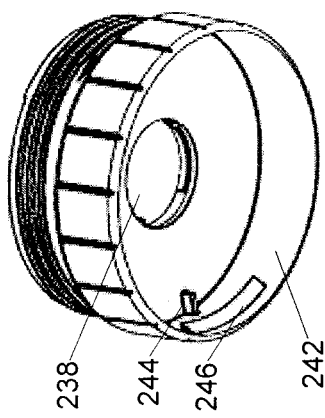
Figure 7D:
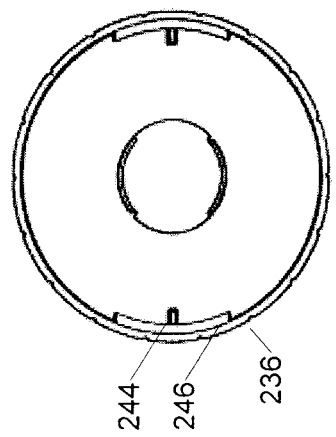
Figure 20:
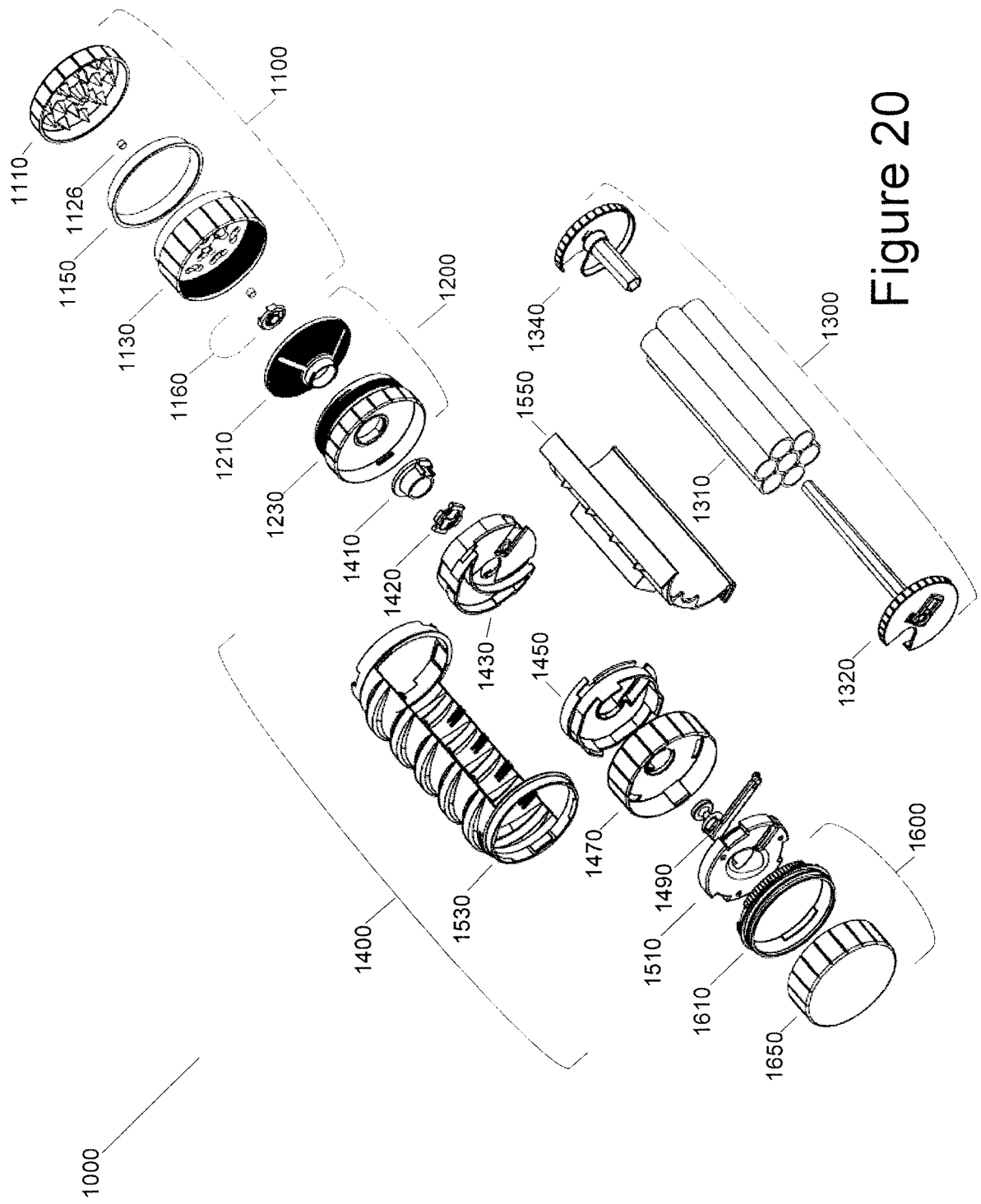
FIG. 20 is an exploded perspective view of an embodiment of an apparatus in accordance with an aspect of the invention.
Figure 26C:
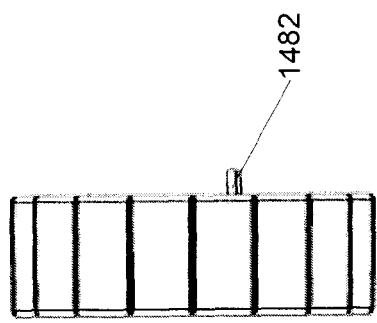
Figure 26E:
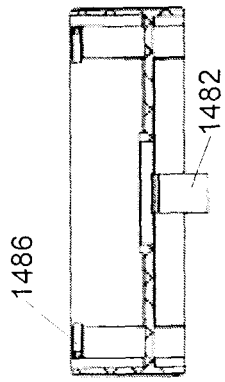
Figure 26B:
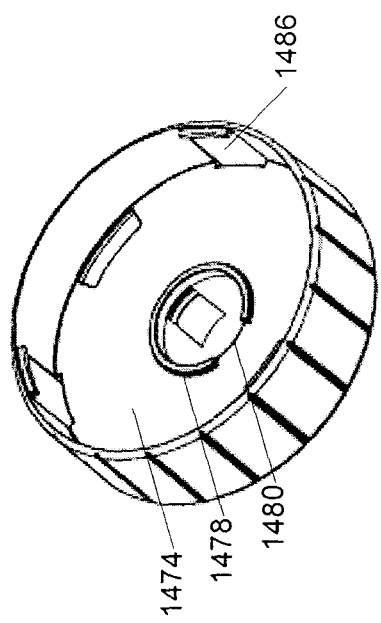
Figure 26A:
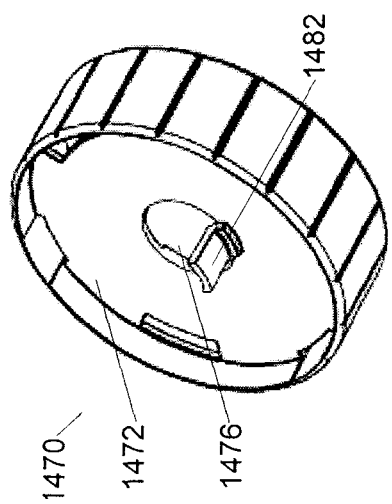
Figure 26D:
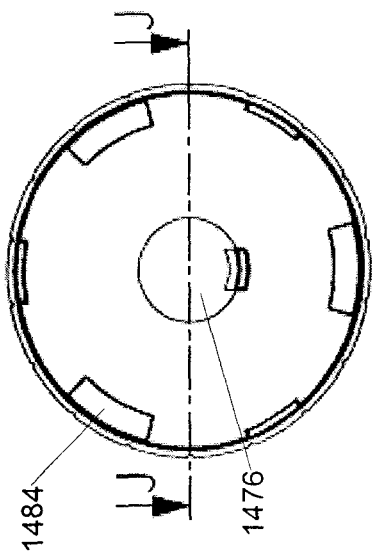
Figure 27B:
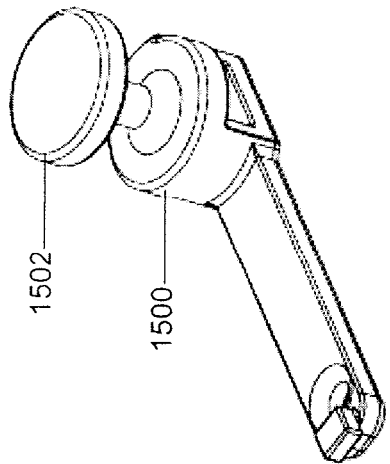
Figure 27D:
Figure 27A:
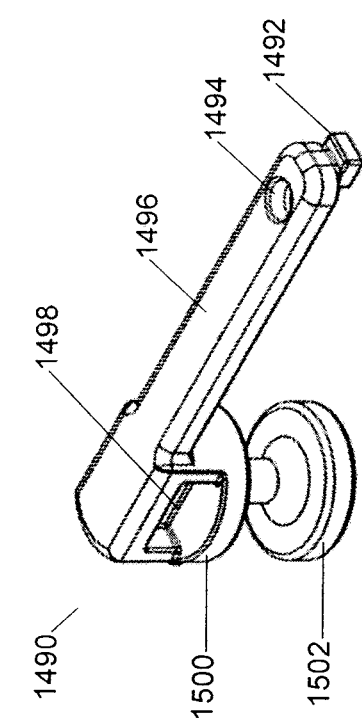
Figure 27C:
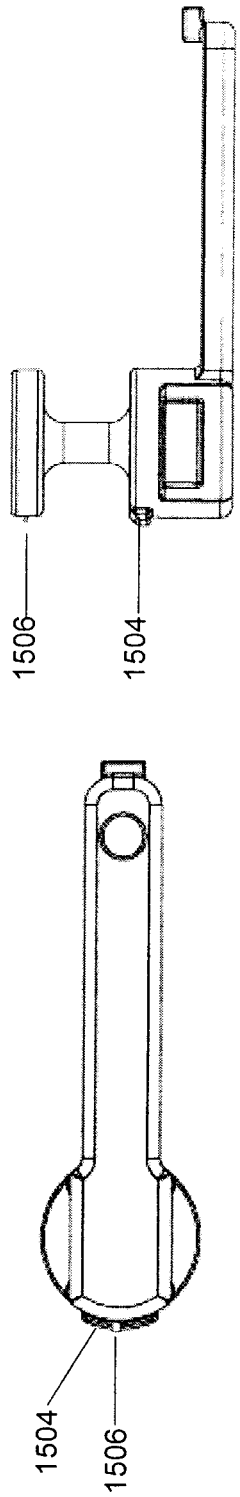
Figure 28C:
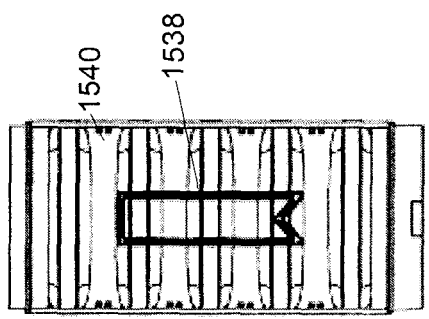
Figure 28F:
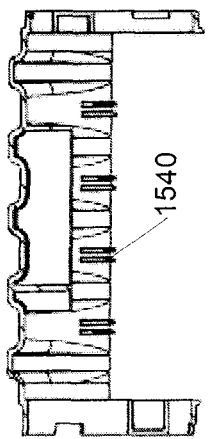
Figure 28B:
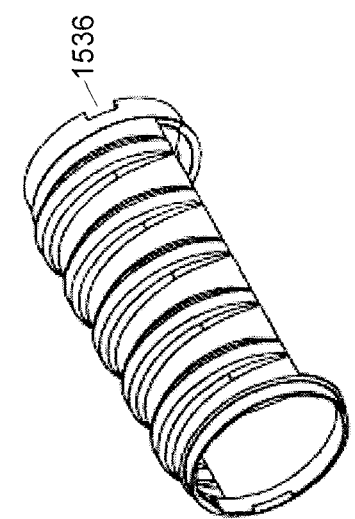
Figure 28E:
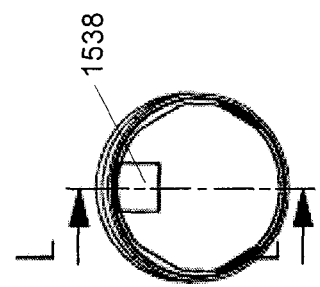
Figure 28A:
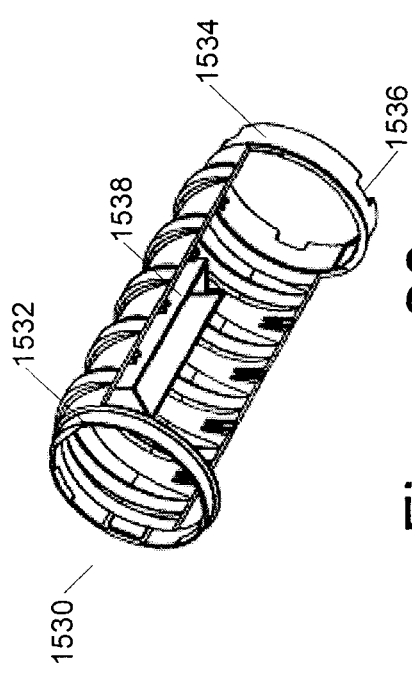
Figure 28D:
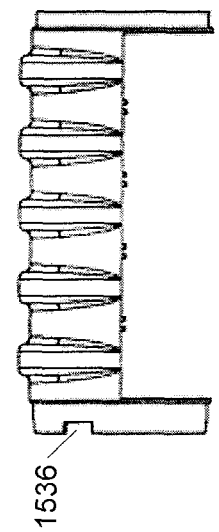
Figure 30B:
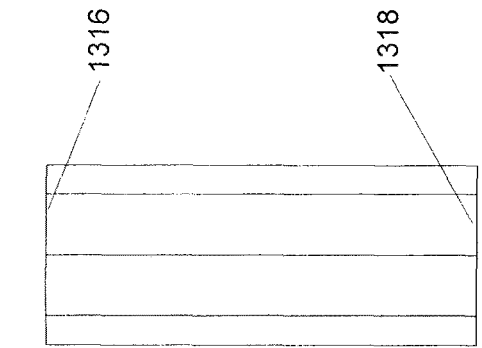
Figure 30D:
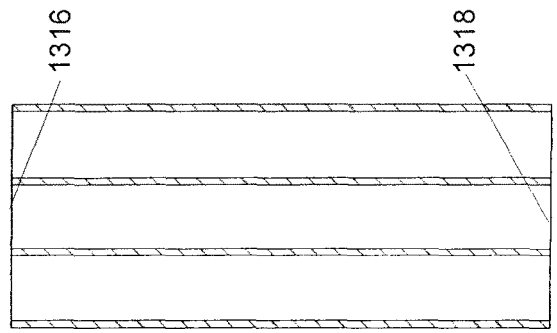
Figure 30A:
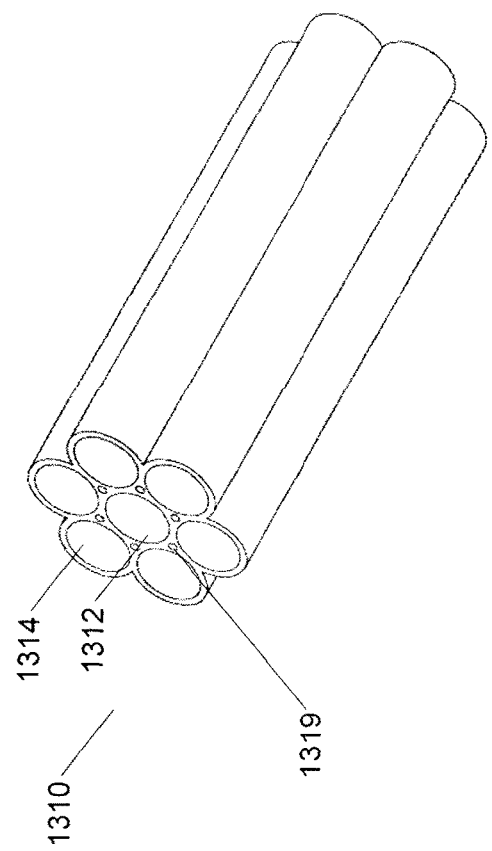
Figure 30C:
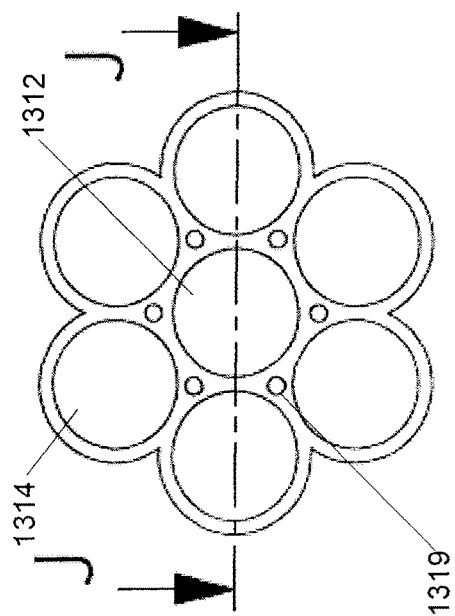
Figure 31B:
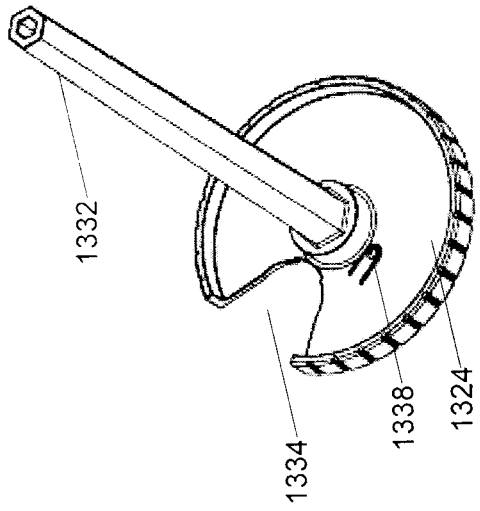
Figure 31D:
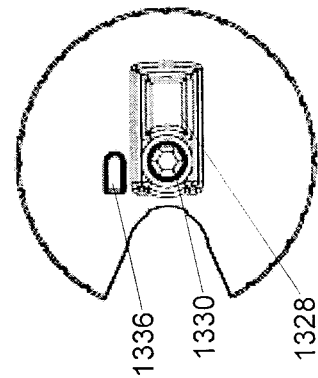
Figure 31A:
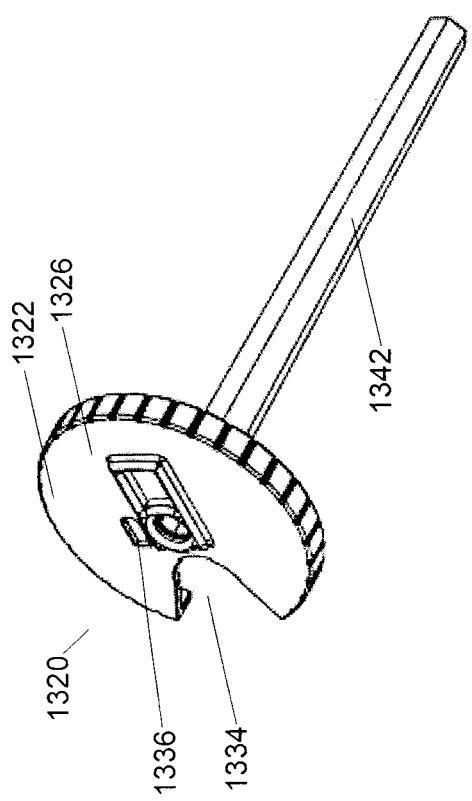
Figure 31C:
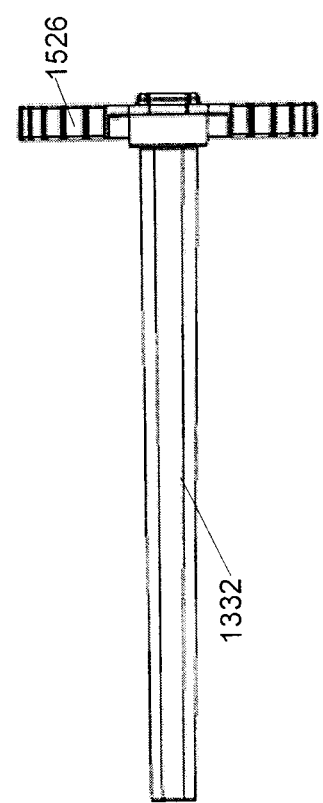
Figure 32B:
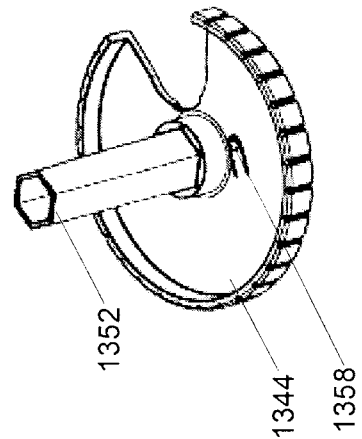
Figure 32D:
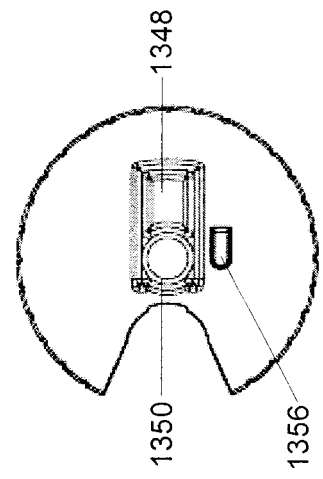
Figure 32A:
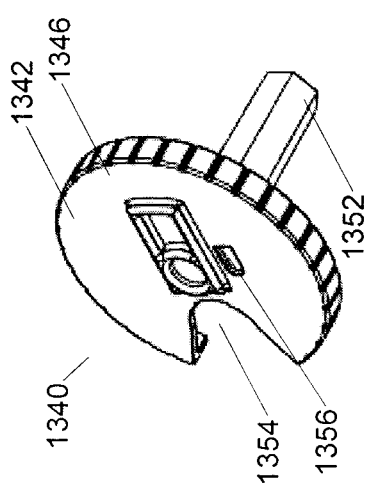
Figure 32C:
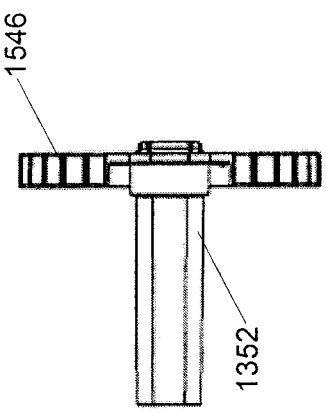
Figure 34B:
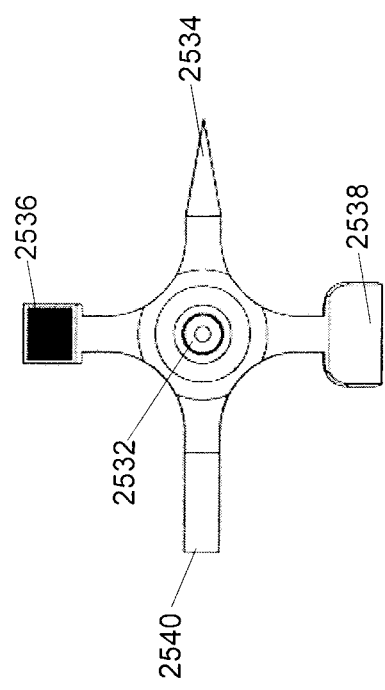
Figure 34D:
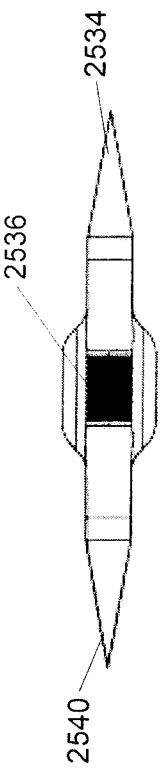
Figure 34A:
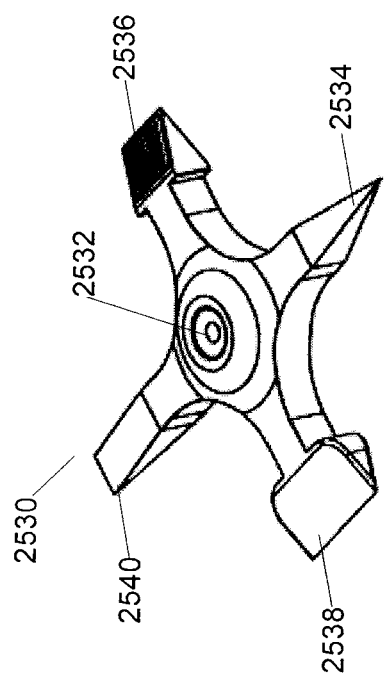
Figure 34C:
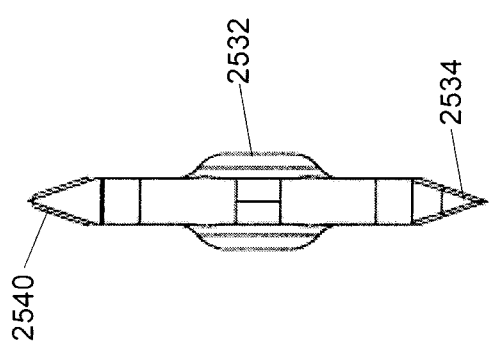
Figure 35:
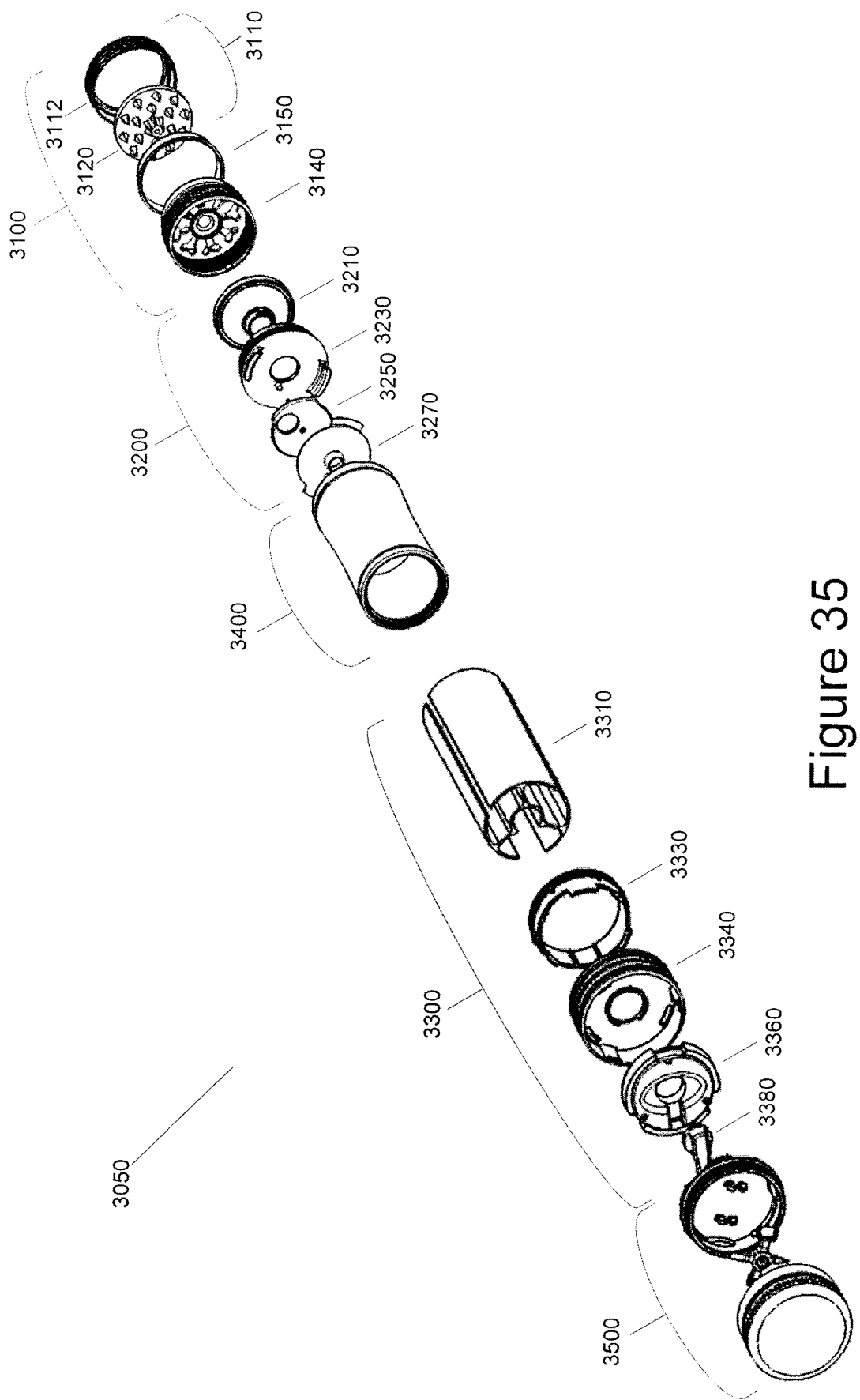
Figure 36A:
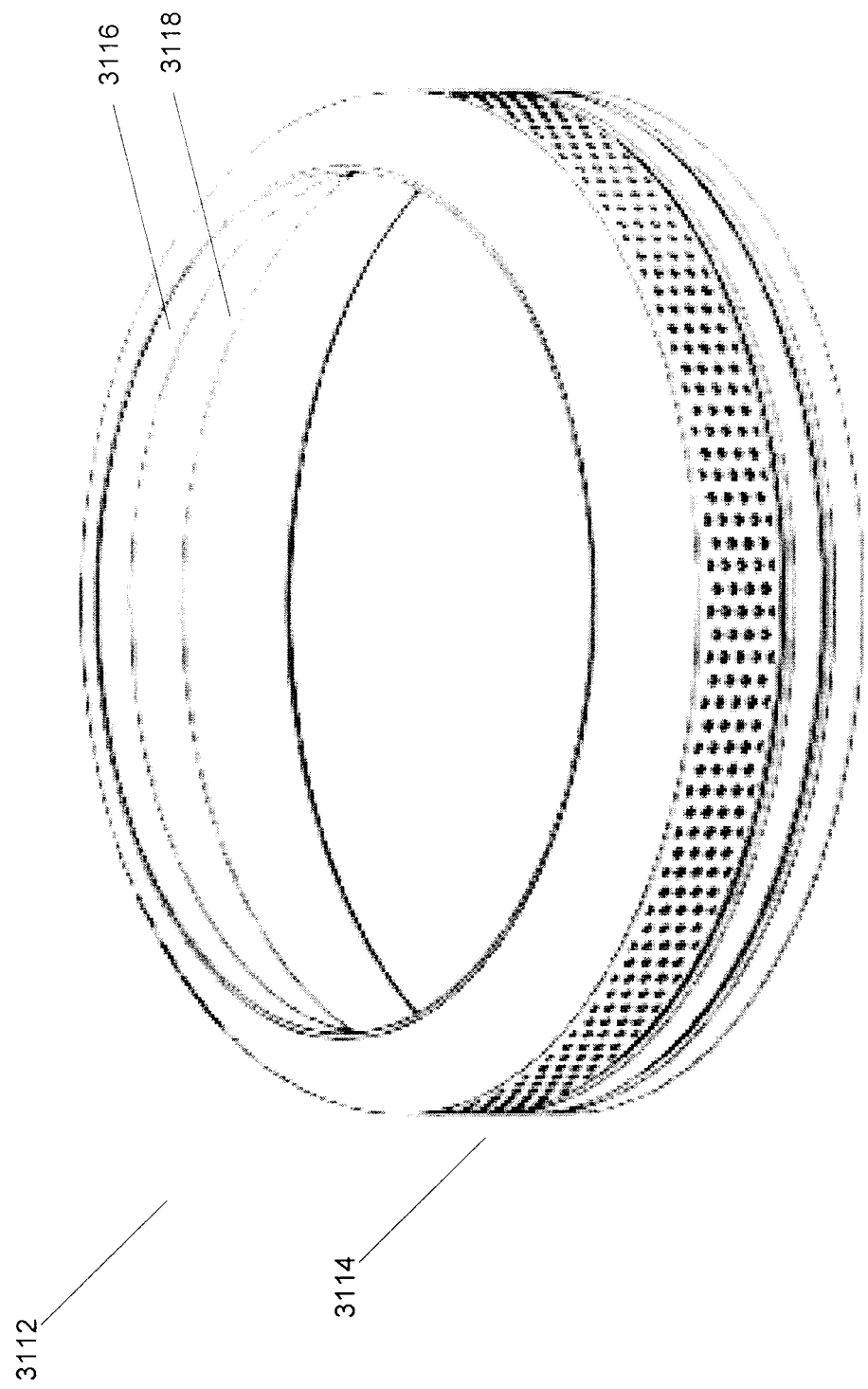
Figure 36C:
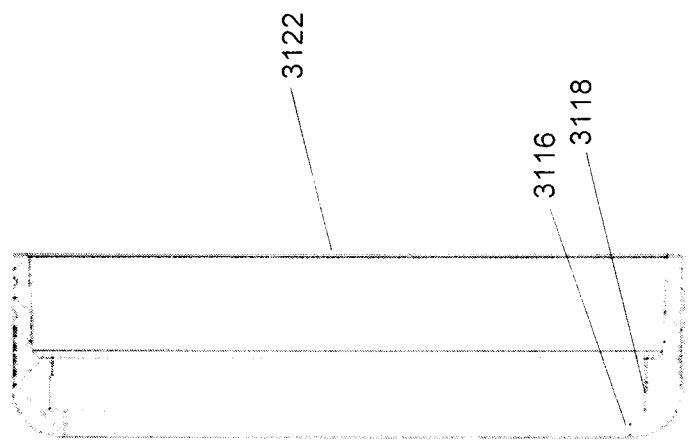
Figure 36B:
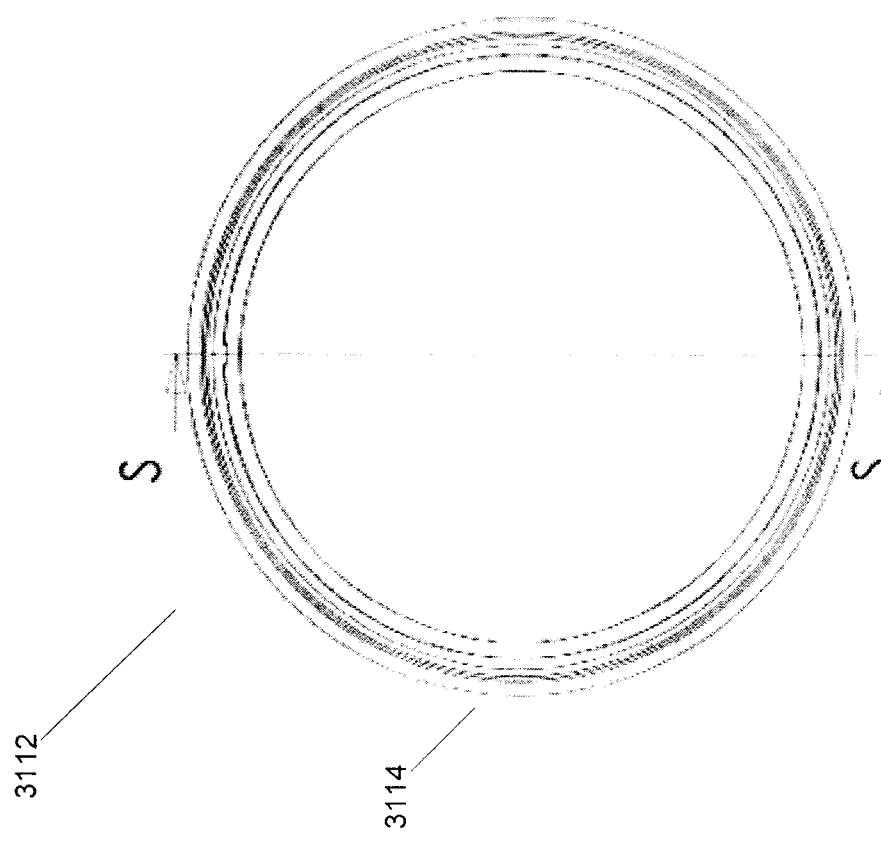
Figure 37B:
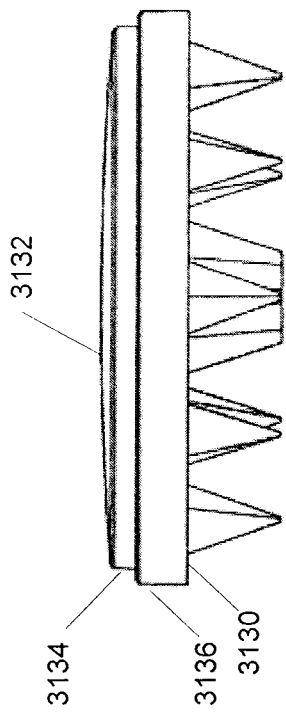
Figure 37D:
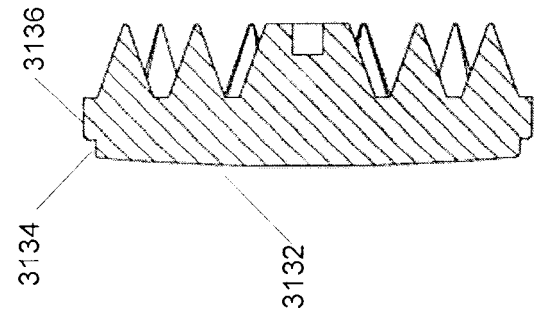
Figure 37A:
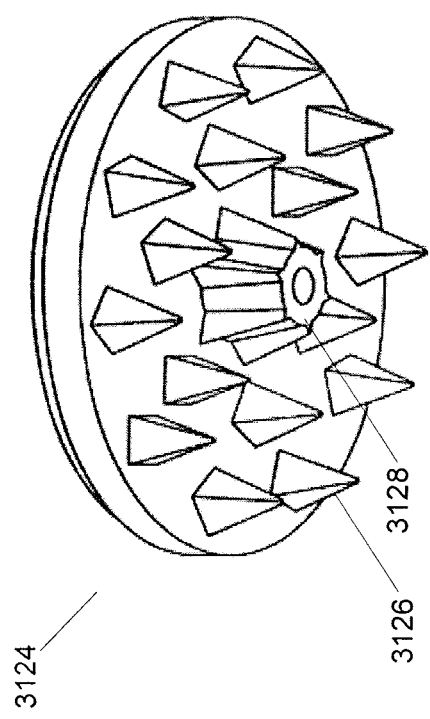
Figure 37C:
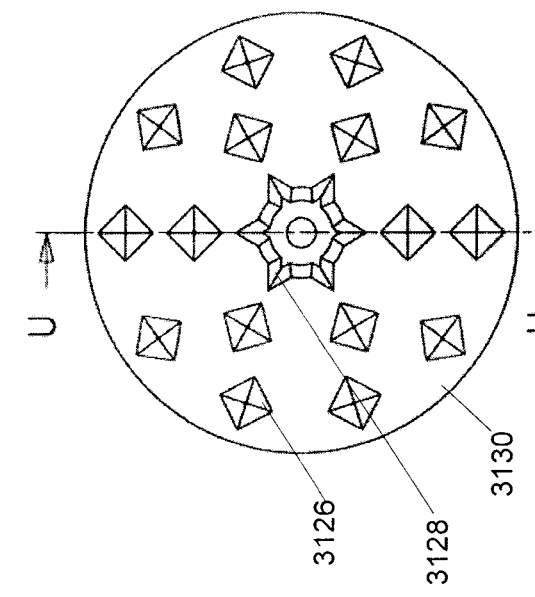
Figure 41B:
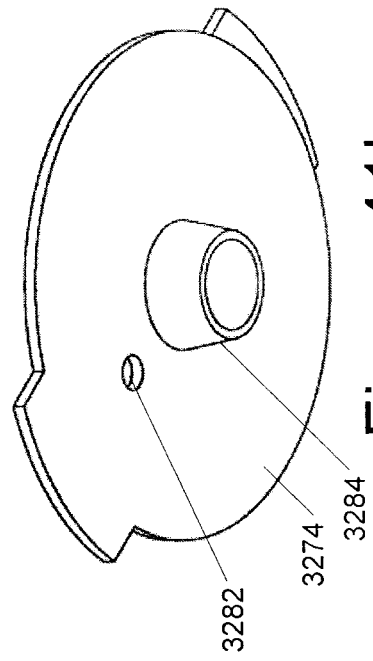
Figure 41D:
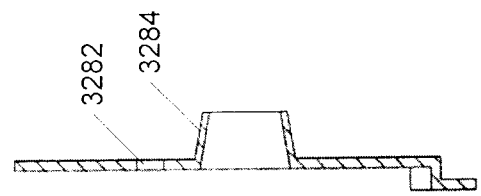
Figure 41A:
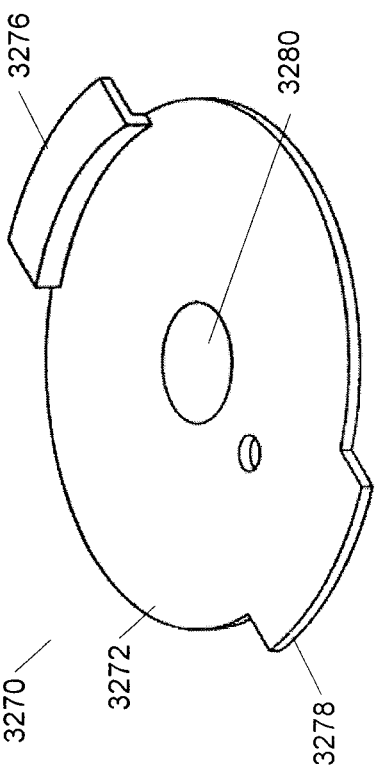
Figure 41C:
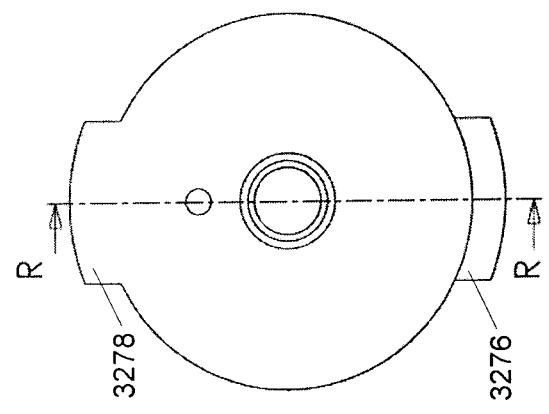
Figure 44C:
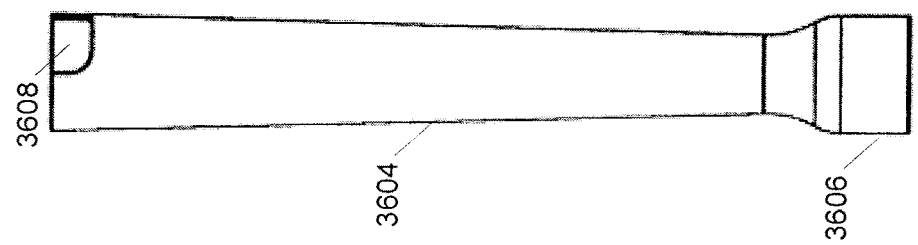
Figure 44B:
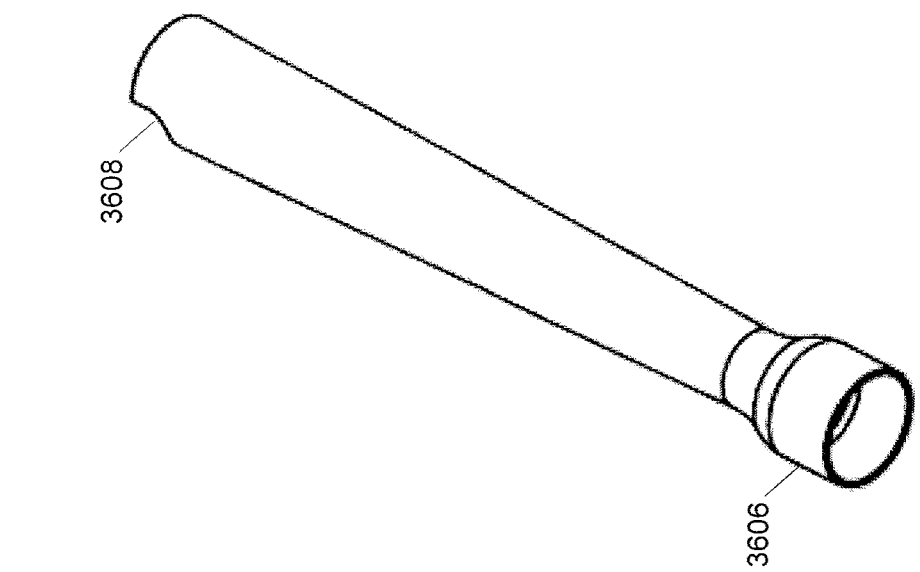
Figure 44A:
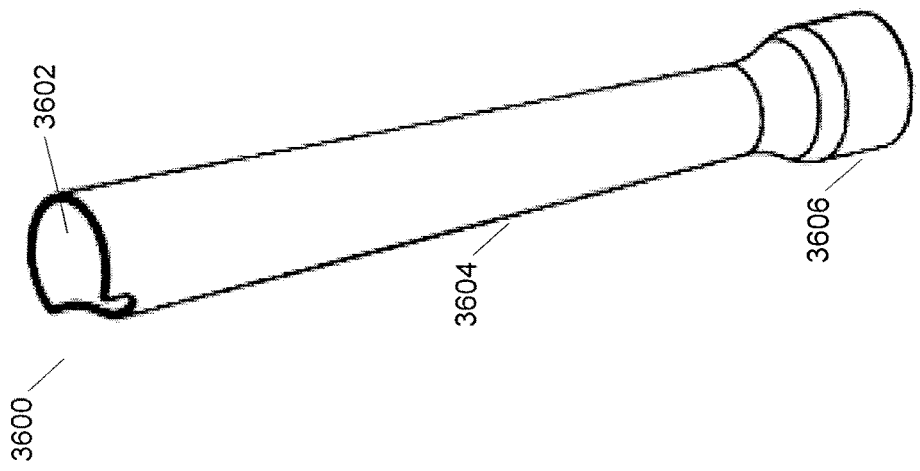
Figure 45A:
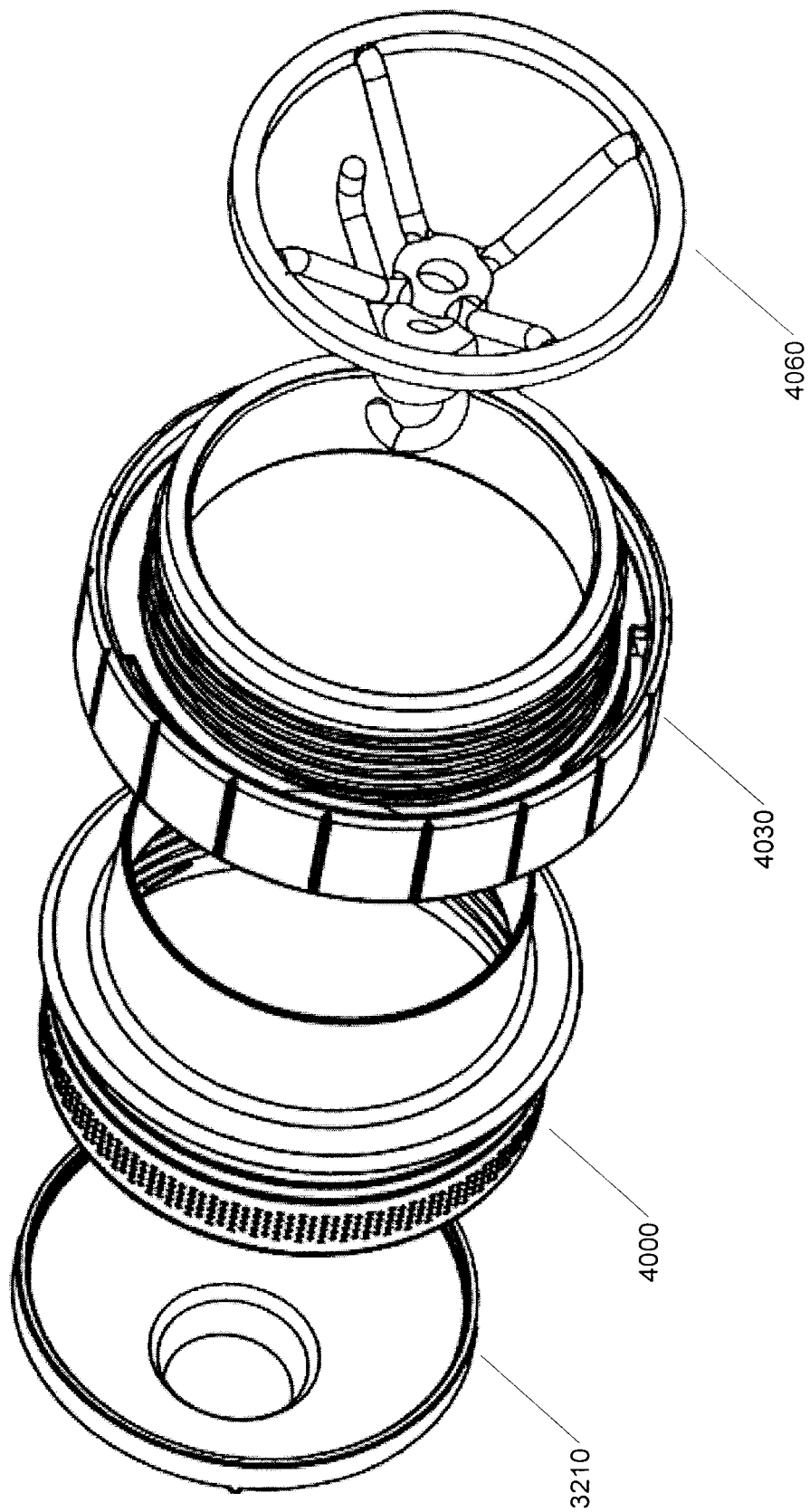
Figure 45C:
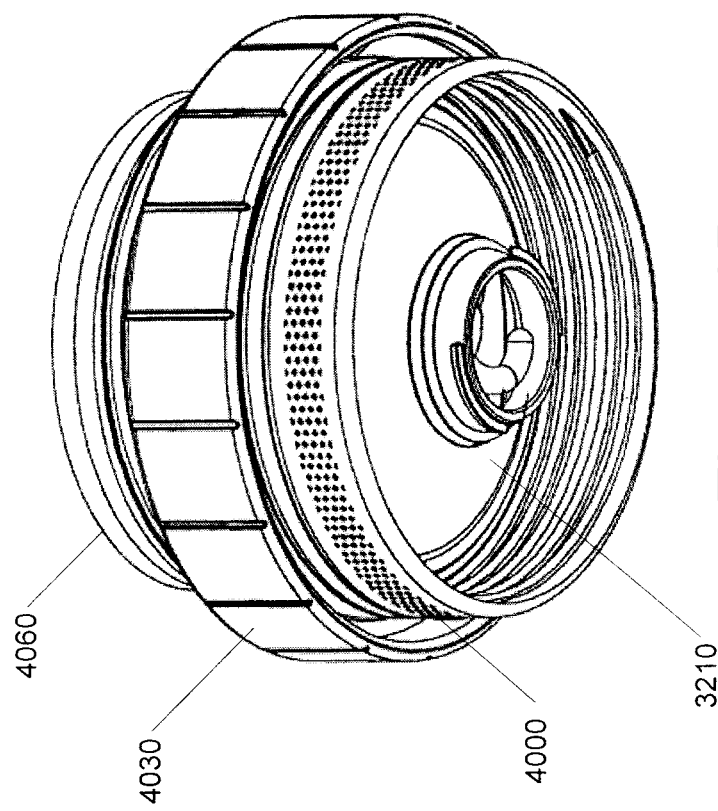
Figure 45B:
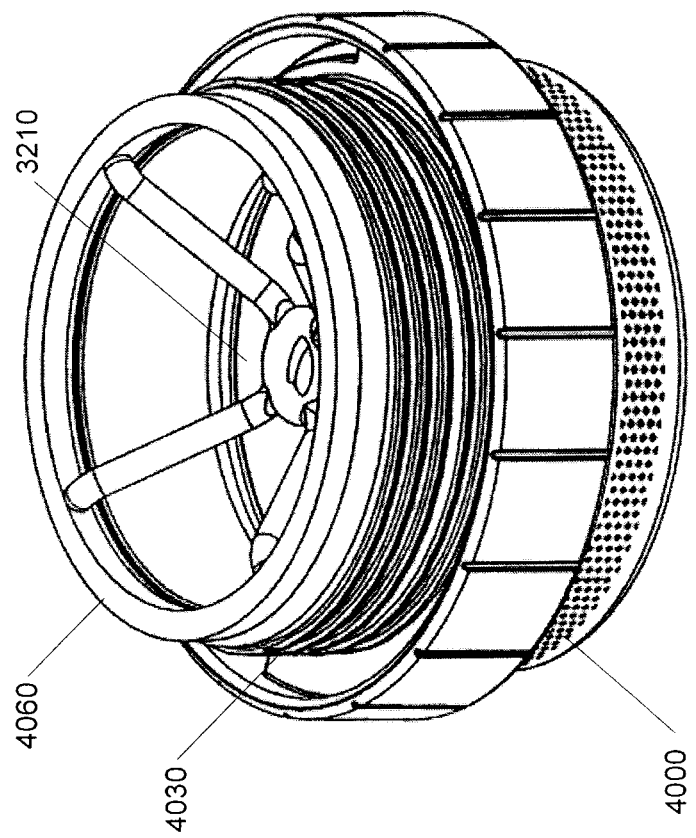
Figure 47B:
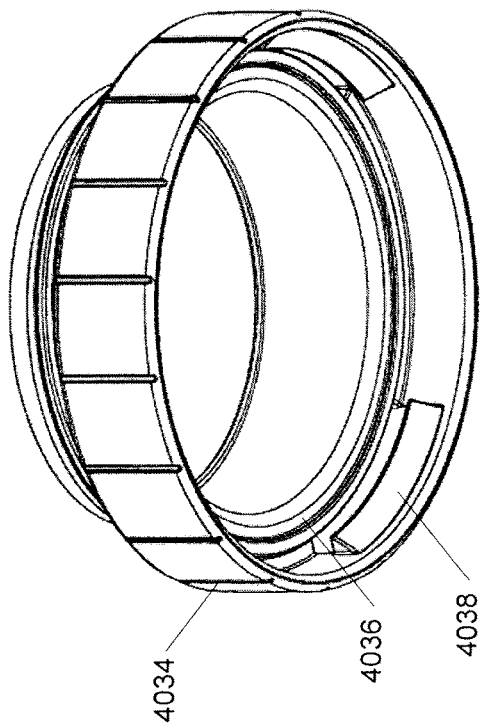
Figure 47D:
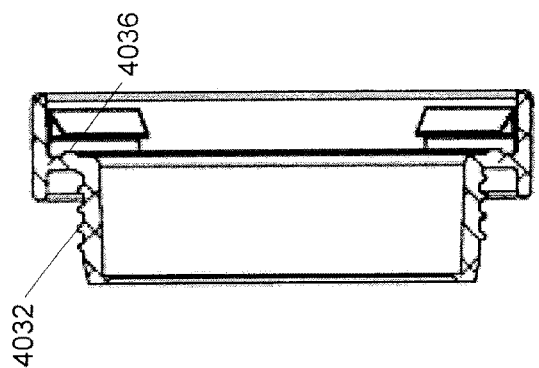
Figure 47A:
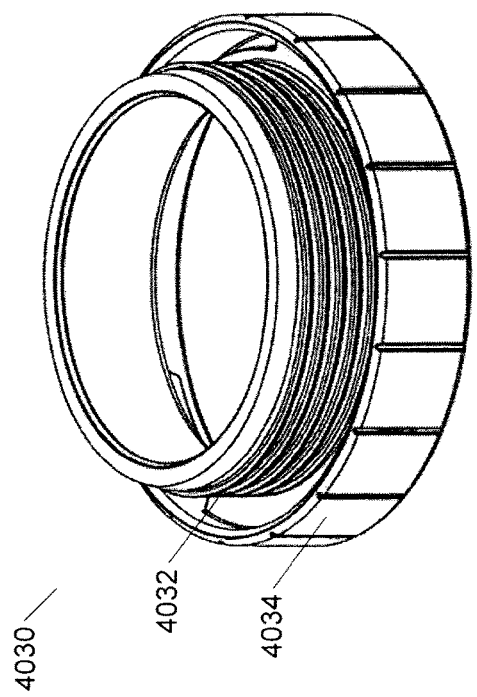
Figure 47C:
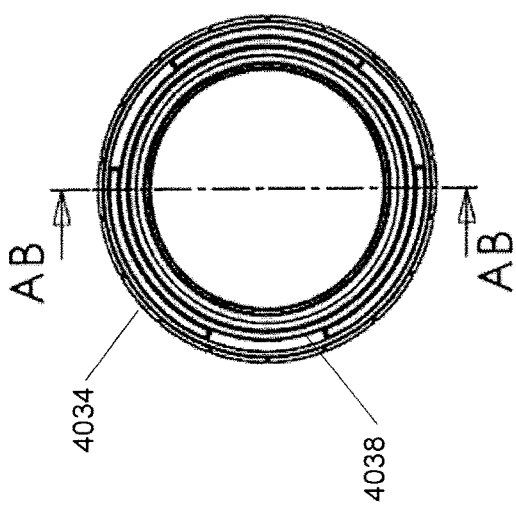
Figure 48B:
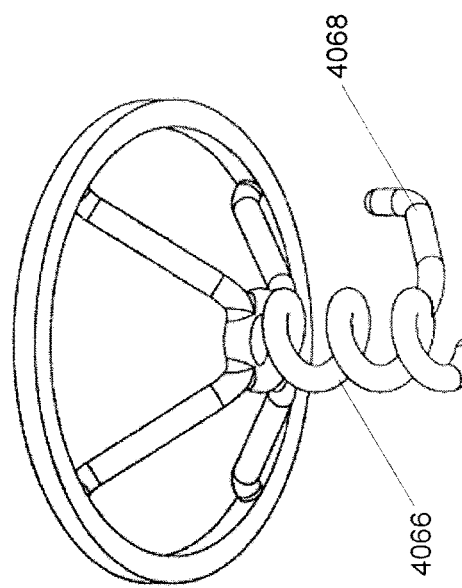
Figure 48E:
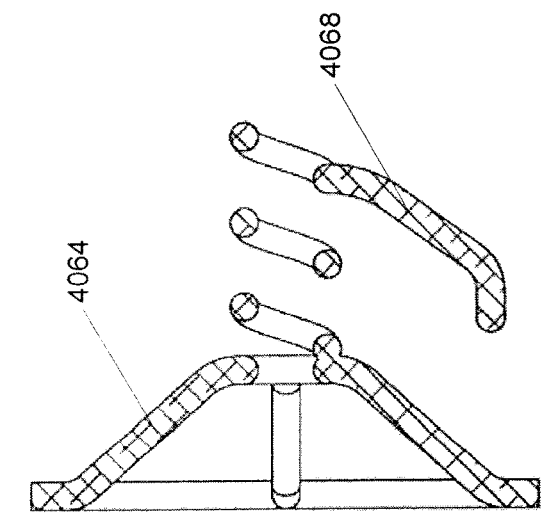
Figure 48D:
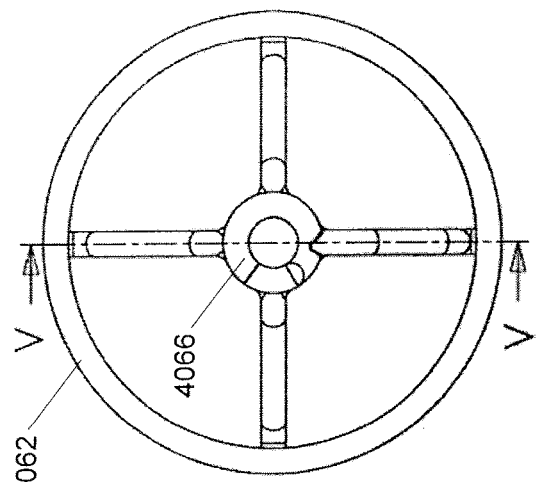
Figure 48A:
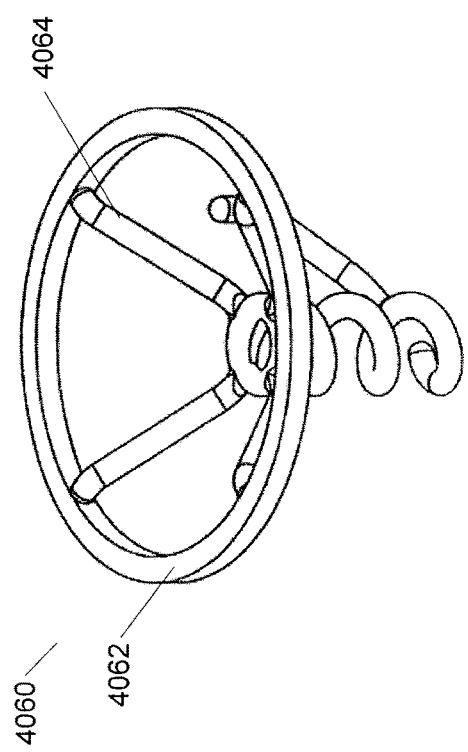
Figure 48C:
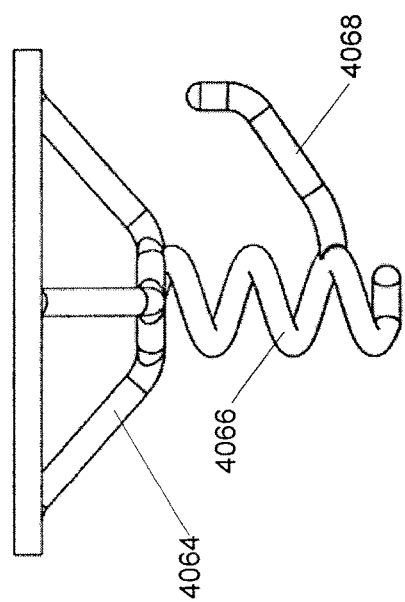
Figure 49:
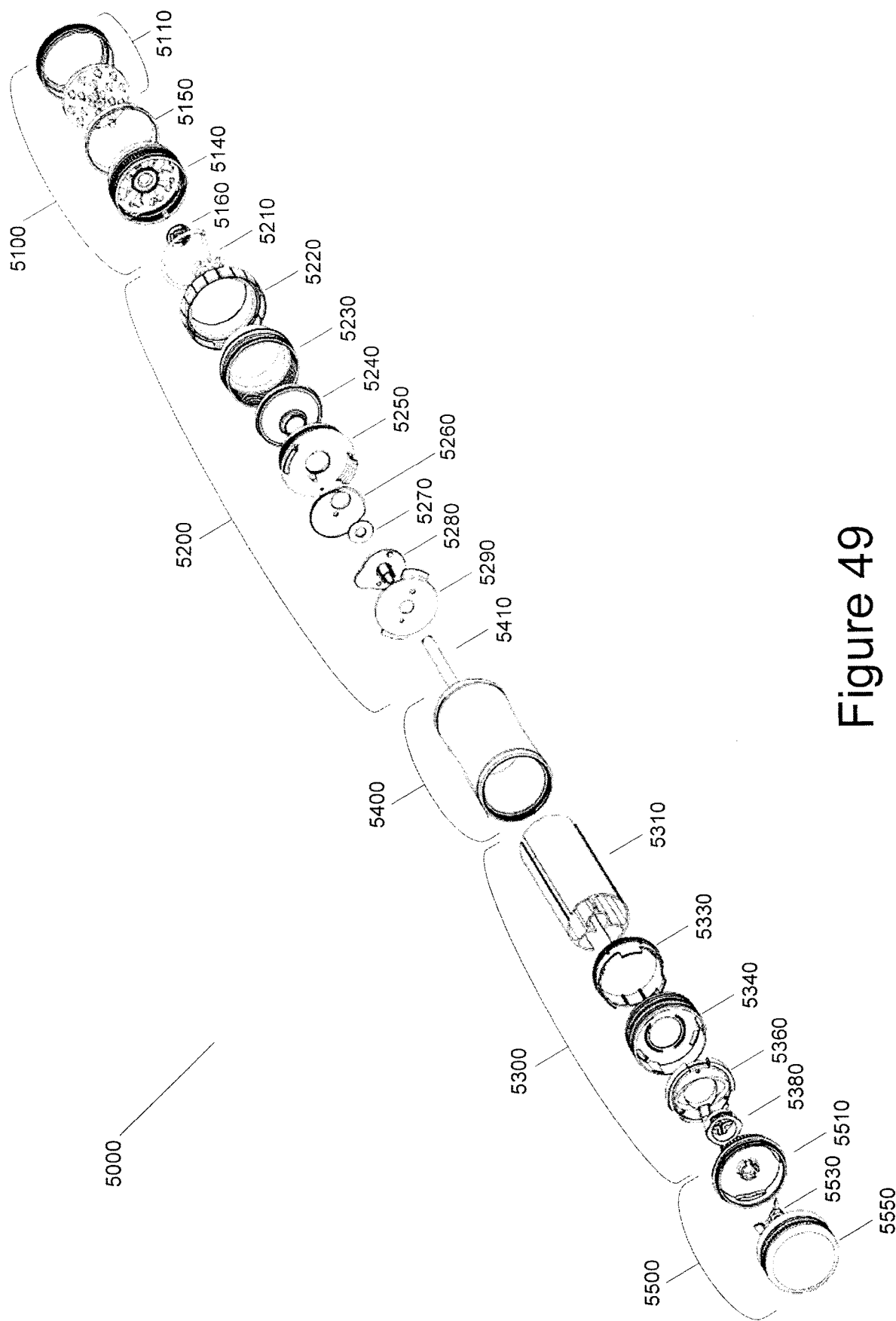
Figure 50B:
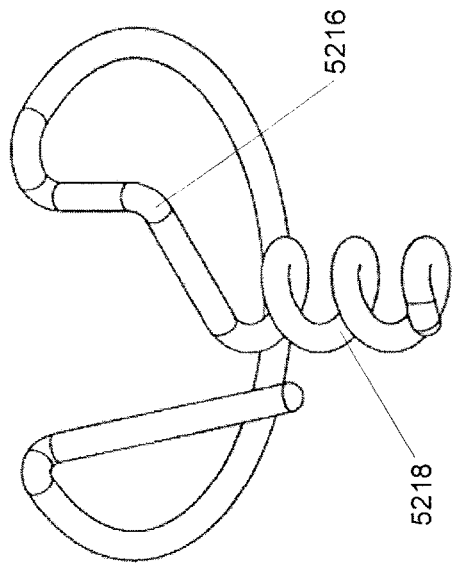
Figure 50E:
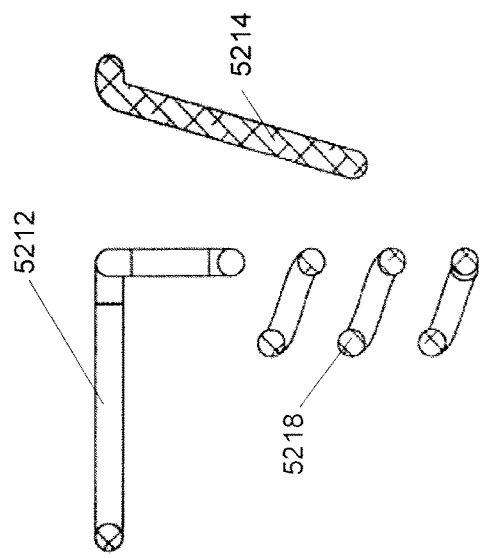
Figure 50D:
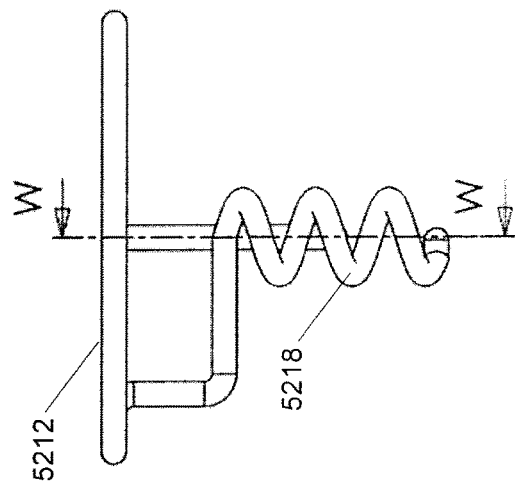
Figure 50A:
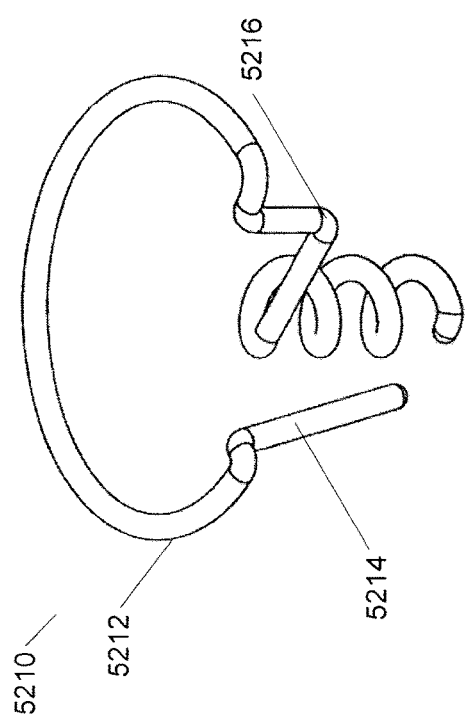
Figure 50C:
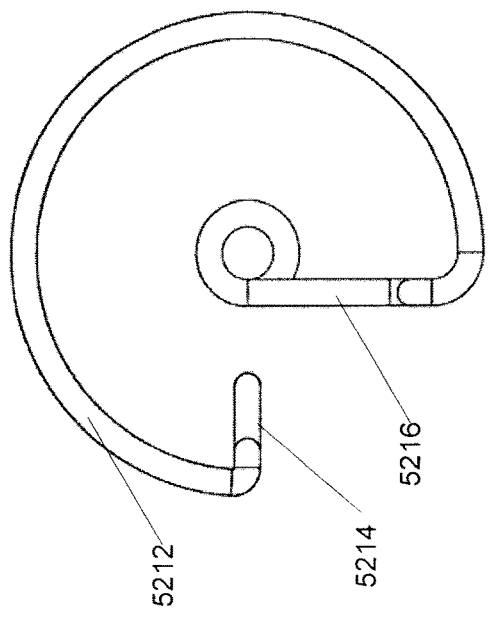
Figure 51B:
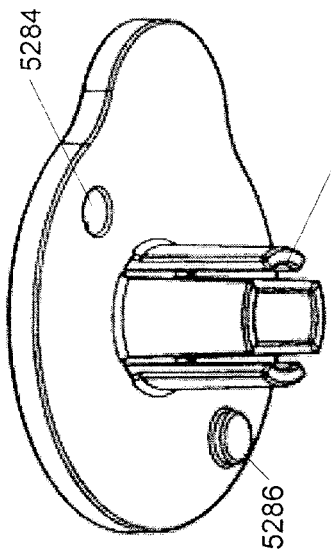
Figure 51D:
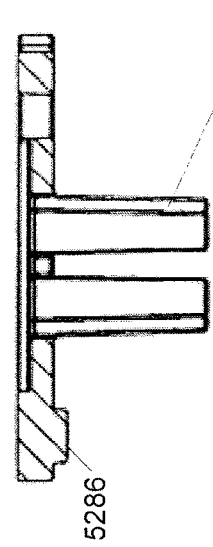
Figure 51A:
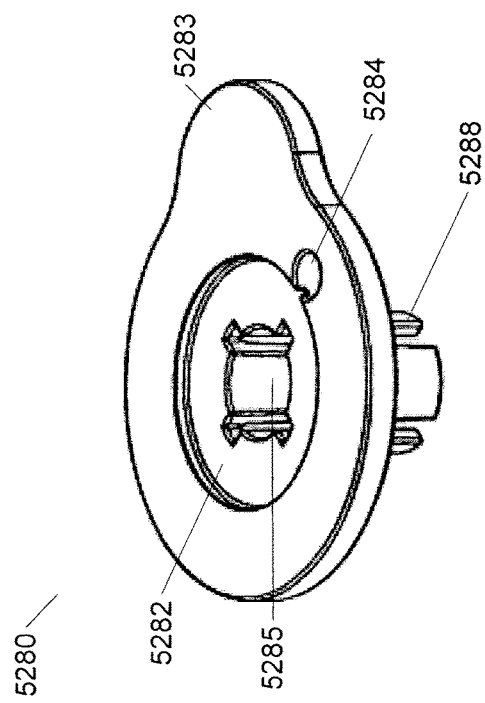
Figure 51C:
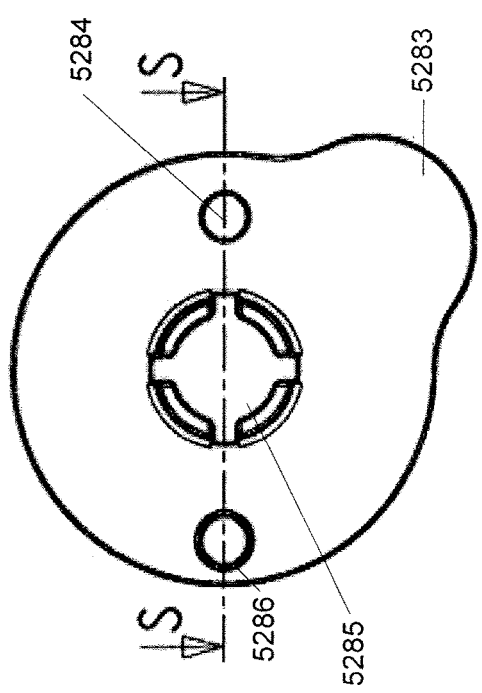
Figure 52B:
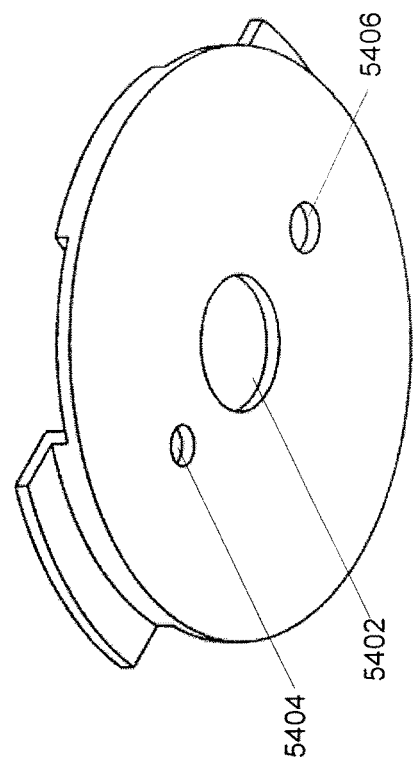
Figure 52D:
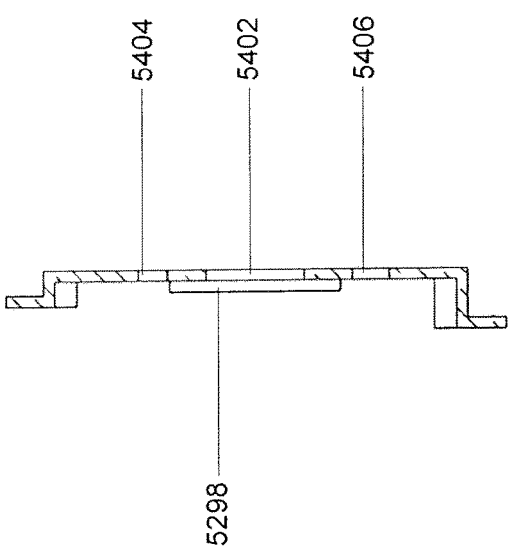
Figure 52A:
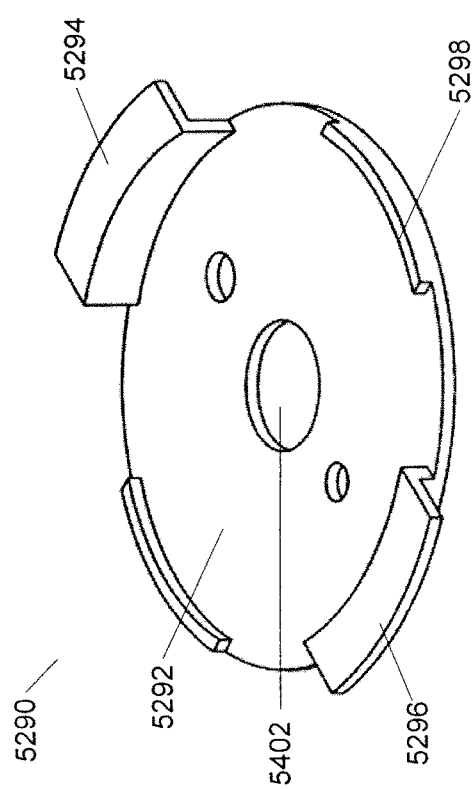
Figure 52C:
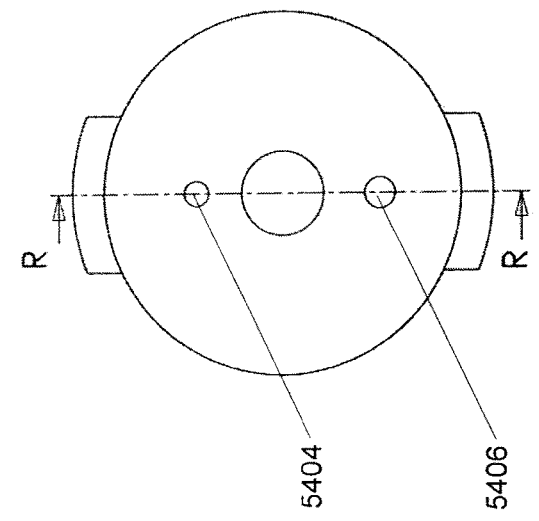
Figure 53C:
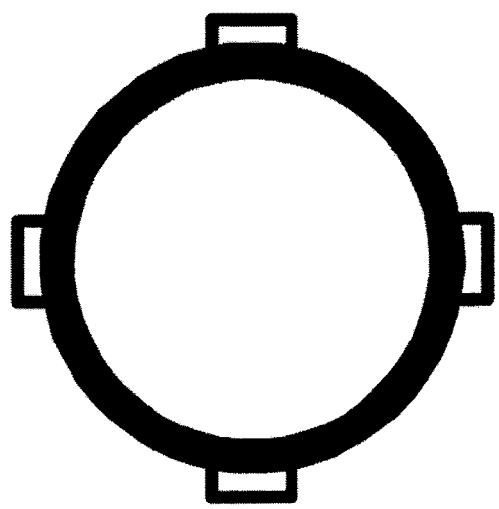
Figure 53B:
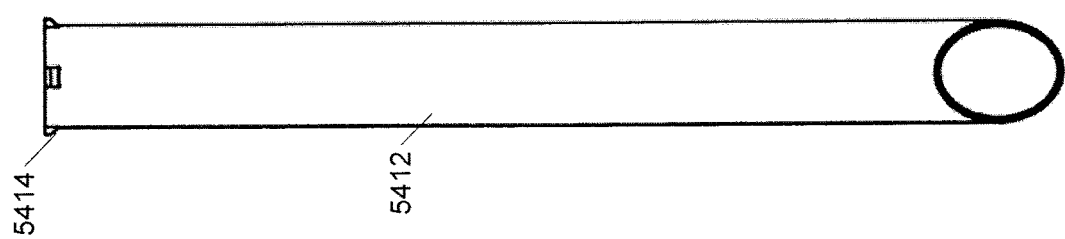
Figure 53A:
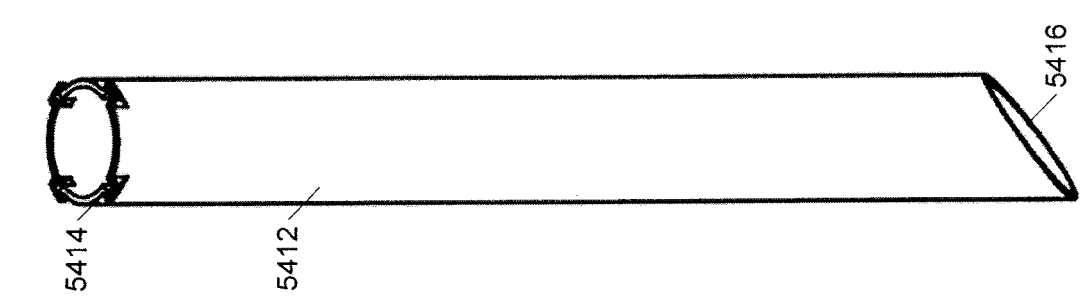
Figure 55A:
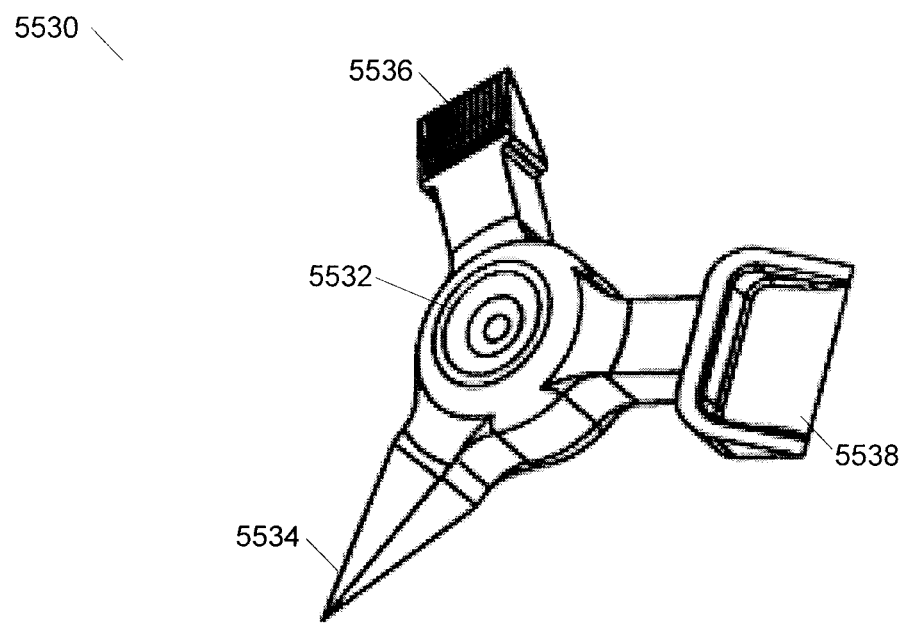
Figure 55B:
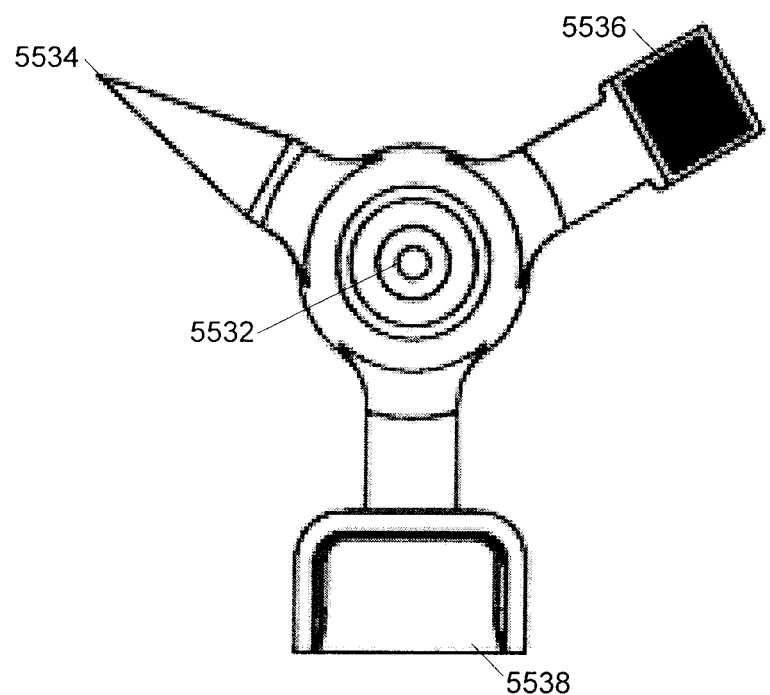
Figure 56B:
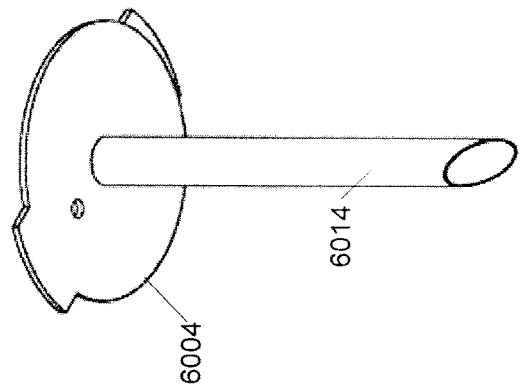
Figure 56D:
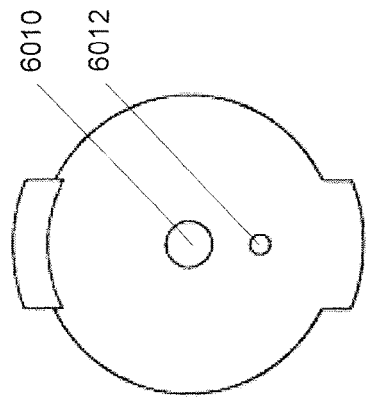
Figure 56A:
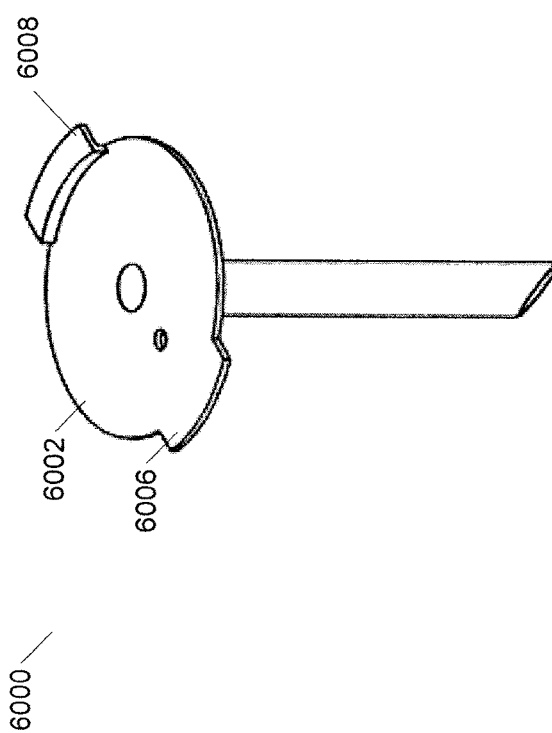
Figure 56C:
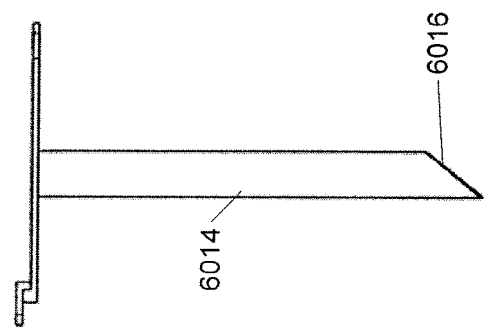
Figure 59B:
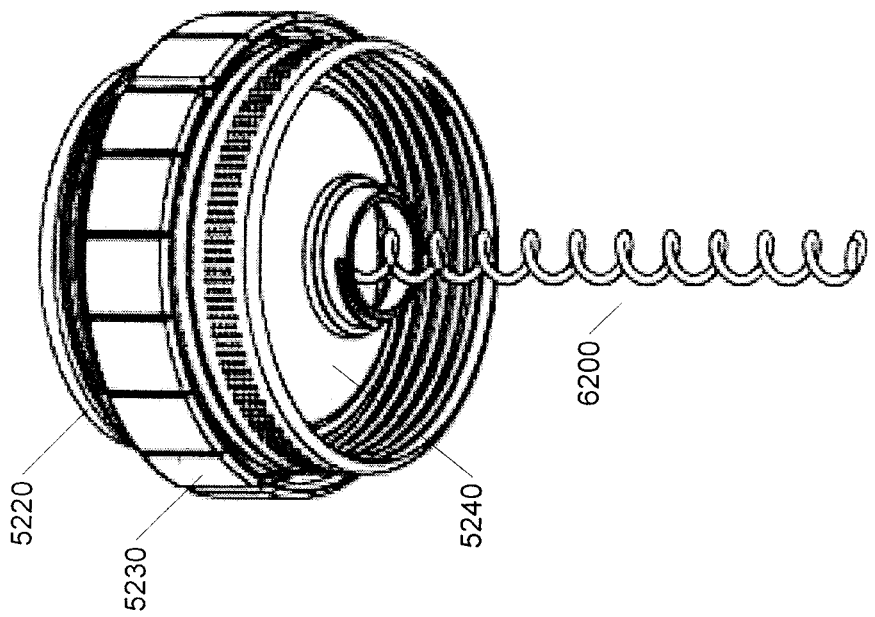
Figure 59A:
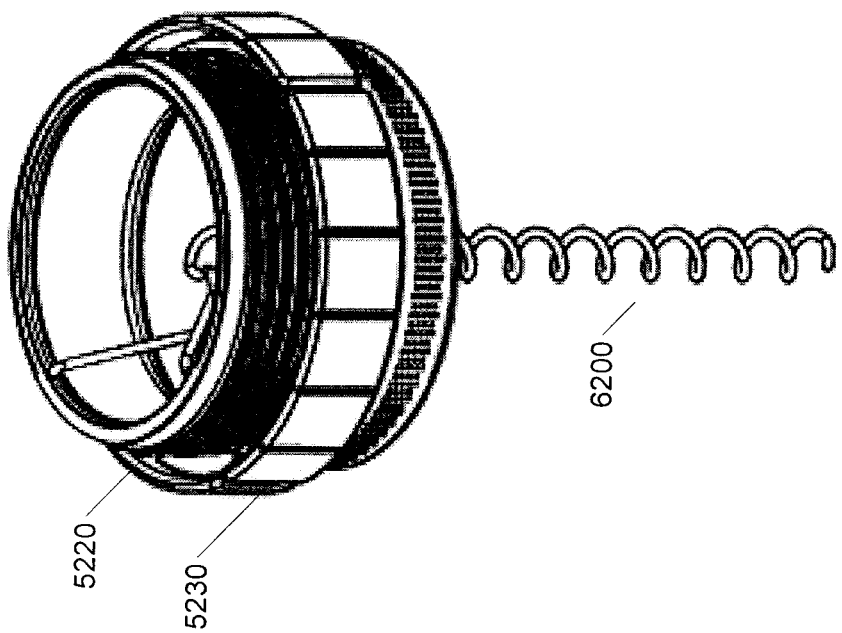

FIG. 25e is a cross-sectional front elevation view of the lower chamber connector of FIG. 25a taken along section line J-J of FIG. 25d;

FIG. 26a is a top perspective view of a base of the apparatus of FIG. 20;

FIG. 26b is a bottom perspective view of the base of FIG. 26a;

FIG. 26c is a side elevation view of the base of FIG. 26a;

FIG. 26d is a plan view of the base of FIG. 26a;

FIG. 26e is a cross-sectional front elevation view of the base of FIG. 26a taken along section line J-J of FIG. 26d;

FIG. 27a is a perspective view of a plug of the apparatus of FIG. 20;

FIG. 27b is a bottom perspective view of the plug of FIG. 27a;

FIG. 27c is a top plan view of the plug of FIG. 27a;

FIG. 27d is a front elevation view of the plug of FIG. 27a;

FIG. 28a is a perspective view of a cover of the apparatus of FIG. 20;

FIG. 28b is a bottom perspective view of the cover of FIG. 28a;

FIG. 28c is a plan view of the cover of FIG. 28a;

FIG. 28d is a front elevation view of the cover of FIG. 28a;

FIG. 28e is a side elevation view of the cover of FIG. 28a;

FIG. 28f is a cross-sectional front elevation view of the cover of FIG. 28a taken along section line L-L of FIG. 28e;

FIG. 29a is a top perspective view of an inner cover of the apparatus of FIG. 20;

FIG. 29b is a bottom perspective view of the inner cover of FIG. 29a;

FIG. 29c is a bottom plan view of the inner cover of FIG. 29a;

FIG. 29d is a top plan view of the inner cover of FIG. 29a;

FIG. 29e is a side elevation view of the inner cover of FIG. 29a;

FIG. 29f is a cross-sectional front elevation view of the inner cover of FIG. 29a taken along section line L-L of FIG. 29e;

FIG. 30a is a perspective view of a cylinder of the apparatus of FIG. 20;

FIG. 30b is a front elevation view of the cylinder of FIG. 30a;

FIG. 30c is a top plan view of the cylinder of FIG. 30a;

FIG. 30d is a cross-sectional side elevation view of the cylinder of FIG. 30a taken along section line J-J of FIG. 30c;

FIG. 31a is a perspective view of a first cylinder end of the apparatus of FIG. 20;

FIG. 31b is a bottom perspective view of the first cylinder end of FIG. 31a;

FIG. 31c is a front elevation view of the first cylinder end of FIG. 31a;

FIG. 31d is a plan view of the first cylinder end of FIG. 31a;

FIG. 32a is a perspective view of a second cylinder end of the apparatus of FIG. 20;

FIG. 32b is a bottom perspective view of the second cylinder end of FIG. 32a;

FIG. 32c is a front elevation view of the second cylinder end of FIG. 32a;

FIG. 32d is a plan view of the second cylinder end of FIG. 32a;

FIG. 33a is a perspective view of a grinding plate in accordance with an aspect of the invention;

FIG. 33b is a perspective view of a grip in accordance with an aspect of the invention;

FIG. 33c is a perspective view of the grinding plate of FIG. 33a connected to the grip of FIG. 33b;

FIG. 34a is a perspective view of another embodiment of a cleaning tool of the apparatus of FIG. 1a;

FIG. 34b is a top plan view of the cleaning tool of FIG. 34a;

FIG. 34c is a front elevation view of the cleaning tool of FIG. 34a;

FIG. 34d is a side elevation view of the cleaning tool of FIG. 34a;

FIG. 35 is an exploded perspective view of an apparatus in accordance with an aspect of the invention;

FIG. 36a is a perspective view of a grip of the apparatus of FIG. 35;

FIG. 36b is a bottom plan view of the grip of FIG. 36b;

FIG. 36c is a cross-sectional side elevation view of the grip of FIG. 36a taken along the section line S-S of FIG. 36b;

FIG. 37a is a perspective view of a plate of the apparatus of FIG. 35;

FIG. 37b is a side elevation view of the plate of FIG. 37a;

FIG. 37c is a bottom plan view of the plate of FIG. 37a;

FIG. 37d is a cross-sectional view of the plate of FIG. 37a taken along the section line U-U of FIG. 37c;

FIG. 38a is a top perspective view of a funnel of the apparatus of FIG. 35;

FIG. 38b is a bottom perspective view of the funnel of FIG. 38a;

FIG. 38c is a side elevation view of the funnel of FIG. 38a;

FIG. 38d is a bottom plan view of the funnel of FIG. 38a;

FIG. 38e is a cross-sectional view of the funnel of FIG. 38a taken along the section line AC-AC of FIG. 38d;

FIG. 39a is a top perspective view of a seat of the apparatus of FIG. 35;

FIG. 39b is a bottom perspective view of the seat of FIG. 39a;

FIG. 39c is a side elevation view of the seat of FIG. 39a;
FIG. 39d is a top plan view of the seat of FIG. 39a;
FIG. 39e is a bottom plan view of the seat of FIG. 39a;
FIG. 39f is a cross-sectional view of the seat of FIG. 39a taken along the section line Q-Q of FIG. 39e;
FIG. 40a is a top perspective view of a dial of FIG. 35;
FIG. 40b is a bottom perspective view of the dial of FIG. 40a;
FIG. 40c is a top plan view of the dial of FIG. 40a;
FIG. 40d is a bottom plan view of the dial of FIG. 40a;
FIG. 41a is a top perspective view of a disk of FIG. 35;
FIG. 41b is a bottom perspective view of the disk of FIG. 41a;
FIG. 41c is a top plan view of the disk of FIG. 41 a;
FIG. 41d is a cross-sectional view of the disk of FIG. 41 a taken along the section line R-R of FIG. 41c;
FIG. 42a is a top perspective view of a case of FIG. 35;
FIG. 42b is a bottom perspective view of the case of FIG. 42a;
FIG. 42c is a side elevation view of the case of FIG. 42a;
FIG. 43a is a perspective view of the cylinder of FIG. 35;
FIG. 43b is a plan view of the cylinder of FIG. 43a;
FIG. 44a is a top perspective view of a casing in accordance with an aspect of the invention;
FIG. 44b is a bottom perspective view of the casing of FIG. 44a;
FIG. 44c is a side elevation view of the casing of FIG. 44a;
FIG. 45a is an exploded expanded perspective view of a funnel of the apparatus of FIG. 35;
FIG. 45b is a top perspective view of the funnel of FIG. 45a;
FIG. 45c is a bottom perspective view of the funnel of FIG. 45a;
FIG. 46a is top perspective view of an adapter of the funnel of FIG. 45a;
FIG. 46b is a bottom perspective view of the adapter of FIG. 46a;
FIG. 46c is a top plan view of the adapter of FIG. 46a;
FIG. 46d is a cross-sectional view of the adapter of FIG. 46a taken along section line AA-AA of FIG. 46c;
FIG. 47a is a top perspective view of a sleeve of the funnel of FIG. 45a;
FIG. 47b is a bottom perspective view of the sleeve of FIG. 47a;
FIG. 47c is a bottom plan view of the sleeve of FIG. 47a;
FIG. 47d is a cross-sectional view of the sleeve of FIG. 47a taken along section line AB-AB of FIG. 47c;
FIG. 48a is a top perspective view of a blender of the funnel of FIG. 45a;
FIG. 48b is a bottom perspective view of the blender of FIG. 48a;
FIG. 48c is a side elevation view of the blender of FIG. 48a;
FIG. 48d is a top plan view of the blender of FIG. 48a;
FIG. 48e is a cross-sectional view of the blender of FIG. 48a taken along section line V-V of FIG. 48d;
FIG. 49 is an exploded perspective view of another apparatus in accordance with an aspect of the invention;
FIG. 50a is a top perspective view of a blender of the apparatus of FIG. 49;
FIG. 50b is a bottom perspective view of the blender of FIG. 50a;
FIG. 50c is a top plan view of the blender of FIG. 50a;
FIG. 50d is a side elevation view of the blender of FIG. 50a;
FIG. 50e is a cross-sectional view of the blender of FIG. 50a take along section line W-W of FIG. 50d;
FIG. 51a is a top perspective view of a support of the apparatus of FIG. 49;
FIG. 51b is a bottom perspective view of the support of FIG. 51a;
FIG. 51c is a bottom plan view of the support of FIG. 51a;
FIG. 51d is a cross-sectional view of the support of FIG. 51a taken along section line S-S of FIG. 51c;
FIG. 52a top perspective view of a disk of the apparatus of FIG. 49;
FIG. 52b is a bottom perspective view of the disk of FIG. 52a;
FIG. 52c is a bottom plan view of the disk of FIG. 52a;
FIG. 52d is a cross-sectional view of the disk of FIG. 52a taken along section line R-R of FIG. 52c;
FIG. 53a is a perspective view of a tube of the apparatus of FIG. 49;
FIG. 53b is a side elevation view of the tube of FIG. 53a;
FIG. 53c is a bottom plan view of the tube of FIG. 53a;
FIG. 54a is a top perspective view of a plug of the apparatus of FIG. 49;
FIG. 54b is a top perspective view of the plug of FIG. 54a is another configuration;
FIG. 54c is a bottom perspective view of the plug of FIG. 54a;
FIG. 54d is a side elevation view of the plug of FIG. 54a;
FIG. 54e is a bottom plan view of the plug of FIG. 54a;
FIG. 54f is a cross-sectional view of the plug of FIG. 54a taken along section line AA-AA of FIG. 54e;
FIG. 55a is a perspective view of a cleaning tool of the apparatus of FIG. 49;
FIG. 55b is a top plan view of the cleaning tool of FIG. 55a;
FIG. 56a is top perspective view of a tube-support in accordance with an aspect of the invention;
FIG. 56b is a bottom perspective view of the tube-support of FIG. 56a;
FIG. 56c is a side elevation view of the tube-support of FIG. 56a;
FIG. 56d is a top plan view of the tube-support of FIG. 56a;
FIG. 57a is top perspective view of a tube-support in accordance with an aspect of the invention;
FIG. 57b is a bottom perspective view of the tube-support of FIG. 57a;
FIG. 57c is a side elevation view of the tube-support of FIG. 57a;
FIG. 57d is a top plan view of the tube-support of FIG. 57a;
FIG. 58a is a perspective view of a blender in accordance with an aspect of the invention;
FIG. 58b is a side elevation view of the blender of FIG. 58a;
FIG. 58c is a cross-sectional view of the blender of FIG. 58a taken along section line Y-Y of FIG. 58b;
FIG. 58d is a top plan view of the blender of FIG. 58a;
FIG. 59a is a top perspective view of the blender of FIG. 58a with a sleeve, adapter and funnel in accordance with an aspect of the invention; and
FIG. 59b is a bottom perspective view of the blender, sleeve, adapter and funnel of FIG. 59a.

Similar references are used in different figures to denote similar components.

DETAILED DESCRIPTION OF THE EMBODIMENTS

Turning now to FIG. 1, an exploded perspective view of an apparatus in accordance with an aspect of the present invention is shown and is generally identified by reference numeral 10. The apparatus 10 has a generally and substantially cylindrical shape, thus, the various elements of the apparatus 10 are generally and substantially cylindrically shaped. As can be seen, the apparatus 10 comprises a grinder 100, a separator 200, a chamber 300, a case 400 and a storage unit 500. The grinder 100 is connected to the separator 200 which is also connected to the case 400. The chamber 300 is inserted into the case 400 and connected thereto. The storage unit 500 is connected to the chamber 300. As shown in FIGS. 1a to 1f, when the grinder 100, separator 200, chamber 300, case 400 and storage unit 500 are connected in this configuration, the apparatus 10 forms a single unit for grinding material and depositing the ground material into the chamber 300 as will be explained in more detail below.

The grinder 100 is configured to grind material. The grinder 100 comprises a first grinding unit 110, a second grinding unit 130, a sleeve 150 and a magnet assembly 160.

Turning now to FIGS. 2a to 2f, the first grinding unit 110 is better illustrated. The grinding unit 110 comprises an outer surface 112, an indentation 114, a first gripping surface 116, an inner surface 118, an inner wall surface 120, projections 122, a protrusion 124 and a northern magnetic element 126. In this embodiment, the indentation 114 is generally and substantially star shaped. The projections 122 extend vertically from the inner surface 118. Furthermore, in this embodiment, there are sixteen (16) generally and substantially conically shaped projections 122. The northern magnetic element 126 is housed within the protrusion 122. The protrusion 122 is formed from the indentation 114 in the outer surface 112. In this embodiment, the protrusion 124 is generally and substantially centrally located.

Turning now to FIGS. 3a to 3f, the second grinding unit 130 is better illustrated. The second grinding unit 130 comprises a second gripping surface 132, a rim 134, a receiving surface 136, a first surface 138, offset projections 140, apertures 142, a central aperture 144, clipping apertures 146 and a threaded surface 148. The offset projections 140 extend vertically from the first surface 138. In this embodiment, there are twelve (12) generally and substantially conically shaped offset projections 140. The apertures 142 are distributed between the projections 140. The central aperture 144 is generally and substantially conically shaped. The threaded surface 148 is threaded for connection to the separator 200 which will be explained in more detail below.

Turning now to FIGS. 4a to 4c, the sleeve 150 is better illustrated. The sleeve 150 comprises an outer surface 152, a ledge 154 and an inner surface 156. The outer surface 152 is made of such material to permit rotation along it by an abutting element. In this embodiment, the sleeve 150 is made of nylon.

Turning now to FIGS. 5a to 5f, the magnet assembly 160 is better illustrated. The magnet assembly 160 comprises a ring 162, clips 164, a housing 166, an attachment member 168 and a southern magnetic element 170. The clips 164 extend from the ring 162. In this embodiment, there are four (4) clips 164. The housing 166 is connected to the ring 162 by the attachment member 168. The housing 166 is configured such that it can move away from the ring 162 in the opposite direction from which the clips 164 project, but not past the plane of the ring 162. In this embodiment, the attachment member 168 is flexible and configured such that the housing 166 can swing away from the ring 162. The southern magnetic element 170 is fixedly housed within the housing 166. In this embodiment, the southern magnetic element 170 is a neodymium magnet.

In order to assemble the grinder 110, the sleeve 150 is affixed to the second grinding unit 130. Specifically, the inner surface of the sleeve 156 is affixed to the receiving surface 134, in one embodiment, with an adhesive such that the ledge 154 of the sleeve 150 abuts the rim 134 of the second grinding unit 130. The first grinding unit 110 is removably seated on the second grinding unit 130 when the inner wall surface 120 of the first grinding unit 110 abuts the outer surface 152 of the sleeve 150. The first grinding unit 110 is rotatable relative to the second grinding unit 130. The projections 122 of the first grinding unit 110 and the offset projections 140 of the second grinding unit 130 are positioned such that prior to, and during rotation of the first grinding unit 110 relative to the second grinding unit 130, the projections 122 and offset projections 140 do not directly connect each other.

The magnet assembly 160 is connected to the second grinding unit 130 by inserting the clips 164 into the clipping apertures 146 and the housing 166 into the central aperture 144. The clips 164 secure the magnet assembly 160 to the second grinding unit 130. The clips 164 may be secured to the clipping apertures 146, in one embodiment, by additionally using an adhesive. The southern magnetic element 170 in the housing 166 is magnetically attached to the northern magnetic element 126 of the first grinding unit 110 when the first grinding unit 110 is seated on the second grinding unit 130. The northern and southern magnetic elements (126, 170) are magnetized such that the first grinding unit 110 will stay affixed to the second grinding unit 130 in any orientation and such that a user may remove the first grinding unit 110 from the second grinding unit 130 without overly significant effort.

Once the magnet assembly 160 is connected to the second grinding unit 130 then if the housing 166 is swung away from the ring 162, seating of the first grinding unit 110 on the second grinding unit 130 will cause the housing 166 to swing to the same plane as the ring 162. Due to the generally and substantially conical shape of the central aperture 144 of the second grinding unit 130, the housing 166 cannot swing past the plane of the first surface 138 of the second grinding unit 130.

As shown in FIG. 1, the separator 200 comprises a filter 210, a seat 230 and a valve layer 250.

Turning now to FIGS. 6a to 6e, the filter 210 is shown in more detail. The filter 210 comprises: arms 212; a selectively porous material 214, in this embodiment, a mesh or screen; an aperture 216, an upper rim 218; a lower rim 220; lips 222; and stoppers 224. The arms 212 project radially outwardly from the aperture 216 and the selectively porous material 214 is positioned between adjacent arms 212. The lips 222 project outwardly from the lower rim 220 and interact with the seat 230 as will be explained below. In this embodiment, there are two (2) lips 222. The stoppers 224 project towards the lower rim 220 from the upper rim 218. The bottom edge of the upper rim 218 and the stoppers 224 interact with the seat 230 as will be explained below. The filter 210 has a large opening relative to the smaller sized aperture 216 which, in this embodiment, is generally and substantially centrally located. In this embodiment, the filter 210 is a generally and substantially conical- or funnel-shaped filter. The selectively porous material 214 may be any material containing pores known to persons skilled in the art to separate large and small material including, but not limited to, filter paper, wire mesh or wire screening as long as the pores of the selectively porous material 214 are smaller than the aperture 216.

Turning now to FIGS. 7a to 7f, the seat 230 is shown in more detail. The seat 230 comprises a filter surface 232, a second threaded surface 234, a second gripping surface 236, a second central aperture 238, mounting lips 240, an inner gripping surface 242, valve projections 244, case lips 246 and mating stoppers 248. The two (2) mounting lips 240 project inwardly from within the second central aperture 238 and interact with the filter 210 as will be explained. The two (2) mating stoppers 248 project upwardly from the second threaded surface and also interact with the filter 210 as will be explained. The two (2) valve projections 244 project from the inner gripping surface 242 and interact with the valve layer 250 as will be explained. The two (2) case lips 246 project from the inner gripping surface 242 and interact with the case 400 as will be explained.

Figure 8B:
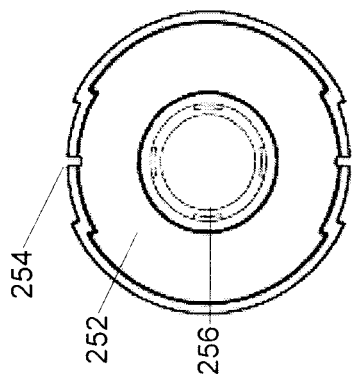
FIG. 8b is a top plan view of the valve layer of FIG. 8a without a one-way valve.
Figure 8D:
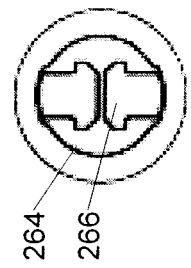
FIG. 8d is a top plan view of the one-way valve of FIG. 8c.
Figure 8A:
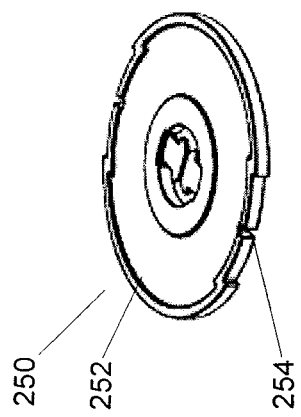

Turning now to FIGS. 8a and 8b, the valve layer 250 is shown in more detail. The valve layer 250 comprises a valve disc 252 and a valve 262. The valve disc 252 comprises seat indents 254 and a valve aperture 256.

Figure 8C:
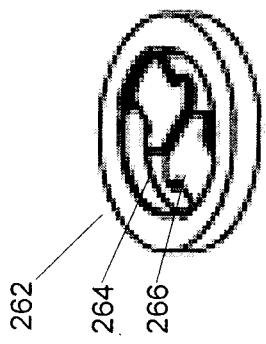
Figure 9B:
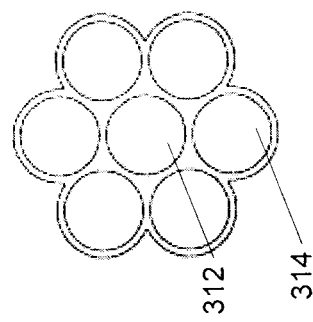
Figure 9A:
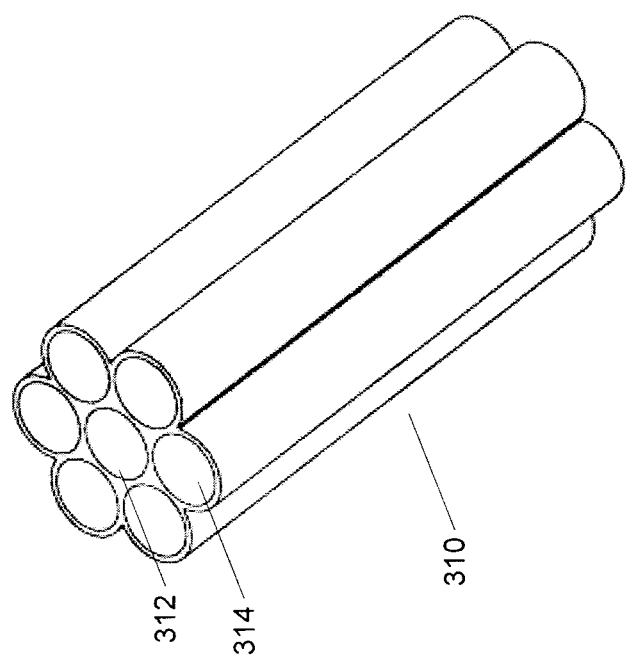
Figure 9C:
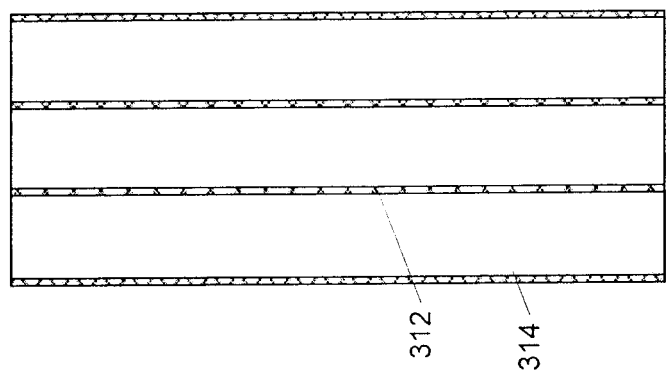
Figure 9C:
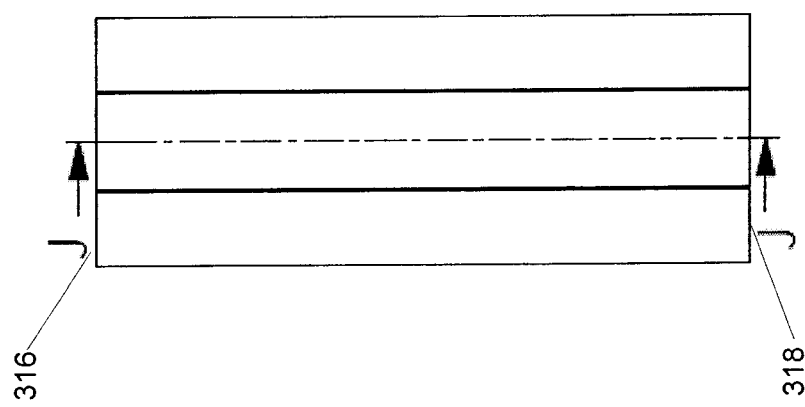
Figure 10C:
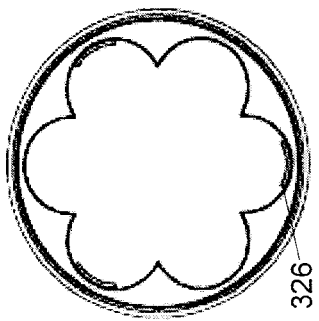
Figure 10F:
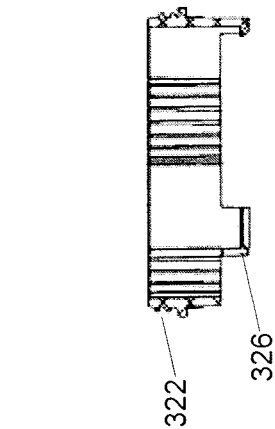
FIG. 10f is a cross-sectional side elevation view of the connector of FIG. 10a taken along section line J-J of FIG. 10e.
Figure 10B:
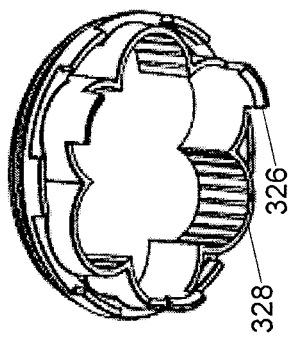
Figure 10E:
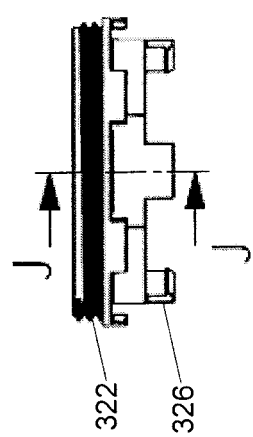
Figure 10A:
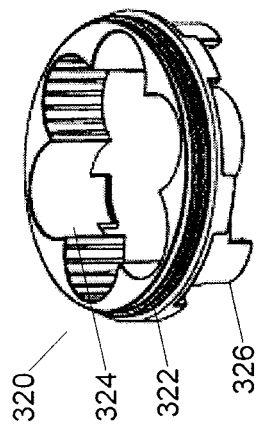
Figure 10D:
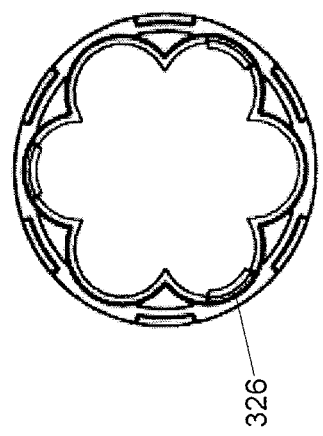
Figure 11C:
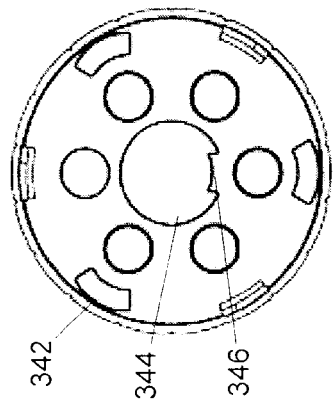
Figure 11B:
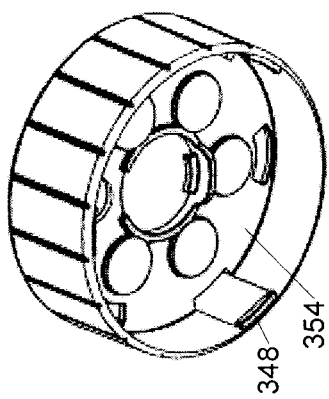
Figure 11A:
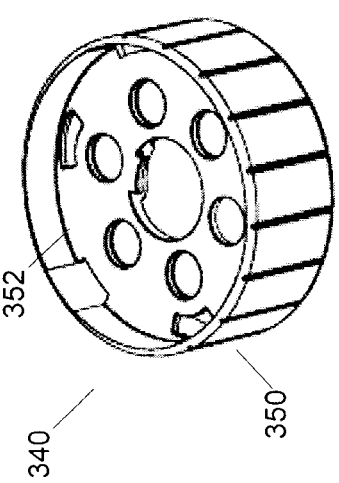
Figure 11F:
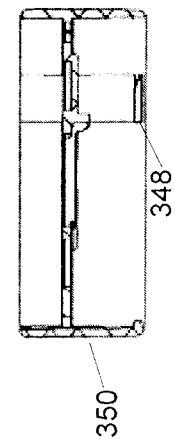
FIG. 11f is a cross-sectional side elevation view of the base of the FIG. 11a taken along section line K-K of FIG. 11e.
Figure 11E:
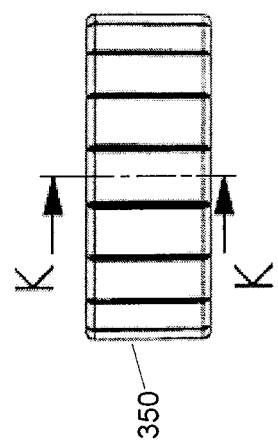
Figure 11D:
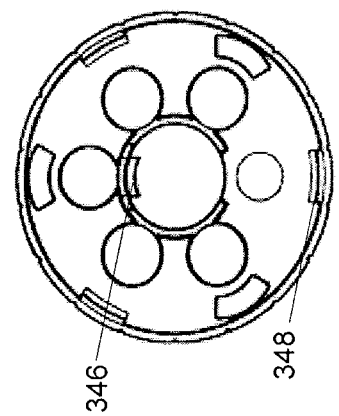
Figure 12C:
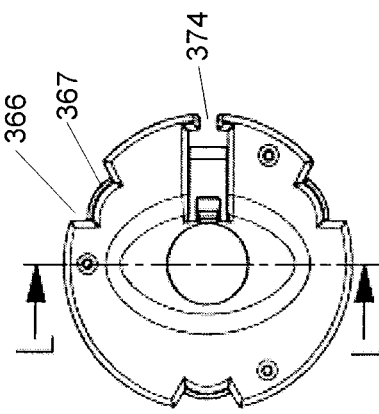
Figure 12B:
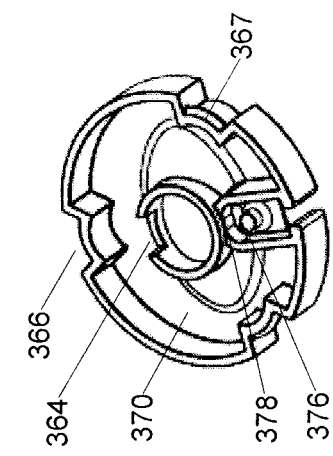
Figure 12A:
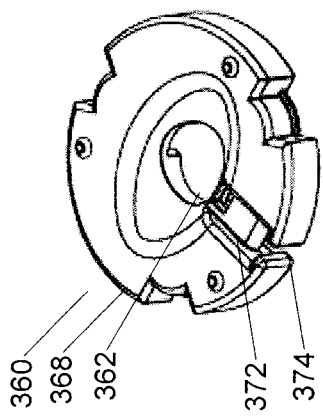
Figure 12F:
FIG. 12f is a cross-sectional side elevation view of the plug base of FIG. 12a taken along section line M-M of FIG. 12e.
Figure 12E:
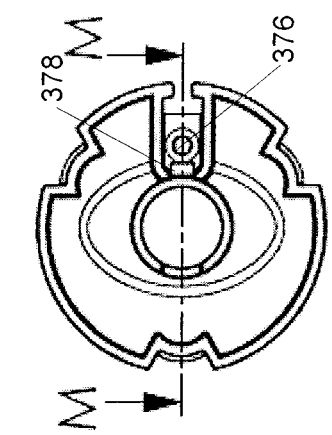
Figure 12D:
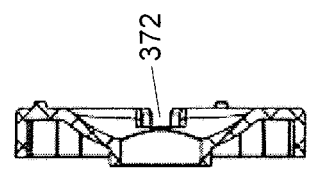
FIG. 12d is a cross-sectional front elevation view of the plug base of FIG. 12a taken along section line L-L of FIG. 12c.
Figure 13C:
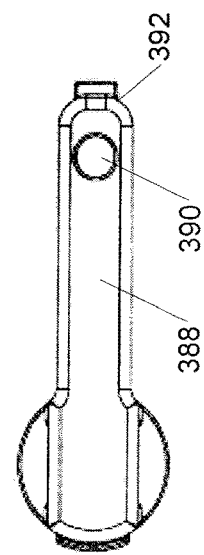
Figure 13F:
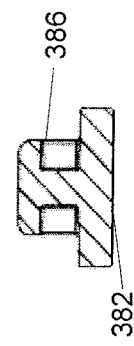
FIG. 13f is a cross-sectional side elevation view of the plug of FIG. 13a taken along section line J-J of FIG. 13e.
Figure 13B:
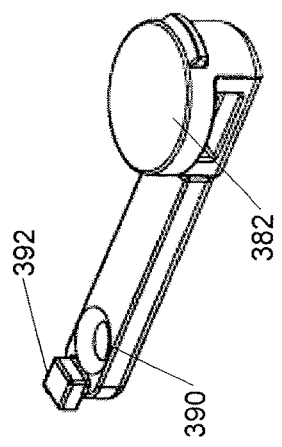
Figure 13E:
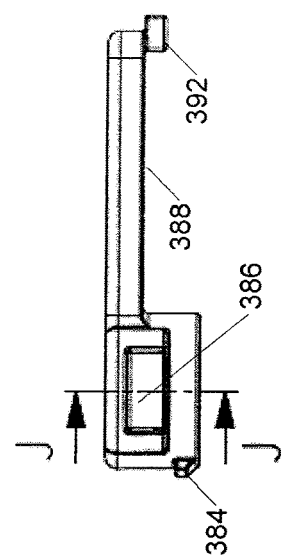
Figure 13A:
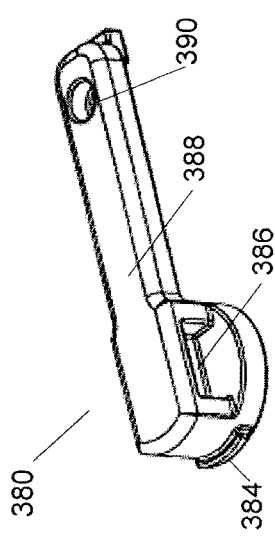
Figure 13D:
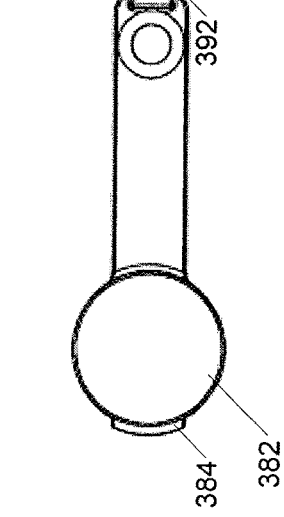

Turning now to FIGS. 8c and 8d the valve 262 is shown in more detail. The valve 262 comprises a valve passage 264 and valve arms 266. The valve arms 266 project inwardly within the passage 264. The valve arms 266 are configured such that upon moving in a direction they return to a resting state in the same plane as the valve 262. In this embodiment, the valve 262 is a one-way or non-return valve with the valve arms 266 being resilient and bending only in the one direction towards the chamber 300. The valve 262 is fit into the valve aperture 256 and frictionally secured within the valve aperture 256.

The filter 210, seat 230 and valve layer 250 are assembled in the following manner. The filter 210 is connected to the seat 230 by rotating the filter 210 relative to the seat 230 such that lips 222 projecting from the lower ring 220 rotate under the mating lips 240 such that the filter 210 cannot be separated from the seat 230 without rotation of the filter 210 or seat 230. During rotation of the filter 210 the stoppers 224 move to abut the mating stoppers 248 of the seat 230. The stoppers 224 and mating stoppers 248 are positioned such that they are in abutting relationship once the lips 222 are below the mating lips 240. Once the stoppers 224 and mating stoppers 248 abut, the filter 210 can no longer be rotated in its original rotation direction and cannot be pulled apart from the seat 230. To remove the filter 210 from the seat 230, the filter 210 is rotated in the opposite direction such that the lips 222 are no longer directly below the mating lips 240 (when the filter 210 is above the seat 230) and the stoppers 224 and mating stoppers 248 are not abutting. The valve layer 250 is rotated relative to the seat 230 until the seat indents 254 correspond to the valve projections 244. The valve layer 250 is then affixed to the seat 230, in one embodiment, using an adhesive. The valve layer 250 is oriented relative to the seat 230 such that the valve arms 266 can be swung away from the filter 210. In this embodiment, the valve 262 is a one-way or non-return valve and the valve arms 266 cannot be swung towards the filter 210.

As shown in FIG. 1, the chamber 300 comprises a cylinder 310, connector 320, base 340, plug base 360 and plug 380.

Turning now to FIGS. 9a to 9d, the cylinder 310 is shown in more detail. The cylinder 310 comprises receptacles, specifically, a central receptacle 312 and peripheral receptacles 314. In this embodiment, the receptacles are generally and substantially cylindrically shaped. The cylinder 310 further comprises a first end 316 and a second end 318. In this embodiment, the receptacles are hollow throughout and are sized to receive a pre-formed tube 3000 shown in FIG. 9e. In this embodiment, there are six (6) peripheral receptacles 314.

A pre-formed tube 3000 is defined herein throughout as a tube that may be formed prior to insertion into the apparatus 10 or 1000 (explained below) or is formed by the apparatus 10 or 1000 prior to depositing the ground material therein. The pre-formed tube 3000 comprises a first end 3010, a second end 3020 and a filter 3030. The first end 3010 is open such that ground material can enter the interior of the pre-formed tube 3000 through the first end 3010. The filter 3030 is located within the pre-formed tube 3000 near the second end 3020. In this embodiment, the second end 3020 is blocked such that ground material cannot exit the interior of the pre-formed tube 3000 through the second end 3020, but the pre-formed tube 3000 can still be smoked. In this embodiment, the pre-formed tube 3000 is made of paper and is suitable for use as a cigarette.

Turning now to FIGS. 10a to 10f, the connector 320 is shown in more detail. The connector 320 comprises a threaded surface 322, an inner surface 324, connector clips 326 and an edge 328. The inner surface 324 is shaped to conform to the shape of the cylinder 310 such that the cylinder 310 is insertable into the connector 320. In this embodiment, the connector 320 comprises three (3) connector clips 326.

Turning now to FIGS. 11a to 11f, the base 340 is shown in more detail. The base 340 comprises connector clip apertures 342, a central aperture 344, peripheral indents 345, a central protrusion 346, storage protrusions 348, a gripping surface 350, a first surface 352 and a second surface 354. In this embodiment, there are three (3) connector clip apertures 342. Each storage protrusion 348 extends towards the central aperture 344 from the inner surface of the gripping surface 350. The peripheral indents 345 are aligned with the peripheral receptacles 314 of the cylinder 310 such that a single peripheral indent 345 abuts the second end 318 of the cylinder 310 when the cylinder 310 is connected to the base 340. The peripheral indents 345 are sized and shaped such that a pre-formed tube 3000 can rest on a peripheral indent 345 while extending through a peripheral receptacle 314. The pre-formed tube 3000 is recessed into the peripheral indent 345 of the base 340 such that the pre-formed tube 3000 will maintain a generally vertical orientation within the peripheral receptacle 314. Furthermore, the peripheral indents 345 provide additional length for the pre-formed tubes 3000 in the peripheral receptacles 314.

Turning now to FIGS. 12a to 12f, the plug base 360 is shown in more detail. The plug base 360 comprises a plug aperture 362, a central indent 364, plug base indents 366, ledges 367, an outer surface 368, an inner surface 370, a plug trench 372, a plug groove 374, a plug mount 376 and a stopper gap 378. In this embodiment, there are three (3) plug base indents 366. The ledges 367 extend outwardly from the plug base indents 366 and are used to connect the connector 320, the base 340 and the plug base 360 together as will be explained below.

Turning now to FIGS. 13a to 13f, the plug 380 is shown in more detail. The plug 380 comprises a head 382, plug lock 384, grips 386, an arm 388, a mounting aperture 390 and a plug stopper 392. The head 382 is sized to fit in the plug aperture 362 of the plug base 360. In this embodiment, there are two grips 386 opposite each other. The arm 388 is made of a flexible material such that can be bent. The mounting aperture 390 is sized such that the plug mount 376 can be inserted into it. The plug stopper 392 is sized to fit in the stopper gap 378 to maintain the plug 380 in its position once the plug mount 376 is inserted into the mounting aperture 390.

The cylinder 310, connector 320, base 340, plug base 360 and plug 380 are assembled in the following manner. The cylinder 310 is inserted into the connector 320 such that the second end 318 of the cylinder 310 is flush with the edge 328 of the connector 320. The cylinder 310 is connected to the connector 320, in one embodiment, using an adhesive. The connector 320 is then connected to the base 340. The connector clips 326 of the connector 320 are inserted into the connector clip apertures 342 of the base 340. The connector 320 may further be connected to the base 340, in one embodiment, using an adhesive.

The plug 380 is connected to the plug base 360 by inserting the plug mount 376 of the plug base 360 into the mounting aperture 390 of the plug 380. The plug stopper 392 is secured to the stopper gap 379. The plug stopper 392 and plug mount 376 may be additionally secured, in one embodiment, using an adhesive. The arm 388 of the plug 380 is then bent such that the arm passes through the plug groove 374 and into the trench 372 of the plug base 374. In this embodiment, the arm 388 is bent prior to connection of the plug 380 to the plug base 360 such that less force is required to bend the arm during assembly. The head 382 of the plug 380 is then inserted into the plug aperture 362. The plug lock 384 compresses upon insertion of the head 382 and slides into the central indent 364 of the plug base 360. This provides a tight fit between the head 382 and the plug aperture 362 such that the head 382 cannot accidently be removed from the plug aperture 362. The head 382 may be removed from the plug aperture 362 by gripping the grips 386 of the plug 380 and pulling the head 382 out of the plug aperture 362 thereby compressing the plug 380 such that it can overcome the frictional force imparted by the central indent 364.

Once the plug 380 and plug base 360 are assembled, the combined plug 380 and plug base 360 are connected to the base 340. The central indent 364 of the plug base 360 which receives the plug lock 384 also abuts the central protrusions 346 of the base 340. Furthermore, the base 340 is connected to the plug base 360, in one embodiment, by additionally using an adhesive. Additional adhesive may also be used at edges of the plug base 360 which are in contact with edges of the base 340. The plug 380 and plug base 360 are oriented with respect to the base 340 such that the head 382 of the plug 380 faces towards the central aperture 344 of the base 340 and the inner surface 370 of the plug base 380 faces the second surface 354 of the base 340.

The connector 320 is also connected to the base 340 and plug base 360 using the connector clips 326 of the connector 320 which have been inserted into the connector clip apertures 342 of the base 340. The connector clips 326 lock onto the ledges 367 of the plug base indents 366 of the plug base 360 once they are sufficiently inserted into the connector clip apertures 342 of the base 340.

Turning now to FIGS. 14a to 14d, the case 400 is shown in more detail. The case 400 comprises a window aperture 410, a threaded inner surface 414, finger forms 416 and seat slits 418. The finger forms 416 are shaped and positioned to match an average user's fingers and thereby improve gripping ease. The seat slits 418 are secured to the case lips 246 of the seat 230. In one embodiment, adhesive may additionally be used to secure the case 400 to the seat 230. The case 400 is removably connected to the chamber 300 by screwing the threaded surface 420 of the case 400 to the threaded surface 322 of the connector 320.

Figure 14E:
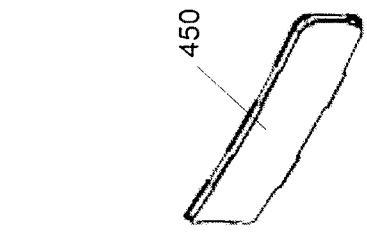
Figure 14D:
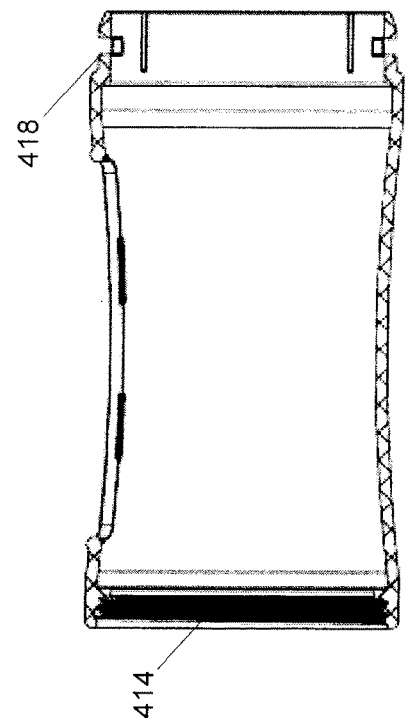
FIG. 14d is a cross-sectional side elevation of the case of FIG. 14a view taken along section line K-K of FIG. 14c.
Figure 14B:
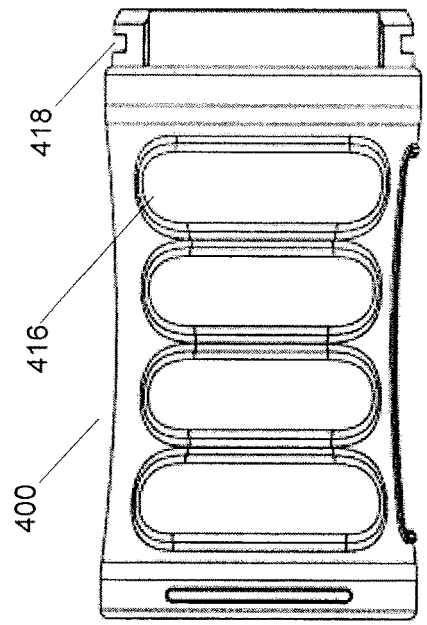
Figure 14A:
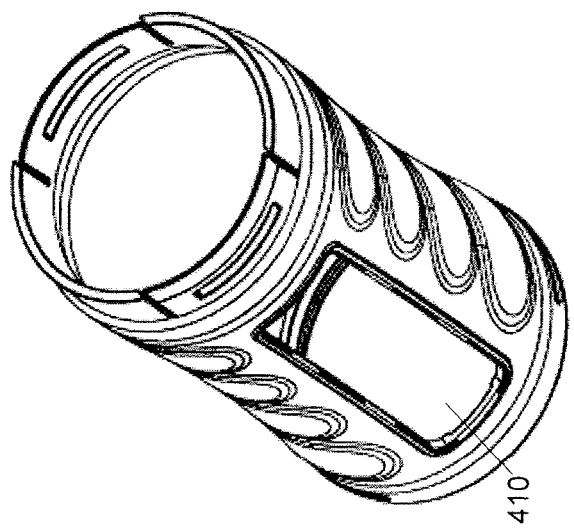
Figure 14C:
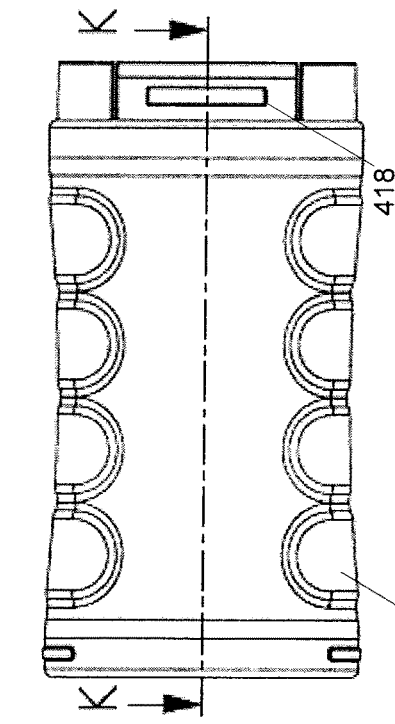
Figure 15C:
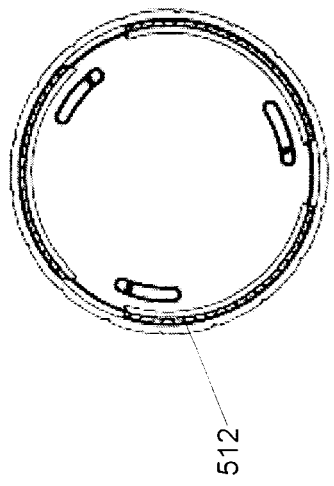
Figure 15B:
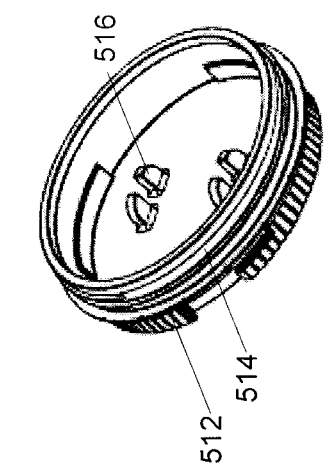
Figure 15A:
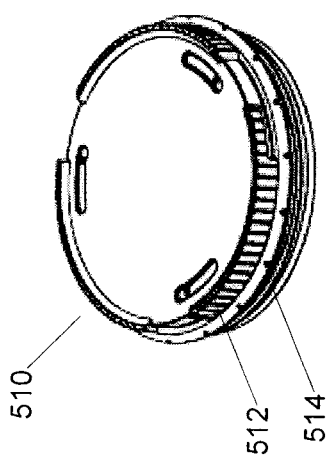
Figure 15F:
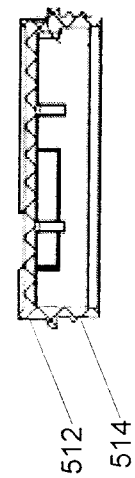
FIG. 15f is cross-sectional a side elevation view of the storage connector of FIG. 15a along section line J-J of FIG. 15e.
Figure 15E:
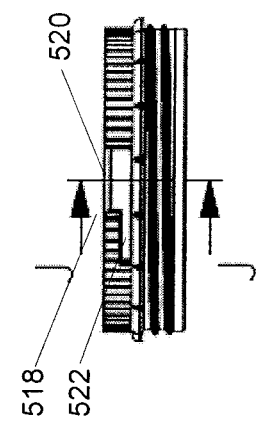
Figure 15D:
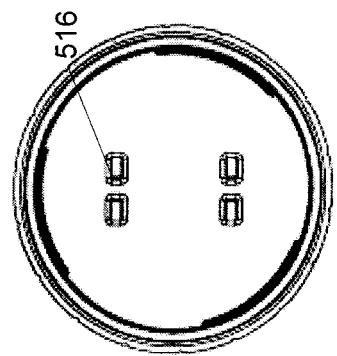
Figure 17C:
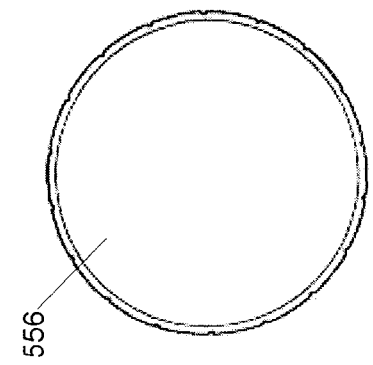
Figure 17E:
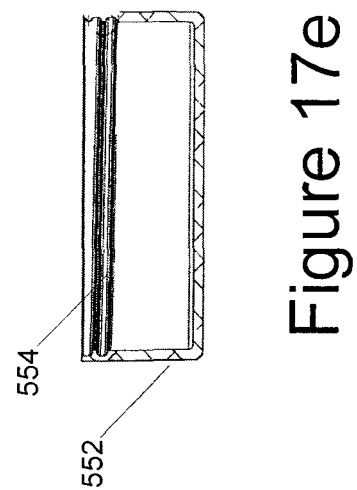
FIG. 17e is a cross-sectional side elevation view of the cap of FIG. 17a along section line D-D of FIG. 17d.
Figure 17B:
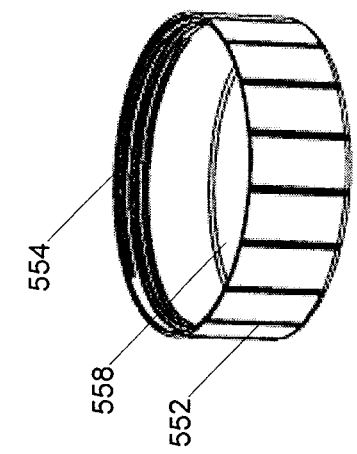
Figure 17D:
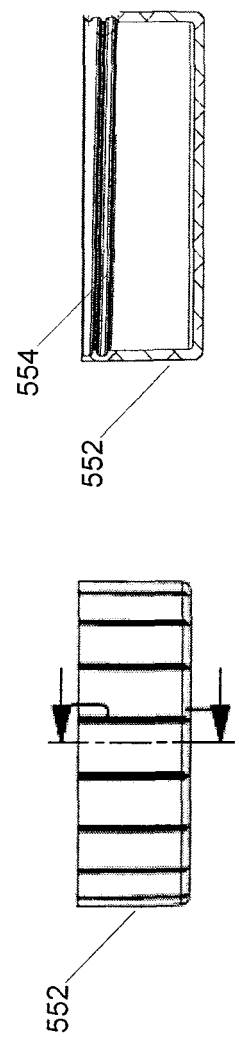
Figure 17A:
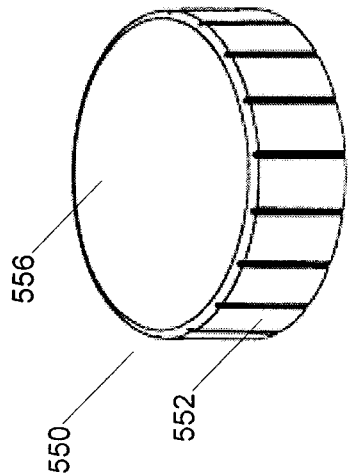

The case 400 further comprises a window 450. Turning now to FIG. 14e, the window 450 is shown in more detail. The window 450 is shaped to fit into the window aperture 410 and is secured within the window aperture 410, in one embodiment, using adhesive, and clips on the edges of the window body. The window 450 permits viewing into the case 400.

As shown in FIG. 1, the storage unit 500 comprises a storage connector 510, a cleaning tool 530 and a cap 550. Turning now to FIGS. 15a to 15f, the storage connector 510 is shown in more detail. The storage connector 510 comprises a gripping surface 512, a thread surface 514, cleaning tool clips 516 and generally and substantially L-shaped depressions 518. In this embodiment, there are three (3) generally and substantially L-shaped depressions 518. Each generally and substantially L-shaped depression 518 comprises a receiving depression 520 and a holding depression 522. The receiving depression 520 is sized such that a storage protrusion 348 of the base 540 can slide down the length of the receiving depression 520 and then a storage protrusion 348 can slide across the generally and substantially L-shaped depression 518 to the holding depression 522. In this manner, the storage connector 510 is secured to the base 340.

Turning now to FIGS. 16a to 16f, the cleaning tool 530 is shown in more detail. The cleaning tool 530 comprises a central portion 532, pointed ends 534 and angled ends 536. The pointed ends 534 and the angled ends 536 extend from the central portion 532. The cleaning tool 530 is sized to be removably secured to the storage connector 510 by cleaning tool clips 516. In this embodiment, the cleaning tool 530 is generally and substantially X-shaped. The angled ends 536 comprise an abrasive surface to assist in cleaning and/or scraping. In this embodiment, as shown in FIGS. 16c and 16e, the abrasive surface comprises a series of lined extrusions that provide a coarse texture to form an abrasive surface when cleaning and/or scraping.

Turning now to FIGS. 17a to 17e, the cap 550 is shown in more detail. The cap 550 comprises a gripping surface 552, a threaded surface 554, an outer surface 556 and an inner surface 558. The cap 550 is connected to the storage connector 510 by screwing the cap 550 to the storage connector 510 such that the threaded surface 554 of the cap 550 contacts the threaded surface 514 of the storage connector 510. The cap 550 is sized to receive and store material prior to grinding or after grinding and can also be used to store various other items.

In this embodiment, the apparatus 10 further comprises accessories. The accessories comprise a stuffer 600 shown in FIGS. 18a to 18d. The stuffer 600 comprises a rod 610, a shaft 620 and a grip 630. The rod 610 fits into the hollow shaft 620 which fits into the hollow grip 630. The shaft 620 is sized such that it can be inserted into any of the receptacles including the central receptacle 312 and the peripheral receptacles 314 and be used to pack ground material into the pre-formed tube 3000. Similarly, the rod 610 is sized to pack ground material into the pre-formed tube 3000. The rod 610 has a smaller diameter than the shaft 620 such that it can be used to more delicately pack ground material into the pre-formed tube 3000. The grip 630 is affixed to one end of the shaft and may also be used to pack material into the pre-formed tube 3000.

Figure 19C:
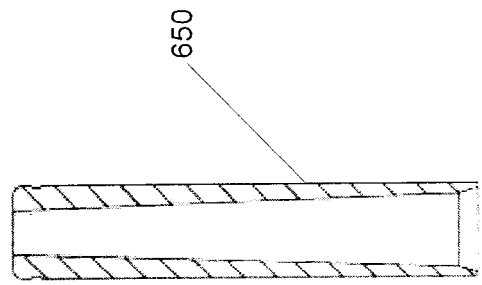
FIG. 19c is a cross-sectional front elevation view of the support of FIG. 19a taken along section line M-M of FIG. 19b.
Figure 19A:
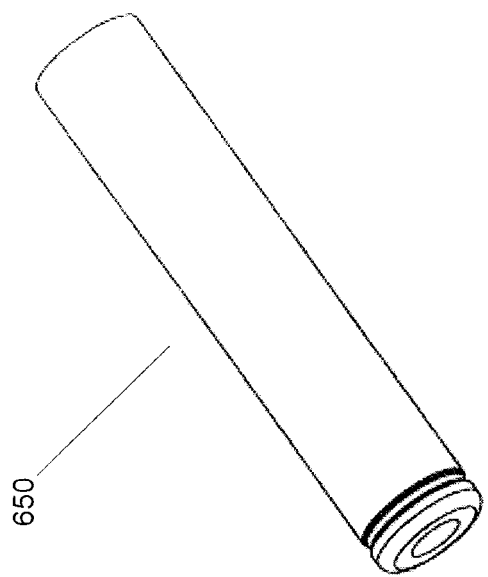
FIG. 19a is a perspective view of a support in accordance with an aspect of the invention.
Figure 19B:
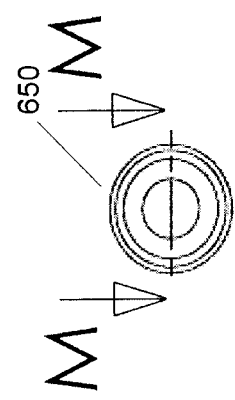

The accessories further comprise a support 650 shown in FIGS. 19a to 19c. The support 650 is hollow and is sized to fit in any of the receptacles including the central receptacle 312 and the peripheral receptacles 314 and contact the inner wall of the receptacle into which it is inserted. Furthermore, the support 650 is sized such that the pre-formed tube 3000 can be inserted into the support 650. The pre-formed tube 3000 may be generally and substantially conical in shape and thus, the support 650 may have a generally and substantially conically shaped hollow interior. In this manner, the support 650 reinforces the pre-formed tube 3000. In use, the pre-formed tube 3000 is inserted into the support 650. Then the pre-formed tube 3000 and support 650 are both inserted into one of the receptacles, for example, the central receptacle 312.

The apparatus 10 is configured such that the first grinding unit 110; second grinding unit 130; filter 210; seat 230, valve layer 250 and case 400; chamber 300; and storage unit 500 are separable by a user by simply pulling or unscrewing parts apart. The first grinding unit 110 is separable from the second grinding unit 130 by pulling the two units (110, 130) apart. The filter 210 is separable from the seat 230 by unscrewing the filter 210 such that lips 222 of the filter 210 are no longer in contact with the mountings lips 240 of the seat 230. The seat 230, valve layer 250 and case 400 are a single unit that can be unscrewed from the chamber 300 by unscrewing the threaded surface 420 of the case 400 from the threaded surface 322 of the connector 320. The storage unit 500 is separable from the chamber 300 by rotating the storage unit 500 such that the storage protrusions 348 of the base 340 slide from the holding depression 522 to the receiving depression 520. The storage unit 500 can then be pulled apart from the chamber 300.

A user rotates the first grinding unit 110 by gripping the first gripping surface 116 with one hand and gripping the second gripping surface 132 of the second gripping unit 130 with another hand. The first grinding unit 110 is then rotated relative to the second grinding unit 130 to grind material between the projections 122 and the offset projections 140. The ground material then falls through the apertures 142. The ground material is then deposited on filter 210. Smaller ground material falls through the selectively porous material 214 of the filter, while larger ground material falls through the aperture 216 of the filter 210. The generally and substantially conical or funnel shape of the filter 210 assists, with the aid of the force of gravity, in urging the larger ground material down toward the aperture 216. After falling through the selectively porous material 214, the smaller ground material is deposited on the filter surface 232 of the seat 230. The smaller ground material may be removed from the filter surface 232 and used in a manner desired by the user. The larger ground material, due to its weight and the force of gravity, pushes the valve arms 266 away from the grinder 100 and falls into the central receptacle 312 where the pre-formed tube 3000 is located. Prior to grinding, the pre-formed tube 3000 is oriented such that the first end 3010, which is an open end of the pre-formed tube 3000, faces the grinder 100 in use.

The user continues grinding material until the pre-formed tube 3000 is sufficiently full of larger ground material. The rod 610 of the stuffer 600 may be used to further compress the ground material within the pre-formed tube 3000 to the desired density.

To remove the pre-formed tube 3000 with the ground material, the storage unit 500 is disconnected from the chamber 300. The storage unit 500 is rotated such that the storage protrusions 348 of the base 340 slide out of the holding depression 522 of the storage connector 510 and into the receiving depressions 520. Once the storage protrusions 348 are in the receiving depressions 520, the storage unit 500 is pulled away from the chamber 300. The user then grips the grips 386 of the plug 380 and pulls the head 382 of the plug 380 out of the plug aperture 362 of the plug base 360 by overcoming the frictional force between the plug lock 384 of the plug 380 and the central indent 364 of the plug base 360. The pre-formed tube 3000 with the ground material can then be removed from the central receptacle 312.

The apparatus 10 permits a user to grind material and have the ground material deposited in a pre-formed tube 3000 without requiring additional user interaction. When the device is upright, with the grinder 100 positioned above the chamber 300, the ground material is deposited into the pre-formed tube 3000 in the central receptacle 312 due to the force of gravity without the need for any additional user action. Furthermore, the apparatus 10 permits for simple removal of the pre-formed tube 3000 with the ground material in it, and storage of additional pre-formed tubes 3000 in the peripheral receptacles 314 of the cylinder 310.

The apparatus 10 also permits storage of material prior to grinding in the storage unit 500, specifically within the cap 550. The simple connections of the elements of the apparatus 10 permit easy connection and disconnection for storage, cleaning and travel.

To clean the apparatus 10, the storage unit 500 is disconnected from the chamber 300. The storage connector 510 is then disconnected from the cap 550 and the cleaning tool 530 is unclipped from the cleaning tool clips 516 of the storage connector 510. The angled ends 536 and the pointed ends 534 of the cleaning tool 530 can be inserted into crevices and recesses where material may have become inadvertently lodged in the apparatus 10.

Figure 20B:
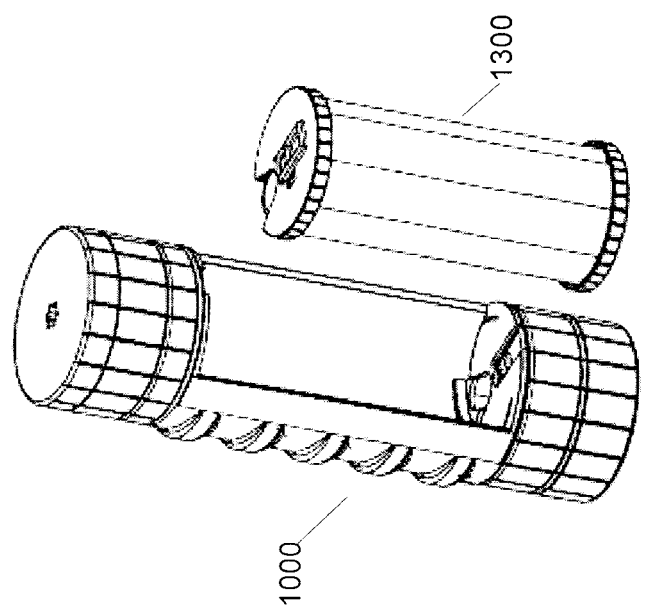
FIG. 20b is a perspective view of the apparatus of FIG. 20a with a cylinder removed from the apparatus.
Figure 20A:
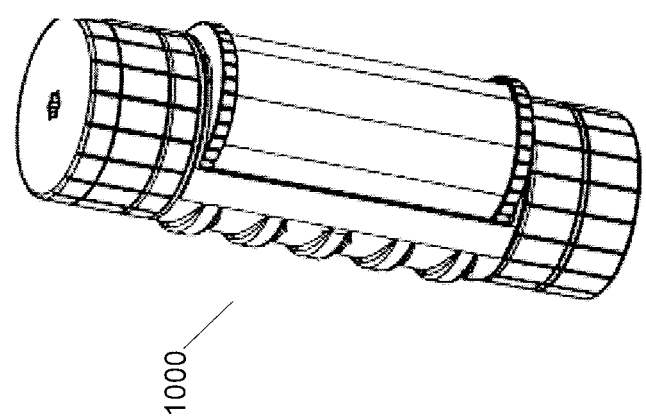
FIG. 20a is a perspective view of the apparatus of FIG. 20 as assembled.
Figure 22C:
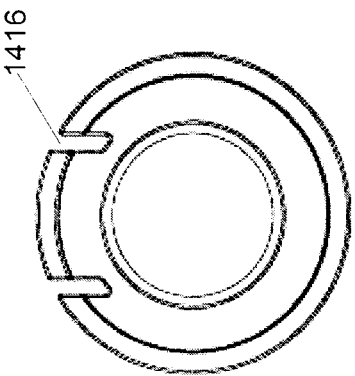
Figure 22B:
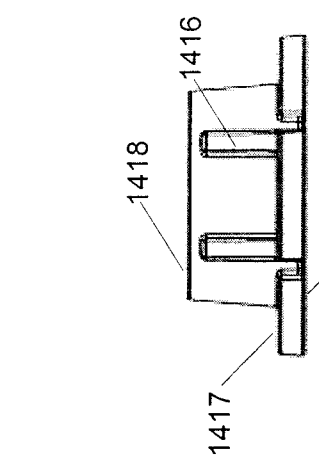
Figure 22A:
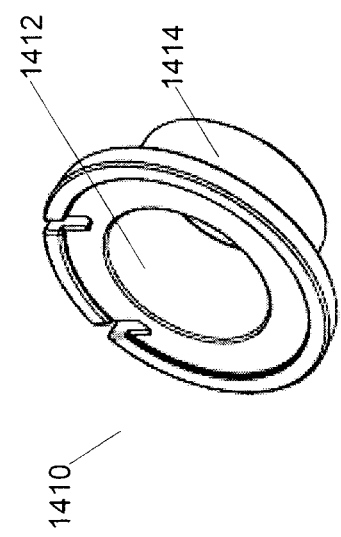
FIG. 22a is a perspective view of a sleeve of the apparatus of FIG. 20.
Figure 22E:
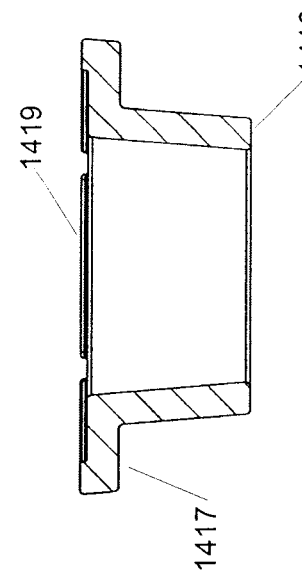
FIG. 22e is a cross-sectional front elevation view of the sleeve of FIG. 22a taken along section line K-K of FIG. 22d.
Figure 22D:
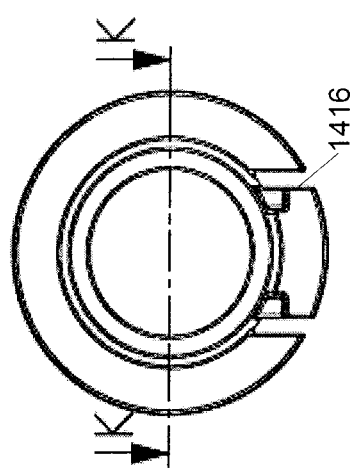
Figure 23C:
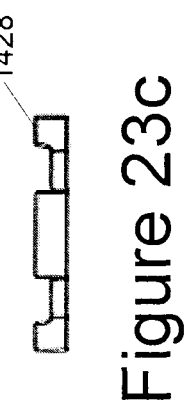
Figure 23E:
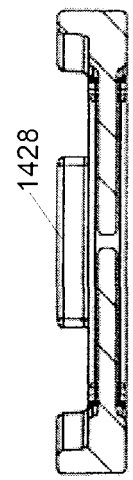
Figure 23B:
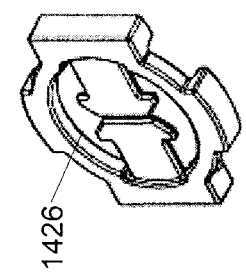
Figure 23D:
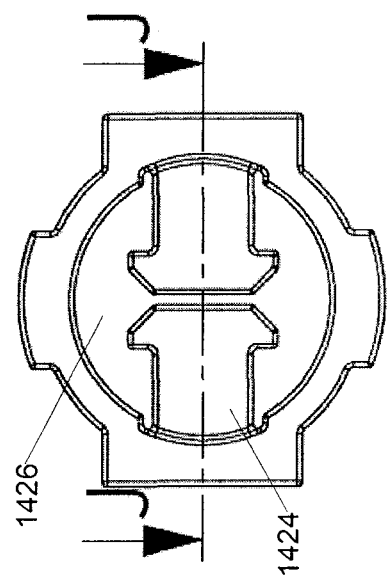
Figure 23A:
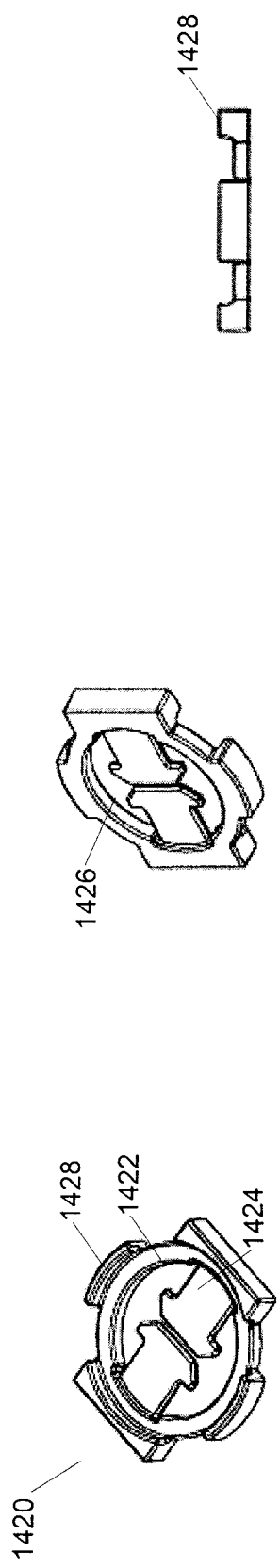
FIG. 23a is a top perspective view of a one-way valve of the apparatus of FIG. 20.

Turning now to FIG. 20, an exploded perspective view of another embodiment of the apparatus 1000 is shown. The apparatus 1000 has a generally and substantially cylindrical shape, thus, the various elements of the apparatus 1000 are generally and substantially cylindrically shaped. In this embodiment, the apparatus 1000 comprises a grinder 1100, a separator 1200, a chamber 1300, a case 1400 and a storage unit 1600. The grinder 1100 is connected to the separator 1200 which is also connected to the case 1400. The chamber 1300 is inserted into the case 1400 and connected thereto. The storage unit 1600 is connected to the case 1400. As shown in FIG. 20a, when the grinder 1100, separator 1200, chamber 1300, case 1400 and storage unit 1600 are connected in this configuration, the apparatus 1000 forms a single unit for grinding material and depositing the ground material into multiple pre-formed tubes 3000 as will be explained in more detail below. Furthermore, as shown in FIG. 20b, the chamber 1300 is removable from the rest of the apparatus 1000.

The grinder 1100 is configured to grind material. The grinder 1100 comprises a first grinding unit 1110, a second grinding unit 1130, a northern magnetic element 1126 and a sleeve 1150 as shown in FIG. 20. The first grinding unit 1110, second grinding unit 1130, northern magnetic element 1126 and sleeve 1150 are similar to the elements of the grinder 100 already described and shown in FIGS. 1 a, 2a to 2f, 3a to 3f, 4a to 4c and 5a to 5f and will not be described further.

The storage unit 1600 is configured to store material. The storage unit 1600 comprises a storage connector 1610 and a cap 1650. The storage unit 1600 is similar to the storage unit 500 already described and shown in FIGS. 1a, 15a to 15f and 17a to 17f and will not be described further. Although not shown, storage unit 1600 may be configured to store the cleaning tool 530 already described and shown in FIGS. 16a to 16f.

As shown in FIG. 20, the separator 1200 comprises a filter 1210 and a seat 1230. The filter 1210 is similar to the filter 210 already described and shown in FIGS. 6a to 6e and will not be described further.

Turning now to FIGS. 21a to 21f, the seat 1230 is shown in more detail. The seat 1230 comprises a filter surface 1232, a threaded surface 1234, a gripping surface 1236, an aperture 1238, mating lips 1240, inner gripping surface 1242, case lips 1244 and stoppers 1246. The filter surface 1232 receives the smaller ground material which passes through the selectively porous material of the filter 1210 while the larger ground material passes through the aperture 1238 as already described. The threaded surface 1234 receives the second grinding unit 1130 as already described. The filter 1210 is connected to the seat 1230 interacting with the mating lips 1240 and the mating stoppers 1246 as already described. The two (2) mounting lips 1240 project from the inner gripping surface 1242 and interact with the case 1400 as will be explained.

As shown in FIG. 20, the case 1400 comprises a valve sleeve 1410, a valve 1420, an upper chamber connector 1430, a lower chamber connector 1450, a base 1470, a plug 1490, a plug base 1510, a cover 1530 and an inner cover 1550.

Turning now to FIGS. 22a to 22e, the valve sleeve 1410 is shown in more detail. The valve sleeve 1410 is generally cylindrical and comprises an inner surface 1412, an outer surface 1414, gaps 1416, a first end 1418, a second end 1419 and a rim 1417. In this embodiment, there are two (2) gaps 1416. The walls of the valve sleeve 1410 are angled such that the second end 1419 is wider than the first end 1418. The second end 1419 contacts the seat 1230 while the first end 1418 contacts the valve 1420. The valve sleeve 1410 acts to direct larger ground material that has passed through the aperture 1238 in the filter 1210 towards the valve 1420 and the upper chamber connector 1430.

Turning now to FIGS. 23a to 23e, the valve 1420 is shown in more detail. The valve 1420 comprises a ring 1422, arms 1424, aperture passage 1426 and clips 1428. The arms 1424 project into the passage 1426 from the ring 1422 and function similarly to the valve arms 266 of the valve 262 already described. The clips 1428 project away from the ring 1422 and interact with the upper chamber connector 1430 as will be described.

Turning now to FIGS. 24a to 24f, the upper chamber connector 1430 is shown in more detail. The upper chamber connector 1430 comprises a projecting portion 1432, case clips 1434, an upper chamber trench 1436, an upper chamber protrusion 1438, a central aperture 1440, valve receiving clips 1442 and a valve sleeve receiver 1444. The projecting portion 1432 has a generally and substantially crescent moon shape. The case clips 1434 interact with the cover 1530 as will be explained. In this embodiment, there are three (3) case clips 1434. The upper chamber trench 1436 and the upper chamber protrusion 1438 interact with the chamber 1300 as will be explained. In this embodiment, there are four (4) valve receiving clips 1442.

The valve 1420 is connected to the upper chamber 1430 by connecting the clips 1428 of the valve 1420 into the receiving clips 1442 of the upper chamber connector 1430 and inserting the valve 1420 into the central aperture 1440 of the upper chamber connector 1430.

The gaps 1416 in the outer surface 1414 of the valve sleeve 1410 align with the valve sleeve receiver 1444 of the upper chamber connector 1430 ensuring that the valve sleeve 1410 cannot rotate relative to the upper chamber connector 1430. The valve sleeve 1410 fits between the upper chamber connector 1430 and the seat 1230 when the upper chamber connector 1430 and seat 1230 are connected together.

Turning now to FIGS. 25a to 25e, the lower chamber connector 1450 is shown in more detail. The lower chamber connector 1450 is similar to the upper chamber connector 1430. The lower chamber connector 1450 comprises a projecting portion 1452, connector clips 1454, a lower chamber trench 1456, a lower chamber protrusion 1458, a central aperture 1460 and a plug indent 1462. The projecting portion 1452 has a generally and substantially crescent moon shape. The case clips 1454 interact with the cover 1530, base 1470 and plug base 1510 as will be explained. In this embodiment, there are three (3) case clips 1454. The lower chamber trench 1456 and the lower chamber protrusion 1458 interact with the chamber 1300 as will be explained.

Turning now to FIGS. 26a to 26e, the base 1470 is shown in more detail. The base 1470 comprises a first surface 1472, a second surface 1474, a central aperture 1476, a ridge 1478, a gap 1480, a central projection 1482, connector clip apertures 1484 and storage clips 1486. The ridge 1478 defines the gap 1480 which interacts with the plug 1490 as will be explained. The central projection 1480 projects into the central aperture 1460 of the lower chamber connector 1450. The connector clip apertures 1484 receive the connector clips 1454 of the lower chamber connector 1450. In this embodiment, there are three (3) connector clip apertures 1484. The storage clips 1486 interact with the storage connector 1610 in the manner previously explained in regards to storage connector 510.

The plug base 1510 is similar to the plug base 360 already described. The connector clips 1454 of the lower chamber connector 1450 pass through the connector clip apertures 1484 of the base 1470 and clip onto the ledges of the plug base 1510 as already described.

Turning now to FIGS. 27a to 27d, the plug 1490 is shown in more detail. The plug 1490 comprises a plug stopper 1492, a mounting aperture 1494, an arm 1496, grips 1498, a head 1500, a second head 1502, a plug lock 1504 and a second plug lock 1506. The plug stopper 1492, mounting aperture 1494, arm 1496 and grips 1498 function as previously described in regards to the plug 380 shown in FIGS. 13a to 13e. The plug lock 1504 projects from the head 1500 and is inserted into the gap 1480 of the base 1470 when the plug 1490 is inserted into the central aperture 1476 of the base 1470. The second plug lock 1506 projects from the second head 1502 and is inserted into the plug indent 1462 of the lower chamber connector 1450 when the plug 1490 is inserted into the central aperture 1460 of the lower chamber connector 1450. In this manner, the plug 1490 is secure within the base 1470 and the lower chamber connector 1450. The plug 1490 can be removed by gripping the grips 1498 and pulling the plug 1490 out of central aperture (1460, 1476). Removing the plug 1490 gives the user access to the contents of the chamber 1300 if the chamber 1300 is connected to the case 1400.

Turning now to FIGS. 28a to 28f, the cover 1530 is shown in more detail. The cover 1530 comprises a lower chamber ring 1532, an upper chamber ring 1534, seat gaps 1536, an inner cover receiver 1538 and cover clips 1540. The lower chamber ring 1532 fits around the lower chamber connector 1450. The upper chamber ring 1534 fits around the upper chamber connector 1430. In this embodiment, the lower and upper chamber connectors (1450, 1430) are connected to the lower and upper chamber rings (1532, 1534), respectively, in one embodiment, using adhesive. The seat gaps 1536 receive the case lips 1244 of the seat 1230. In this embodiment, the seat 1230 is connected to the case 1530, in one embodiment, using adhesive. Further, in this embodiment, there are three (3) seat gaps 1536. The inner cover receiver 1538 and the inner cover clips 1540 interact with the inner cover 1550 to connect the cover 1530 with the inner cover 1550.

Turning now to FIGS. 29a to 29f, the inner cover 1550 is shown in more detail. The inner cover 1550 comprises an inner surface 1552, an outer surface 1554, a cover receiver mate 1556, two gaps 1558, chamber mating inserts 1560 and wings 1562. The cover receiver mate 1556 projects from the outer surface 1554 and is configured to be received by the inner cover receiver 1538 of the cover 1530. As one of ordinary skill in the art will appreciate, the cover receive mate 1556 could receive the inner cover receiver 1538. The gaps 1558 are formed from the wings 1562 which project at an angle from the outer surface 1554. The gaps 1558 are configured to receive the inner cover clips 1540 of the cover 1530. In this manner, the inner cover 1550 is connected to the cover 1530. In this embodiment, additional adhesive may be used to connect the inner cover 1550 to the cover 1530. The chamber mating inserts 1560 project from the inner surface 1552 of the inner cover 1550 and are located on either end of the inner cover 1550. The chamber mating inserts 1560 are configured to receive the chamber 1300 as will be described.

As shown in FIG. 20, the chamber 1300 comprises a cylinder 1310, a first cylinder end 1320 and a second cylinder end 1340.

Turning now to FIGS. 30a to 30d, the cylinder 1310 is shown in more detail. The cylinder 1310 comprises a central receptacle 1312, peripheral receptacles 1314, a first end 1316, a second end 1318 and apertures 1319. In this embodiment, the receptacles are generally and substantially cylindrically shaped. The receptacles are hollow throughout and are sized to receive the pre-formed tube 3000. There is the same number of peripheral receptacles 1314 as apertures 1319. In this embodiment, there are six (6) peripheral receptacles 1314 and six (6) apertures 1319. The apertures 1319 interact with the first and second cylinder ends (1320, 1340) as will be described.

Turning now to FIGS. 31a to 31d, the first cylinder end 1320 is shown in more detail. The first cylinder end 1320 comprises an outer surface 1322, an inner surface 1324, a head 1326, a rectangular frame 1328, a circular frame 1330, a first shaft 1332, a case mating gap 1334, a tab 1336 and a cylinder protrusion 1338. The rectangular frame 1328 and the circular frame 1330 project from the outer surface 1322 of the head 1326. The first shaft 1332 is tapered such that the end nearest the inner surface 1324 is wider than the end farthest from the inner surface 1324. The first shaft 1332 is sized to fit in the central receptacle 1312 of the cylinder 1310. The first shaft 1332 connects to the second cylinder head 1340 as will be described. In this embodiment, the first shaft 1332 is hollow and has a generally and substantially hexagonal shape. The case mating gap 1334 guides the connection of the chamber 1300 to the cover 1530 and inner cover 1550 as will be described. The tab 1336 is configured such that it can rotate relative to the head 1326. In this embodiment, the tab 1356 is flexibly connected to the head 1326. The cylinder protrusion 1338 extends from the tab 1336 in the same direction as the first shaft 1332. The cylinder protrusion 1338 interacts with the apertures 1319 of the cylinder 1310 as will be described.

Turning now to FIGS. 32a to 32d, the second cylinder end 1340 is shown in more detail. The second cylinder end 1340 comprises an outer surface 1342, an inner surface 1344, a head 1346, a rectangular frame 1348, a circular frame 1350, a second shaft 1352, a case mating gap 1354, a tab 1356 and a cylinder protrusion 1358. The rectangular frame 1348 and the circular frame 1350 project from the outer surface 1342 of the head 1346. The second shaft 1352 receives the first shaft 1332 of the first cylinder head 1320. The second shaft 1352 is sized to fit in the central receptacle 1312 of the cylinder 1310. In this embodiment, the second shaft 1352 is hollow and has a generally and substantially hexagonal shape. The case mating gap 1354 guides the connection of the chamber 1300 to the cover 1530 and inner cover 1550 as will be described. The tab 1356 is configured such that it can rotate relative to the head 1346. In this embodiment, the tab 1356 is flexibly connected to the head 1346. The cylinder protrusion 1358 extends from the tab 1356 in the same direction as the second shaft 1352. The cylinder protrusion 1358 interacts with the apertures 1319 of the cylinder 1310 as will be described.

The first and second cylinder ends (1320, 1340) are connected by inserting the first shaft 1332 and the second shaft 1352 into the central receptacle 1312. The first shaft 1332 frictionally fits into the second shaft 1352 such that chamber mating gaps (1334, 1354) are aligned. The cylinder protrusions (1338, 1358) are each inserted into separate single apertures 1319 of the cylinder 1310. One cylinder protrusion 1338 is inserted into an aperture 1319 on the first end 1316 and one cylinder protrusion 1358 is inserted into an aperture 1319 on the second end 1318. The cylinder ends (1320, 1340) may be flipped such that the cylinder protrusions (1338, 1358) can be inserted into apertures 1319 on either the first or second end (1316, 1318).

In this manner, a user has access to a single peripheral receptacle 1314 of the cylinder. Once the first and second shafts (1332, 1352) are connected, the first and second cylinder ends (1320, 1340) are rotatable. Rotating the first and second cylinder ends (1320, 1340) causes the cylinder protrusions (1338, 1358) to come out of the apertures 1319 of the cylinder 1310. The tabs (1336, 1356) flex away from the heads (1326, 1346) of the first and second cylinder ends (1320, 1340) to allow the cylinder protrusions (1338, 1358) to come out of the apertures 1319. As the first and second cylinder ends (1320, 1340) rotate to another peripheral receptacle 1314, the cylinder protrusions (1338, 1358) are inserted into other apertures 1319 on the first and second end (1316, 1318) of the cylinder 1310 and the tabs (1336, 1356) flex back to their resting positions. In this embodiment, during rotation an audible clicking is heard from the removal and insertion of the cylinder protrusions (1338, 1358) indicating to the user that a different peripheral receptacle 1314 has been selected.

Rotating the first and second cylinder ends (1320, 1340) changes which peripheral receptacle 1314 the user has access to such that every single peripheral receptacle 1314 is individually accessible. Individual pre-formed tubes 3000 can be inserted into each peripheral receptacle 1314 by rotating the first and second cylinder end (1320, 1340). The individual peripheral receptacle 1314 is accessible through the chamber mating gaps (1334, 1354) while the heads (1326, 1346) block all other peripheral receptacles 1314.

The cylinder 1300 is connected to the case 1400 by inserting the cylinder 1300 such that the circular frames (1330, 1350) receive the upper chamber trench 1436 of the upper chamber connector 1430 and the lower chamber trench 1456 of the lower chamber connector 1450. The rectangular frames (1328, 1348) are also received within the upper chamber trench 1436 and the lower chamber trench 1456. The chamber 1300 can be flipped such that either rectangular frame (1328, 1348) and either circular frame (1330, 1350) contacts either the upper or the lower chamber trench (1436, 1456) and the upper or the lower chamber protrusion (1438, 1458), respectively. This established a frictional fit between the chamber 1300 and the upper and lower chamber connector (1430, 1450).

The chamber mating inserts 1560 of the inner cover 1550 contact the chamber mating gaps (1334, 1354) of the first and second cylinder ends (1320, 1340), respectively. The chamber mating inserts 1560 act to guide the chamber 1300 into connection with the upper and lower chamber connector (1430, 1450). When the chamber 1300 is connected to the upper and lower chamber connector (1430, 1450), the cylinder 1310 can be rotated to access the different peripheral receptacles 1314 as already explained.

In use, material is ground and separated as already explained. The larger ground material is then deposited in the peripheral receptacle 1314 selected by the user and into the first end 3010 of the pre-formed tube 3000. Once the pre-formed tube 3000 within the particular peripheral receptacle 1314 reaches the desired level of larger ground material, the chamber 1300 can be removed and the cylinder 1310 or first and second cylinder ends (1320, 1340) are rotated to select a different peripheral receptacle 1314 containing a different pre-formed tube 3000. The user can also rotate the cylinder 1310 while the chamber 1300 is connected to the upper and lower chamber connector (1430, 1450) to change the peripheral receptacle 1314 containing a different pre-formed tube 3000 into which larger ground material is deposited. In this manner, the user can quickly and easily fill six (6) pre-formed tubes 3000 with large ground material, by simply rotating the cylinder 1310.

To remove a pre-formed tube 3000 from a peripheral cylinder 1314, the chamber 1300 can be removed and the pre-formed tube 3000 is immediately accessible from the peripheral receptacle 1314 aligned to the chamber mating gaps (1334, 1354). The pre-formed tube 3000 may instead be removed by removing the plug 1490 from the central aperture 1460 of the lower chamber connector 1450 and the central aperture of the plug base 1510. The pre-formed tube 3000 may be pushed out from a peripheral receptacle 1314 using any element of the stuffer 600 as already described.

In another embodiment, the various components of the apparatus (10, 1000) have a generally and substantially non-cylindrical shape such that the apparatus (10, 1000) has a generally and substantially non-cylindrical shape.

In another embodiment, shown in FIGS. 33a to 33f, the first grinding unit (110, 1110) comprises a grinding plate 2010 and a grip 2020. The grinding plate 2010 functions similarly to the first grinding unit (110, 1110) as already described. The grinding plate 2010 is clear such that a user can view the material being ground. The grip 2020 comprises a gripping surface 2022, an inner surface 2024 and a lip 2026. The grinding plate 2010 is configured to fit into the grip 2020. The grinding plate 2010 abuts the lip 2026 of the grip 2020. In this embodiment, the grinding plate 2010 is secured to the lip 2026, in one embodiment, using an adhesive.

In another embodiment, the first grinding unit (110, 1110) is engraved with text or a design indicating a logo, trademark and/or text such as instructions on use. The projections (122, 140) of the first grinding unit (110, 1110) and the second grinding unit (130, 1130), respectively, may be various shapes, such as a generally and substantially knife shape, or sizes. Each projection (122, 140) may have a different shape.

In another embodiment, the protrusion 124 of the first grinding unit (110, 1110) is in a non-central location. The various other components of the apparatus (10, 1100) are still aligned with the protrusion 124 to function as described.

In another embodiment, the second grinding unit (130, 1130) has a window similar to the window aperture 410 in the case 500 already described. The window in the second grinding unit (130, 1130) permits the user to view the grinding of the material.

In another embodiment, the sleeve (150, 1150) of the apparatus (10, 1000) is removably affixed to the second grinding unit (130, 1130). The sleeve (150, 1150) may be affixed to the second grinding unit (130, 1130) by friction such that it may be removed by a user if desired.

In another embodiment, the case 500 does not have a window aperture 410.

In another embodiment, the first grinding unit (110, 1110); second grinding unit (130, 1130) with sleeve 150; filter (210, 1210); seat (230, 1230) with valve layer 250 and case (400, 1400), storage unit (500, 1600) and chamber (300, 1300) form separate elements, which may sold separately as parts of a kit to be assembled or as unit which can be disassembled and reassembled as desired.

In another embodiment, the valve disc 252 of the valve layer 252 does not comprise seat indents 254 and the seat 230 does not comprise valve projections 244.

In another embodiment, the cleaning tool 530 has a different configuration. Turning now to FIGS. 34a to 34d, another embodiment of a cleaning tool 2530 is shown in more detail. The cleaning tool 2530 comprises a central portion 2532, a pointed end 2534, an angled end 2536, a shovel end 2538 and a wedge end 2540. The ends (2534, 2536, 2538 and 2540) extend from the central portion 2532. The ends (2534, 2536, 2538 and 2540) form various shapes to assist in cleaning the apparatus (10, 1000). In this embodiment, the cleaning tool 2530 is generally and substantially X-shaped. The angled end 2536 comprises an abrasive surface to assist in cleaning and/or scraping. In this embodiment, the abrasive surface comprises a series of lined extrusions that provide a coarse texture to form an abrasive surface when cleaning and/or scraping.

Turning now to FIG. 35, an exploded perspective view of another embodiment of the apparatus 3050 is shown. The apparatus 3050 has a generally and substantially cylindrical shape, thus the various elements of the apparatus 3050 are generally and substantially cylindrically shaped. In this embodiment, the apparatus 3050 comprises a grinder 3100, a separator 3200, a chamber 3300, a case 3400 and a storage unit 3500. The chamber 3300 is inserted into the case 3400 and connected thereto. The storage unit 3500 is connected to the chamber 3300. As with the apparatus 1000 shown in FIGS. 1a to 1f, when the grinder 3100, separator 3200, chamber 3300, case 3400 and storage unit 3500 are connected in this configuration, the apparatus 3050 forms a single unit for grinding material and depositing the material into the chamber 3300.

The grinder 3100 is configured to grind material. The grinder 3100 comprises a first grinding unit 3110, a second grinding unit 3140 and a sleeve 3150. The first grinding unit 3110 comprises a grip 3112 and a plate 3124.

Turning now to FIGS. 36a to 36c, the grip 3112 is better illustrated. The grip 3112 comprises an outer surface 3114, a first inner surface 3116, a second inner surface 3118 and an opening 3122.

Turning now to FIGS. 37a to 37d, the plate 3124 is better illustrated. The plate 3124 comprises projections 3126, a protrusion 3128, an inner surface 3130, an outer surface 3132, a first wall surface 3134 and a second wall surface 3136. The projections 3126 and the protrusion 3128 extend vertically from the inner surface 3130. Furthermore, in this embodiment, there are sixteen (16) generally and substantially conically shaped projections 3126 and the protrusion 3128 is generally and substantially star shaped. While not pictured, the protrusion 3128 may house a magnetic element as already described in the apparatus 10. As shown in FIG. 37b, in this embodiment, the outer surface 3132 is generally and substantially conically shaped.

The plate 3124 is fixed to the grip 3112 by inserting the plate 3124 into the opening 3122 such that the first wall surface 3134 of the plate 3124 contacts the first inner surface 3116 of the grip 3112 and the second wall surface 3136 of the plate 3124 contacts the second wall surface 3118 of the grip 3112. In this configuration, the projections 3126 and the protrusion 3128 of the plate 3124 extend away from the first wall surface 3116 of the grip 3112. In this embodiment, the plate 3124 is secured to the grip 3112, in one embodiment, using an adhesive placed on the first wall surface 3134, the second wall surface 3137, the first inner surface 3116, and/or the second inner surface 3118.

As shown in FIG. 35, the second grinding unit 3140 and the sleeve 3150 are similar to the second grinding unit 130 and the sleeve 150, respectively, already described and will therefore not be described further. In an embodiment, the sleeve 3150 may be made of nylon which naturally repels oil. A nylon sleeve 3150 would therefore prevent a build-up of oil between the first grinding unit 3110 and the second grinding unit 3140.

While not shown in FIG. 35, in one embodiment of the present invention, the grinder 3100 may comprise a magnet assembly similar to the magnet assembly 160 of apparatus 10 shown in FIG. 1. Since the magnet assembly 160 of apparatus 10 has already been described, it will therefore not be described further.

As shown in FIG. 35, the separator 3200 comprises a funnel 3210, a seat 3230, a dial 3250 and a disc 3270.

Turning now to FIGS. 38a to 38e, the funnel 3210 is shown in more detail. The funnel 3210 comprises a funnelling surface 3212, an aperture 3214, an upper rim 3216, a lower rim 3218, lips 3220 and stoppers 3222. The funnelling surface 3212 is configured to guide ground material towards the aperture 3214. The lips 3220 project outwardly from the lower rim 3218 and interact with the seat 3230 as will be explained. In this embodiment, there are two (2) lips 3220. The stoppers 3222 project towards the lower rim 3218 from the upper rim 3216. The bottom edge of the upper rim 3216 and the stoppers 3222 interact with the seat 3230 as will be explained. In this embodiment, the aperture 3214 is generally and substantially centrally located.

In this embodiment, the funnelling surface 3212 does not comprise a selectively porous material. However, one of skill in the art will appreciate that the funnelling surface 3212 can partially or substantially entirely comprise a selectively porous material similar to the configuration of the filter 310 of the separator 200 of apparatus 10.

Turning now to FIGS. 39a to 39f, the seat 3230 is shown in more detail. The seat 3230 comprises a filter surface 3232, a threaded surface 3234, a second aperture 3236, mounting lips 3238, clips 3240, mating stoppers 3242, dial pin 3244 and a dial guide 3246. The two (2) mating stoppers 3242 project upwardly from the threaded surface 3224 and interact with the stoppers 3222 of the funnel 3210 similar to the interaction between the mating stoppers 248 of the seat 230 and the stoppers 224 of the filter 210 of apparatus 10. The two (2) mounting lips 3238 interact with the lips 3220 of the funnel 3210 similar to the interaction between the mounting lips 240 of the seat 230 and the lips 222 of the filter 210 of apparatus 10.

The two (2) clips 3240 project downwardly from the filter surface 3232 and interact with the case 3400 as will be described. The second aperture 3236 is sized to match the aperture 3214 of the funnel 3210. The dial pin 3244 and the dial guide 3246 project in the same direction as the clips 3240 and away from the threaded surface 3234. The dial pin 3244 and dial guide 3246 interact with the dial 3250 as will be described.

In use, the filter surface 3232 receives filtered ground material when the funnel 3210 comprises selectively porous material and is configured to filter out larger ground material similar to the filter 210 of apparatus 10.

Turning now to FIGS. 40a to 40d, the dial 3250 is shown in more detail. The dial 3250 comprises a material aperture 3252, a pin aperture 3254, a first surface 3256, a second surface 3258, a blocker 3260, a serrated edge 3262, a channel 3264 and ribs 3266. The material aperture 3252 is sized to match the second aperture 3236 of the seat 3230 and the aperture 3214 of the funnel 3210. The pin aperture 3254 is sized to receive the dial pin 3244 of the seat 3230. The blocker 3260 is configured to restrict rotation of the dial 3250 to a set range as will be described. The serrated edge 3262 is configured to allow a user to easily grip and rotate the dial 3250. The channel 3264 is on the second surface 3258. The channel 3264 is configured to receive the dial guide 3246 of the seat 3230. Within the channel 3264 there are two (2) ribs 3266 in this embodiment which lock the dial 3250 in two different positions as will be described.

Turning now to FIGS. 41a to 41d, the disk 3270 is shown in more detail. The disk 3270 comprises a first surface 3272, a second surface 3274, a generally and substantially L-shaped arm 3276, an arm 3278, a second material aperture 3280, a second pin aperture 3282 and a conduit 3284. The generally and substantially L-shaped arm 3276 projects away from the first surface 3272. The generally and substantially L-shaped arm 3276 and the arm 3278 interact with the case 3400 as will be described. The second material aperture 3280 is sized similar to the material aperture 3252 of the dial 3250. The second pin aperture 3282 is sized to receive the dial pin 3244 of the seat 3230. The conduit 3284 is configured to guide ground material to the chamber 3300. In this embodiment, the conduit 3284 has a generally and substantially frustoconical shape.

Turning now to FIGS. 42a to 42c, the case 3400 is shown in more detail. The case 3400 comprises a threaded surface 3402, clip slots 3404, an upper groove 3406 and a lower groove 3408. The clip slots 3404 are sized to receive the clips 3240 of the seat 3230. The upper groove 3406 receives the generally and substantially L-shaped arm 3276 of the disk 3270 and the lower groove 3408 receives the arm 3278 of the disk 3270.

In this configuration, the disk 3270 rests on the case 3400 and the disk 3270 and dial 3250 are secured between the seat 3230 and the case 3400. In one embodiment, an adhesive may be used to further secure the disk 3270 and seat 3230 to the case 3400.

As shown in FIG. 35, the chamber 3300 comprises a cylinder 3310, a connector 3330, a base 3340, a plug base 3360 and a plug 3380. The connector 3330, base 3340, plug base 3360 and plug 3380 are similar to the connector 320, base 340, plug base 360 and plug 380, respectively, of the apparatus 10 already described. The thread surface 3402 of the case 3400 is configured to be screwed to the connector 3320 of the chamber 3300.

In use, the dial 3250 can be rotated such that the dial guide 3246 of the seat 3230 moves from one end of the channel 3264 to the other. When the dial guide 3246 is located at one end of the channel 3264, the rib 3266 prevents accidental movement of the dial guide 3246. In this configuration, the dial 3250 prevents egress of ground material through the material aperture 3252 as the passage from the second aperture 3236 is blocked by the first surface 3256 of the dial 3250. The user is required to apply force to dial 3250 on the serrated edge 3262 to rotate the dial 3250 and move the dial guide 3246 past the rib 3266 and thus move the dial 3250 such that the first surface 3256 does not completely block passage from the second aperture 3236 of the seat 3230. Once the dial 3250 has been completely rotated and the dial guide 3246 moves past the rib 3266 to the opposite end of the channel 3264, the first surface 3256 no longer prevents egress of ground material and now, the material aperture 3252 is aligned with the second aperture 3236 of the seat 3230 to permit ground material to fall from the funnel 3210 to the chamber 3300. When the second aperture 3236 is fully blocked by the first surface 3256, the blocker 3260 contacts one of the clips 3240 of the seat 3230 of the disk 3270 to prevent further rotation of the dial 3250 in one direction. When the second aperture 3236 is fully unblocked by the first surface 3256 and aligned with the material aperture 3252, the blocker 3260 contacts the other clip 3240 of the seat 3230 to prevent further rotation of the dial 3250 in the opposite direction.

In this manner, a user can grind material in the grinder 3100 and store the ground material in the funnel 3210 prior to depositing it into the chamber 3300.

Turning now to FIGS. 43*a* and 43*b*, the cylinder 3310 is shown in more detail. The cylinder 3310 is secured to the base 3340 in a manner similar to the securing of the cylinder 310 to the base 340 of the apparatus 10. The cylinder 3310 comprises receptacles, in this embodiment, a primary receptacle 3312 and secondary receptacles 3320. The receptacles are hollow throughout and are each configured to store the pre-formed tube 3000. The primary receptacle 3312 comprises a central portion 3314, a peripheral portion 3316 and a main gap 3318. The central portion 3314 is sized to receive a pre-formed tube 3000 through an open end of the primary receptacle 3312, not from the peripheral portion 3316. The peripheral portion 3316 and the main gap 3318 are sized such that a pre-formed tube 3000 can be inserted through the main gap 3318 into the peripheral portion 3316. In this configuration, a pre-formed tube 3000 cannot move out of or into the central portion 3314 except through an open end of the primary receptacle 3312.

In this embodiment, there are two (2) secondary receptacles 3320. Each secondary receptacle comprises a gap 3222. The secondary gap 3222 is sized such that the pre-formed tube 3000 cannot be removed or inserted from the secondary gap 3222, but must be removed/inserted through an open end of the secondary receptacle 3320. In this configuration, a pre-formed tube 3000 cannot move out of or into the secondary receptacle 3320 except through an open end of the secondary receptacle 3320.

As one skilled in the art will appreciate, the cylinder 3310 can be replaced with the cylinder 310 of apparatus 10 shown in FIG. 1 or with cylinder 1310 of apparatus 1000 shown in FIG. 20.

In this embodiment, the pre-formed tube 3000 is secured in a casing 3600 prior to insertion into a receptacle of the cylinder 3310. Turning now to FIGS. 44*a* to 44*c*, the casing 3600 is shown in more detail. The casing 3600 comprises an opening 3602, an angled portion 3604, a base portion 3606 and a gap 3608. The casing 3600 is hollow throughout. The opening 3602 is sized to receive a pre-formed tube 3000. The decrease in diameter of the angle portion 3604 from the opening 3602 to the base portion 3606 corresponds to the change in diameter of the pre-formed tube 3000. The increase in diameter at the base portion 3606 prevents the pre-formed tube 3000 from falling out of the casing 3600 except through the opening 3602. The gap 3608 is shaped to assist a user in removing a pre-formed tube 3000 from the opening 3602.

As one of skill in the art will appreciate, the length of the angled portion 3604 and the base portion 3606 can be varied depending on the shape and size of the pre-formed tube 3000.

In use, a user inserts a pre-formed tube 3000 into the opening 3602 of the casing 3600. The pre-formed tube 3000 stops at the base portion 3606 of the casing 3000 due to the change in diameter of the angled portion 3604. The casing 3600 is then inserted, either into the primary receptacle 3312 or the secondary receptacle 3320 through an opening in the primary receptacle 3312 or the secondary receptacle 3320, respectively. If the casing 3600 is inserted into the central portion 3314 of the primary receptacle 3312, it may receive ground material depending on the orientation of the dial 3250. The central portion 3314 is sized such that the casing 3600 can only be removed from the central portion 3314 from an open end thereof. Once a sufficient amount of ground material is deposited into the preformed tube 3000, the user can remove the casing 3600 complete with the pre-formed tube 3000 which now contains ground material.

As shown in FIG. 35, the storage unit 3500 is similar to the storage unit 500 already described and will therefore not be described further.

Turning now to FIGS. 45*a* to 45*c*, another embodiment of the funnel 3210 of the apparatus 3050 is shown. In this embodiment, the funnel 3210 further comprises an adapter 4000, a sleeve 4030 and a blender 4060.

Turning now to FIGS. 46*a* to 46*d*, the adapter 4000 is shown in more detail. The adapter 4000 comprises a threaded surface 4002, a mating surface 4004 and a lip 4006. The lip 4006 projects away from the mating surface 4004. The mating surface 4004 interacts with the sleeve 4030 as will be described. The threaded surface 4002 is configured to be screwed to the threaded surface 3234 of the seat 3230 to connect the adapter 4000 to the seat 4230. In this configuration, the funnel 3210 is rigidly held between the seat 3230 and the adapter 4000. In one embodiment, an adhesive may be used to further hold the funnel 3210 in place.

Turning now to FIGS. 47*a* to 47*d*, the sleeve 4030 is shown in more detail. The sleeve 4030 comprises an outer threaded surface 4032, a grip surface 4034, a rim 4036 and lip clips 4038. The sleeve 4030 is rotatable relative to the adapter 4000 as will be described. The outer threaded surface 4032 is configured to be screwed to the threaded surface of the second grinding unit 3140 to connect the second grinding unit 3140 to the sleeve 4030. The lip clips 3048 fit over the lip 4006 of the adapter 4000 such that the lip 4006 abuts the rim 4036. The sleeve 4030 is thereby held securely to the adapter 4000, but is still rotatable with respect to the adapter 4000.

Turning now to FIGS. 48*a* to 48*e*, the blender 4060 is shown in more detail. The blender 4060 comprises a ring 4062, arms 4064, an auger 4066 and a blending arm 4068. The arms 4064 project from the ring 4062 to the auger 4066 which, in this embodiment, is generally and substantially centrally located. In this embodiment, there are four (4) arms 4064, but one skilled in the art will appreciate that other number of arms 4064 are possible. The auger 4066 is aligned with the aperture 3214 of the funnel 3210 as shown in FIG. 45c. The blending arm 4068 projects from the auger 4066 and is used to blend ground material as will be described.

The ring 4062 of the blender 4060 rests on top of the sleeve 4030 as shown in FIGS. 45b and 45c. The blender 4060 is held in between the second grinding unit 3140 and the sleeve 4030 when the second grinding unit 3140 is screwed to the sleeve 4030. By gripping the grip surface 4034 of the sleeve 4030 and rotating the sleeve 4030, the blender 4060 is configured to rotate as well. The blender 4030 rotates within the funnel 3210 and the blending arm 4068 moves along the inner wall of the funnel 3210 to blend with contents in the funnel 3210. This permits a user to block the second aperture 3236 of the seat 3230 with the dial 3250 as previously described, grind one or more type(s) of material into the funnel 3210, blend the material(s) with the blender 4060 by rotating the sleeve 4030 and blender 4060, rotate the dial 3250, and allow the blended ground material to be deposited into the chamber 3300.

Furthermore, once the dial 3250 is rotated and the chamber 3300 is accessible, the blender 4060 and sleeve 4030 can be rotated and the auger 4066 of the blender 4060 assists in the depositing of the ground material into the chamber 3300 by forcing the ground material through the aperture 3214 of the funnel 3210.

Turning now to FIG. 49, an exploded perspective view of another embodiment of the apparatus 5000 is shown. The apparatus 5000 has a generally and substantially cylindrical shape, thus the various elements of the apparatus 5000 are generally and substantially cylindrically shaped. In this embodiment, the apparatus 5000 comprises a grinder 5100, a separator 5200, a chamber 5300, a case 5400 and a storage unit 5500. The grinder 5100 comprises a first grinding unit 5110, a second grinding unit 5140, a sleeve 5150 and a magnet assembly 5160. The first grinding unit 5110, second grinding unit 5140 and sleeve 5150 are similar to the first grinding unit 3110, second grinding unit 3140 and sleeve 3150 of grinder 3100 of the apparatus 3050 and will therefore not be described further. The magnet assembly 5160 is similar to the magnet assembly 160 of the grinder 100 of the apparatus 10 and will therefore not be described further.

As further shown in FIG. 49, the separator comprises a blender 5210, a sleeve 5220, an adapter 5230, a funnel 5240, a seat 5250, a dial 5260, a washer 5270, a support 5280, a disk 5290 and a tube 5410. The sleeve 5220, adapter 5230, funnel 5240, seat 5250 and dial 5260 are similar to the sleeve 4030, adapter 4000, funnel 3210, seat 3230 and dial 3250, respectively, already described and will therefore not be described further.

Turning now to FIGS. 50a to 50e, the blender 5210 is shown in more detail comprising a ring 5212, a blending arm 5214, a generally and substantially L-shaped arm 5216 and an auger 5218. Similar to the blender 4060, the blending arm 5214 projects from the ring 5212 and the generally and substantially L-shaped arm 5216 projects from the ring 5212 to the auger 5218. The blending arm 5214 is configured to blend ground material within the funnel 5240 as described with reference to the blender 4060. The auger 5218 is configured to force ground material to be deposited into the chamber 5300.

Turning now to FIGS. 51a to 51d, the support 5280 is shown in more detail. The support 5280 comprises a washer surface 5282, a nub 5283, a pin aperture 5284, a tube aperture 5285, a guide 5286 and prongs 5288. The washer surface 5282 is sized to receive the washer 5270. The washer 5270 ensures that the support 5280 does move towards the dial 5260, but is held against the disk 5290. The prongs 5288 extend away from the washer surface 5282 in the same direction as the guide 5286. In this embodiment, there are four (4) prongs 5288 although one skilled in the art will appreciate that more or fewer prongs 5288 are possible. The prongs 5288 are configured such that the tube aperture 5285 has four indents as shown in FIG. 51c. The prongs 5288 interact with the tube 5410 as will be described.

Turning now to FIGS. 52a to 52d, the disk 5290 is shown in more detail. The disk 5290 comprises a first surface 5292, a first generally and substantially L-shaped arm 5294, a second generally and substantially L-shaped arm 5296, ridges 5298, a material aperture 5402, a first aperture 5404 and a second aperture 5406. The generally and substantially L-shaped arms (5294, 5296) extend away from the first surface 5292 and interact with the case 5400 similar to the interaction of the generally and substantially L-shaped arm 3276 and the arm 3278 of the disk 3270 with the case 3400 of the apparatus 3050 already described. The prongs 5288 of the support 5280 extend through the material aperture 5402 of the disk 5290. The nub 5283 of the support 5280 is positioned between one of the ridges 5298 and one of the generally and substantially L-shaped arms (5294, 5296) of the disk 5290 depending on the orientation. The pin aperture 5284 of the support 5280 receives the dial pin from the seat 5250 which is then received by the first aperture 5404 of the disk 5290. The second aperture 5406 of the disk 5290 receives the guide 5286 of the support 5280. In this configuration, the support 5280 does not rotate relative to the disk 5290.

Turning now to FIGS. 53a to 53c, the tube 5410 is shown in more detail. The tube 5410 comprises an elongate hollow body 5412, mounting clips 5414 and a tip 5416. In this embodiment, there are four (4) mounting clips 5414 and the tip 5416 is angled. The tube 5410 is secured to the support 5280 by inserting the prongs 5288 into the hollow body 5412 and pressing the mounting the clips 514 such that they contact the washer surface 5282 of the support 5280 between the prongs 5288. The tube 5410 is configured to direct ground material into a pre-formed tube 3000 placed within the central portion of the cylinder 5310 of the apparatus 5000.

As shown in FIG. 49, the chamber 3300 comprises a cylinder 5310, a connector 5330, a base 5340, a plug base 5360 and a plug 5380. The cylinder 5310 is similar to the cylinder 3310 already described and will therefore not be described further. As one skilled in the art will appreciate, the cylinder 5310 can be replaced with the cylinder 310 of apparatus 10 shown in FIG. 1 or with cylinder 1310 of apparatus 1000 shown in FIG. 20.

The connector 5330, base 5340 and plug base 5360 are similar to connector 320, base 340 and plug base 360, respectively, of the chamber 300 of the apparatus 10 already described and will therefore not be described further.

Turning now to FIGS. 54a to 54f, the plug 5380 is shown in more detail. The plug 5380 comprises a head 5382, a plug lock 5384, grips 5386, an arm 5388, a mounting aperture 5390, fingers 5392 and a plug aperture 5394. The head 5382 is sized to fit the plug aperture of the plug base 5360. In this embodiment, there are two grips 5386 opposite each other. The grips 5386 ensure that removing the plug 5380 from the plug base 5360 is easily done by a user. The arm 5388 is made of a flexible material such that it can be bent as shown in FIG. 54b. The mounting aperture 5390 is sized such that the plug mount of the plug base 5360 can be inserted into it. The plug 5380 is connected to the plug base 5380 in a similar manner to which the plug 380 is connected to the plug base 360 of the apparatus 10. In this embodiment, there are four (4) fingers 5392, although a person of skill in the art will appreciate that other numbers of fingers 5392 may be used. The fingers 5392 are of a flexible material and are configured to bend to allow the pre-formed tube 3000 to exit the cylinder 5310 as will be described. Once the fingers 5392 are bent, the plug aperture 5394 is exposed.

Similar to plug 380, the head 5382 of plug 5380 can be removed from the plug aperture of the plug base 5360 by gripping the grips 5386 of the plug 5380 and pulling the head 5382 out of the plug aperture thereby compressing the plug 5380 such that it can overcome the frictional force imparted by the central I indent of the plug base 5360.

The case 5400 is similar to the case 3400 of the apparatus 3050 and will therefore not be described further.

As shown in FIG. 49, the storage unit 5500 comprises a storage connector 5510, a cleaning tool 5530 and a cap 5550. The storage connector 5510 and cap 5550 are similar to the storage connector 510 and cap 550 of the storage unit 500 of the apparatus 10 and will therefore not be described further.

Turning now to FIGS. 55a and 55b, the cleaning tool 5530 is shown in more detail. The cleaning tool 5530 comprises a central portion 5532, a pointed end 5534, an angled end 5536 and a shovel 5538. The pointed end 5534, angled end 5536 and shovel 5538 extend from the central portion 5532. The cleaning tool 5530 is sized to be removably secured to the storage connector 5510 by cleaning tool clips similar to the cleaning tool clips 516 of the storage connector 510 of the apparatus 10. The angle end 5536 comprises an abrasive surface to assist in cleaning and/or scraping. In this embodiment, the abrasive surface comprises a series of lined extrusions that provide a coarse texture to form an abrasive surface when cleaning and/or scraping.

In another embodiment, the apparatus 5000, does not comprise the washer 5570, support 5280, disk 5290 and tube 5410, but instead comprises the tube-support 6000 shown in FIGS. 56a to 56d. The tube support 6000 comprises a first surface 6002, a second surface 6004, an arm 6006, a generally and substantially L-shaped arm 6008, a material aperture 6010, a pin aperture 6012, a hollow body 6014 and a tip 6016. The arm 6006 and generally and substantially L-shaped arm 6008 extend from the first surface 6002 and interact with the case 5400 similar to the interaction between the arm 3278 and generally and substantially L-shaped arm 3276 of the disk 3270 and the case 5400. The material aperture 6010 is sized to align with the aperture of the funnel 5240 such that ground material can pass through the aperture of the funnel 5240 and then through the material aperture 6010 into the chamber 5300. The hollow body 6014 extends from the second surface 6004 and is aligned with the material aperture 6010. The pin aperture 6012 receives the pin of the seat 5250 similar to the second pin aperture 3282 of the disk 3270. The length of the hollow body 6014 is greater than the length of the conduit 3284 of the disk 3270 such that ground material is deposited into a lower portion of a pre-formed tube in the central portion of the cylinder 5310. In this embodiment, the tip 6016 is angled.

In another embodiment, the apparatus 5000 does not comprise the washer 5570, support 5280, disk 5290 and tube 5410, but instead comprises the tube-support 6100 shown in FIGS. 57a to 57d. The tube-support 6100 comprises a first surface 6102, a second surface 6104, an arm 6106, a generally and substantially L-shaped arm 6108, a material aperture 6110, a pin aperture 6112, a hollow body 6114 and a tip 6116. The arm 6106 and generally and substantially L-shaped arm 6108 extend from the first surface 6102 and interact with the case 5400 similar to the interaction between the arm 3278 and generally and substantially L-shaped arm 3276 of the disk 3270 and the case 5400. The material aperture 6110 is sized to align with the aperture of the funnel 5240 such that ground material can pass through the aperture of the funnel 5240 and then through the material aperture 6110 into the chamber 5300. The hollow body 6114 extends from the second surface 6104 and is aligned with the material aperture 6110. The pin aperture 6112 receives the pin of the seat 5250 similar to the second pin aperture 3282 of the disk 3270. The length of the hollow body 6114 is greater than the length of the conduit 3284 of the disk 3270 such that ground material is deposited into a lower portion of a pre-formed in the central portion of the cylinder 5310. In this embodiment, the hollow body 6114 is angled.

Turning now to FIGS. 58a to 58d, another embodiment of a blender 6200 is shown. The blender 6200 is for use with the apparatus 5000 without the dial 5620 of the separator 5200 as will be described or, as would be understood by persons skilled in the art, with the dial 5620 rotated such that chamber 5300 is accessible. The blender 6200 comprises a ring 6202, an arm 6204, a blending arm 6206 and an auger 6208. The arm 6204 projects from the ring 6202 to the auger 6208, which in this embodiment, is generally and substantially centrally located. The auger 6208 is aligned with the aperture of the funnel 5240. The auger 6208 is longer than the auger 4066 of the blender 4060 and extends into the cylinder 5310 as will be described. The blending arm 6206 projects form the ring 6202 and is used to blend ground material as described with reference to the blender 4060. The ring 6202 of the blender 6200 interacts with the sleeve 5220 as described with reference to the blender 4060.

The blender 6200 is configured to be used with the seat 5220, adapter 5230 and funnel 5240 already described and shown in FIGS. 59a and 59b. The blender 6200 can be used with the dial 5260 when it is rotated such that chamber 5300 is accessible or without the dial 5260, and can be used with the washer 5270, support 5280, disk 5290 and tube 5410, the support-tube 6000, or the support-tube 6100. In this configuration, material is ground and deposited in the funnel 5240, blended using the blender 6200 and then forced through the aperture of the disk 5290, support-tube 6000 or support-tube 6100 and into the central portion of the cylinder 5310 and into a pre-formed tube by the auger 6208. The pre-formed tube may or may not be within the casing 3600.

In this configuration, rotation of the sleeve 5220 not only blends the ground material but forces the blended ground material into the pre-formed tube within the central portion of the cylinder 5310.

In use, the head 5382 is removed from the plug aperture of the plug base 5360 and a pre-formed tube 3000 is inserted over the tube 5410. The head 5382 is then re-inserted into the plug aperture of the plug base 5360. The pre-formed tube 3000 is then filled with ground material. The fingers 5392 of the plug 5380 prevent the pre-formed tube 3000 from falling out of the cylinder 5310. The blender 6200 forces the blended ground material through the tube 5410 and into the pre-formed tube 3000. As more blended ground material is forced into the pre-formed tube 3000, the pre-formed tube 3000 gradually moves down and off of the tube 5410, bending the fingers 5392 and is expelled through the plug aperture 5394 of the plug 5380 as the fingers 5392 are bent to allow access through the plug aperture 5394. In this manner, a pre-formed tube 3000 filled with blended ground material is expelled from the cylinder 5310 without removing the head 5382 from the plug aperture.

In another embodiment, the ground material is deposited into the pre-formed tube 3000 without using the blender 6200.

In another embodiment, the ground material is deposited into the pre-formed tube using the stuffer 600.

In another embodiment, the apparatus (10, 3050, 5000) can be configured such that ground material is simultaneously deposited into multiple pre-formed tubes 3000 within the cylinder (310, 3310, 5310). For example, the apparatus 10 may have multiple filters 210 or a single filter 210 with multiple apertures 216, and the valve layer 250 may have multiple valves 262; the multiple filters 210 or multiple apertures 216, and the multiple valves 262, being arranged in-line with the central receptacles 312 and/or the peripheral receptacles 314 of the cylinder 310. Likewise, the apparatus 3050 may have multiple funnels 3210 or a single funnel 3210 with multiple apertures 3214, the seat 3230, the dial 3250 and the disk 3270 may have multiple apertures (3236, 3252, 3280); the multiple funnels 3210 or multiple apertures 3214, and the multiple apertures (3236, 3252, 3280) arranged in-line with the receptacle 3312 and/or the secondary receptacles 3320 of the cylinder 3310. Similarly, the apparatus 5000 may have multiple funnels 5240 or a single funnel 5240 with multiple apertures and multiple tubes 5410; the seat 5250, the dial 5260, the support 5280 and the disk 5290 may have multiple apertures (5285, 5402); the multiple funnels 5240 or multiple funnel apertures, and the multiple apertures (5285, 5402) and multiple tubes 5410 arranged in-line with the receptacle and/or the secondary receptacles of the cylinder 5310. Alternatively, various components of the apparatus (10, 3050, 5000) can be removed such that ground material is simultaneously deposited into multiple pre-formed tubes 3000 within the cylinder (310, 3310, 5310). For example, the filter 210 and/or the valve layer 250 may be removed from the apparatus 10. In this configuration, the material ground in the grinder 100 is simultaneously deposited directly into pre-formed tubes 3000 present in the central receptacle 312 and/or the peripheral receptacles 314 of the cylinder 310. Likewise, the funnel 3210/5240, seat 3230/5250, dial 3250/5260, support 5280, disk 3270/5290 and/or tube 5410 can be removed from the apparatus 3050/5000. In this configuration, the material ground in the grinder 3100/5100 is simultaneously deposited into pre-formed tubes 3000 present in the receptacle 3312 and/or the secondary receptacles 3320 of the cylinder 3310/5310.

The cleaning tools (530, 2530 and 5530) are sized to be removably secured to the storage containers (510, 1610 and 5510) as already explained. The cleaning tools (530, 2530 and 5530) may be used with any of the embodiments of the apparatus (10, 1000, 3050 and 5000) described herein. While embodiments of the cleaning tool (530, 2530 and 5530) have been described with four (4) and three (3) ends of particular shape and configuration, persons skilled in the art will appreciate that more or less ends are possible with various shapes and configurations.

In the embodiments described, the various parts of the apparatus (10, 1000, 3050 and 5000) may be manufactured from any material known to persons skilled in the art that would suitably perform the function for which they are intended, including, but not limited to, metal, plastic, silicone, wood, cork etc. or any combination thereof. One skilled in the art will appreciate that the various parts in a single apparatus (10, 1000, 3050 and 5000) may be manufactured from a variety of different materials known to persons skilled in the art that would suitably perform the function for which they are intended. Furthermore, the various parts of the apparatus (10, 1000, 3050 and 5000) may be opaque, clear, or partially opaque or clear.

While it is contemplated that the device is for use in grinding tobacco, any other organic leafy material known to persons skilled in the art to be smoked may also be used.

While the use of adhesive has been described in various embodiments herein, any connecting techniques, methods and/or materials known to persons of ordinary skill in the art that would suitably perform the function for which they are intended, may be used such as, but not limited to, moulding, over-molding, screwing, nailing, friction fit, etc.

Although certain embodiments have been described with reference to the figures, those of skill in the art will appreciate that variations and modifications may be made without departing from the scope thereof as defined by the appended claims.

What is claimed is:

1. An apparatus for grinding and depositing smokeable material into at least one tube for smoking, said apparatus comprising:
    a grinder configured to grind said smokeable material, said grinder comprising at least one grinder aperture configured to allow passage of said ground smokeable material;
    a chamber aligned with said grinder, said chamber configured to receive at least one tube for smoking at least; and
    a blender located between said grinder and said chamber, said blender configured to receive said ground smokeable material from said grinder, to blend said ground smokeable material and to guide said blended ground smokeable material toward said chamber,
wherein said chamber is further configured to receive said blended ground smokeable material via gravity such that said blended ground smokeable material is deposited in at least one tube for smoking received within said chamber to at least partially fill at least one tube for smoking received within said chamber with said ground smokeable material.

2. The apparatus of claim 1, wherein the grinder comprises:
    a first grinding, unit comprising at least one first protrusion; and
        a second grinding unit comprising at least one second protrusion and said at least one grinder aperture,
        wherein when said first grinding unit is moved relative to said second grinding unit, said at least one first protrusion interacts with said at least one second protrusion to grind said smokeable material, and
        wherein said ground smokeable material passes through said at least one grinder aperture.

3. The, apparatus of claim 1, further comprising a separator located between said grinder and said blender and configured to receive said blended ground smokeable material from said blender and to separate large blended ground smokeable material from small blended ground smokeable material and to guide said large blended ground smokeable material into said chamber, wherein said large blended ground smokeable material is deposited in at least one tube for smoking received within said chamber.

4. The apparatus of claim 3, wherein said at least one separator comprises at least one filter comprising a porous material for allowing passage of said small blended ground smokeable material therethrough and at least one separator aperture for allowing passage of said large blended ground smokeable material therethrough, said at least one separator aperture positioned such that said large blended ground smokeable material passes through said at least one separator aperture and is deposited in at least one tube for smoking received within said chamber.

5. The apparatus of claim 1, wherein said chamber comprises at least one receptacle configured to receive at least one tube for smoking wherein said blended ground smokeable material is deposited in at least one tube for smoking received within said at least one receptacle.

6. The apparatus of claim 5, wherein said at least one tube for smoking is made of paper.

7. The apparatus of claim 5, wherein said smokeable material is tobacco.

8. The apparatus of clam 5, wherein said smokeable material is marijuana.

9. The apparatus of claim 5, wherein said smokeable material is a plant material.

10. The apparatus of claim 5, further comprising a separator located between said grinder and said blender and configured to receive said blended ground smokeable material from said blender and to separate large blended ground smokeable material from small blended ground smokeable material and to guide said large blended ground smokeable material into said chamber, wherein said large blended ground smokeable material is deposited in at least one tube for smoking received within said at least one receptacle.

11. The apparatus of claim 10, wherein said at least one separator comprises at least one filter comprising a porous material for allowing passage of said small blended ground smokeable material therethrough and at least one separator aperture for allowing passage of said large blended ground smokeable material therethrough, said at least one separator aperture positioned such that said large blended ground smokeable material passes through said at least one separator aperture and is deposited in at least one tube for smoking received within said at least one receptacle.

12. The apparatus of claim 11, wherein said chamber further comprises a base enclosing said at least one receptacle at an end opposite said grinder, said base comprising at least one base aperture from which at least one tube for smoking received within said at least one receptacle is accessible.

13. The apparatus of claim 12, further comprising at least on removable plug configured to seal said at least one base aperture.

14. The apparatus of claim 1, wherein said chamber comprises a rotatable cylinder comprising at least two receptacles, each receptacle of said at least two receptacles configured to receive a tube for smoking and wherein said blended ground, material is deposited into a first tube for smoking received within a first receptacle of said at least two receptacles and into at least a second tube for smoking received within at least a second receptacle of said, at least two receptacles upon rotation of said cylinder.

15. The apparatus of a 14, wherein said at least one tube for smoking is made of paper.

16. The apparatus14, wherein said smokeable material is tobacco.

17. The apparatus of claim 14, wherein said smokeable material is marijuana.

18. The apparatus of claim 14, wherein said smokeable material is a plant material.

19. The apparatus of claim 14, further comprising at least one separator located between said grinder and said blender and configured to receive said blended ground smokeable material from said blender and to separate large blended ground smokeable material from small blended ground smokeable material and to guide said large blended ground smokeable material into said rotatable cylinder, wherein said large blended ground smokeable material is deposited into a first tube for smoking received within said first receptacle of said at least two receptacles and into at least a second tube for smoking received within at least said second receptacle of said at least two receptacles upon rotation of said cylinder.

20. The apparatus of 19, wherein said at least one separator comprises at least one filter comprising a porous material for allowing passage of said small blended ground smokeable material therethrough and at least one separator aperture for allowing passage of said large blended ground smokeable material therethrough, said at least one separator aperture positioned such that said large blended ground smokeable material passes through said at least one separator aperture into said first receptacle.

21. The apparatus of claim 20, wherein said chamber further comprises a base enclosing said at least two receptacles at an end opposite said grinder, said base comprising at least one base aperture from which a tube for smoking received within one of said at least two receptacles is accessible.

22. The apparatus of claim wherein said at least one tube for smoking is made of paper.

23. The apparatus of claim 1, wherein said smokeable material is tobacco.

24. The apparatus of claim 1, wherein said smokeable material marijuana.

25. The apparatus of claim 1, wherein said smokeable material is a plant material.

* * * * *